US009003282B2

(12) United States Patent
Baer et al.

(10) Patent No.: US 9,003,282 B2
(45) Date of Patent: Apr. 7, 2015

(54) METHOD AND SYSTEM FOR MANAGING VOLUMES WITHIN A COMPILATION OF CONTENT

(75) Inventors: William J. Baer, San Jose, CA (US); James A. Barker, University Heights, OH (US); Edward Hanapole, Pine Brook, NJ (US); Robert C. Hartman, Jr., San Jose, CA (US); Eugene Johnson, Jr., Lexington, KY (US); I-Ming Kao, San Jose, CA (US); Janet L. Murray, Los Gatos, CA (US); Jerry D. Robertson, III, San Jose, CA (US); Richard W. Walkus, Wayne, NJ (US)

(73) Assignee: International Business Machines Corporation, Armonk, NY (US)

( * ) Notice: Subject to any disclaimer, the term of this patent is extended or adjusted under 35 U.S.C. 154(b) by 1539 days.

(21) Appl. No.: 11/831,428

(22) Filed: Jul. 31, 2007

(65) Prior Publication Data

US 2009/0157711 A1   Jun. 18, 2009

Related U.S. Application Data

(63) Continuation of application No. 09/489,143, filed on Jan. 21, 2000.

(51) Int. Cl.
*G06F 17/00* (2006.01)
*G06F 17/30* (2006.01)
*G06F 17/21* (2006.01)

(52) U.S. Cl.
CPC .......... *G06F 17/3089* (2013.01); *G06F 17/217* (2013.01); *G06F 17/30575* (2013.01); *G06F 17/3056* (2013.01)

(58) Field of Classification Search
CPC ... G06F 17/2247; G06F 17/24; G06F 17/217; G06F 17/212; G06T 11/60
USPC .................. 715/200, 234, 243, 244, 251, 255
See application file for complete search history.

(56) References Cited

U.S. PATENT DOCUMENTS 3,964,029 A    6/1976  Babb
4,498,150 A *  2/1985  Gaudet et al. ................ 358/1.18
(Continued)

FOREIGN PATENT DOCUMENTS

JP    63286931 A    11/1988
WO    9932982 A1   7/1999

OTHER PUBLICATIONS

Notice of Allowance from U.S. Appl. No. 09/488,969.
(Continued)

*Primary Examiner* — Adam M Queler
(74) *Attorney, Agent, or Firm* — Ingrid Foerster: SVL IPLaw Edell, Shapiro & Finnan, LLC

(57) ABSTRACT

A web-based system, method and program product are provided for adding content to a content object stored (e.g., a custom compilation or prepublished work) in a data repository as a group of hierarchically related content entities. Each noncontainer content object is preferably stored as a separate entity in the data repository. Each content entity is also stored as a row in a digital library index class as a collection of attributes and references to related content entities and containers. As the user selects desired objects for inclusion in a content object, the system arranges the objects hierarchically, e.g., into volumes, chapters and sections according to the order specified by the user. The system then creates a file object (e.g., a CBO) defining the content object that contains a list or outline of the container and noncontainer entities selected, their identifiers, order and structure. This file object is stored separately in the data repository. An aspect of the invention is the calculation of the compilation's cost by estimating the amount of content it contains and determining a content cost based upon the content estimate. Optionally, a cost is assigned to each content entity in the data repository and these actual costs are summed as part of the cost estimation procedure.

32 Claims, 34 Drawing Sheets

(56) References Cited

U.S. PATENT DOCUMENTS

| | | | |
|---|---|---|---|
| 4,709,348 A * | 11/1987 | Horn et al. | 715/205 |
| 4,823,306 A | 4/1989 | Barbic et al. | |
| 5,187,786 A | 2/1993 | Densmore et al. | |
| 5,251,315 A | 10/1993 | Wang | |
| 5,274,757 A | 12/1993 | Miyoshi et al. | |
| 5,297,039 A | 3/1994 | Kanaegami et al. | |
| 5,377,348 A | 12/1994 | Lau et al. | |
| 5,379,373 A * | 1/1995 | Hayashi et al. | 715/235 |
| 5,388,196 A | 2/1995 | Pajak et al. | |
| 5,390,354 A * | 2/1995 | de Heus et al. | 715/234 |
| 5,454,105 A | 9/1995 | Hatakeyama et al. | |
| 5,467,471 A | 11/1995 | Bader | |
| 5,532,920 A | 7/1996 | Hartrick et al. | |
| 5,537,586 A | 7/1996 | Amram et al. | |
| 5,546,564 A | 8/1996 | Horie | |
| 5,557,722 A | 9/1996 | DeRose et al. | |
| 5,563,722 A * | 10/1996 | Norris | 358/453 |
| 5,579,471 A | 11/1996 | Barber et al. | |
| 5,634,064 A | 5/1997 | Warnock et al. | |
| 5,638,438 A * | 6/1997 | Keen | 379/354 |
| 5,644,736 A | 7/1997 | Healy et al. | |
| 5,644,776 A | 7/1997 | DeRose et al. | |
| 5,646,992 A | 7/1997 | Subler et al. | |
| 5,649,185 A | 7/1997 | Antognini et al. | |
| 5,664,182 A | 9/1997 | Nierenberg et al. | |
| 5,664,189 A | 9/1997 | Wilcox et al. | |
| 5,680,619 A | 10/1997 | Gudmundson et al. | |
| 5,717,923 A | 2/1998 | Dedrick | |
| 5,737,599 A | 4/1998 | Rowe et al. | |
| 5,758,351 A | 5/1998 | Gibson et al. | |
| 5,768,521 A | 6/1998 | Dedrick | |
| 5,778,378 A | 7/1998 | Rubin | |
| 5,778,398 A | 7/1998 | Nagashima et al. | |
| 5,781,189 A | 7/1998 | Holleran et al. | |
| 5,781,732 A | 7/1998 | Adams | |
| 5,787,413 A | 7/1998 | Kauffman et al. | |
| 5,799,157 A | 8/1998 | Escallon | |
| 5,802,524 A | 9/1998 | Flowers et al. | |
| 5,806,061 A | 9/1998 | Chaudhuri et al. | |
| 5,813,000 A | 9/1998 | Furlani | |
| 5,832,499 A | 11/1998 | Gustman | |
| 5,847,709 A | 12/1998 | Card et al. | |
| 5,848,404 A | 12/1998 | Hafner et al. | |
| 5,848,409 A | 12/1998 | Ahn | |
| 5,857,203 A | 1/1999 | Kauffman et al. | |
| 5,864,870 A | 1/1999 | Guck | |
| 5,875,446 A | 2/1999 | Brown et al. | |
| 5,877,445 A | 3/1999 | Hufford et al. | |
| 5,890,147 A | 3/1999 | Peltonen et al. | |
| 5,895,476 A * | 4/1999 | Orr et al. | 715/202 |
| 5,905,973 A | 5/1999 | Yonezawa et al. | |
| 5,909,688 A | 6/1999 | Yoshioka et al. | |
| 5,911,074 A | 6/1999 | Leprince et al. | |
| 5,911,146 A * | 6/1999 | Johari et al. | 715/234 |
| 5,913,065 A | 6/1999 | Faustini | |
| 5,918,052 A | 6/1999 | Kruskal et al. | |
| 5,956,715 A | 9/1999 | Glasser et al. | |
| 5,959,627 A | 9/1999 | Duwaer et al. | |
| 5,960,411 A | 9/1999 | Hartman et al. | |
| 5,963,940 A | 10/1999 | Liddy et al. | |
| 5,966,707 A | 10/1999 | Van Huben et al. | |
| 5,977,967 A | 11/1999 | Berner et al. | |
| 5,987,242 A | 11/1999 | Bentley et al. | |
| 5,991,756 A | 11/1999 | Wu | |
| 5,991,758 A | 11/1999 | Ellard | |
| 6,003,040 A | 12/1999 | Mital et al. | |
| 6,006,242 A | 12/1999 | Poole et al. | |
| 6,012,890 A | 1/2000 | Celorio Garrido | |
| 6,018,627 A | 1/2000 | Iyengar et al. | |
| 6,021,410 A | 2/2000 | Choy | |
| 6,026,416 A | 2/2000 | Kanerva et al. | |
| 6,026,417 A * | 2/2000 | Ross et al. | 715/210 |
| 6,029,141 A | 2/2000 | Bezos et al. | |
| 6,052,528 A | 4/2000 | Dechamboux | |
| 6,055,544 A | 4/2000 | DeRose et al. | |
| 6,064,384 A * | 5/2000 | Ho | 715/839 |
| 6,065,026 A | 5/2000 | Cornelia et al. | |
| 6,072,479 A | 6/2000 | Ogawa | |
| 6,073,148 A | 6/2000 | Rowe et al. | |
| 6,091,930 A | 7/2000 | Mortimer et al. | |
| 6,098,072 A | 8/2000 | Sluiman et al. | |
| 6,101,500 A | 8/2000 | Lau | |
| 6,119,108 A | 9/2000 | Holmes et al. | |
| 6,122,641 A | 9/2000 | Williamson et al. | |
| 6,128,633 A * | 10/2000 | Michelman et al. | 715/210 |
| 6,131,100 A | 10/2000 | Zellweger | |
| 6,134,552 A | 10/2000 | Fritz et al. | |
| 6,134,594 A | 10/2000 | Helland et al. | |
| 6,134,706 A | 10/2000 | Carey et al. | |
| 6,147,768 A * | 11/2000 | Norris | 358/1.18 |
| 6,163,781 A | 12/2000 | Wess, Jr. | |
| 6,173,286 B1 | 1/2001 | Guttman et al. | |
| 6,173,407 B1 | 1/2001 | Yoon et al. | |
| 6,178,463 B1 | 1/2001 | Houston et al. | |
| 6,182,082 B1 | 1/2001 | Tanaka et al. | |
| 6,199,054 B1 | 3/2001 | Khan et al. | |
| 6,199,082 B1 | 3/2001 | Ferrel et al. | |
| 6,199,197 B1 | 3/2001 | Engstrom et al. | |
| 6,201,948 B1 | 3/2001 | Cook et al. | |
| 6,202,061 B1 * | 3/2001 | Khosla et al. | 1/1 |
| 6,211,871 B1 | 4/2001 | Himmel et al. | |
| 6,212,530 B1 | 4/2001 | Kadlec | |
| 6,236,988 B1 | 5/2001 | Aldred | |
| 6,240,407 B1 | 5/2001 | Chang et al. | |
| 6,243,709 B1 | 6/2001 | Tung | |
| 6,249,905 B1 | 6/2001 | Yoshida et al. | |
| 6,269,361 B1 | 7/2001 | Davis et al. | |
| 6,275,977 B1 | 8/2001 | Nagai et al. | |
| 6,279,007 B1 | 8/2001 | Uppala | |
| 6,279,017 B1 * | 8/2001 | Walker | 715/201 |
| 6,286,028 B1 | 9/2001 | Cohen et al. | |
| 6,289,500 B1 | 9/2001 | Baxter et al. | |
| 6,298,354 B1 | 10/2001 | Saulpaugh et al. | |
| 6,308,176 B1 | 10/2001 | Bagshaw | |
| 6,308,314 B1 | 10/2001 | Carlson et al. | |
| 6,314,420 B1 | 11/2001 | Lang et al. | |
| 6,331,865 B1 | 12/2001 | Sachs et al. | |
| 6,339,838 B1 | 1/2002 | Weinman, Jr. | |
| 6,347,333 B2 | 2/2002 | Eisendrath et al. | |
| 6,351,752 B1 | 2/2002 | Cousins et al. | |
| 6,405,224 B1 * | 6/2002 | Van Der Meer | 715/273 |
| 6,407,757 B1 * | 6/2002 | Ho | 715/776 |
| 6,411,993 B1 | 6/2002 | Reynolds et al. | |
| 6,415,316 B1 | 7/2002 | Van Der Meer | |
| 6,427,063 B1 | 7/2002 | Cook et al. | |
| 6,442,577 B1 | 8/2002 | Britton et al. | |
| 6,446,077 B2 | 9/2002 | Straube et al. | |
| 6,449,627 B1 | 9/2002 | Baer et al. | |
| 6,470,171 B1 | 10/2002 | Helmick et al. | |
| 6,529,889 B1 | 3/2003 | Bromberg et al. | |
| 6,544,294 B1 | 4/2003 | Greenfield et al. | |
| 6,592,628 B1 | 7/2003 | Prinzing | |
| 6,594,646 B1 | 7/2003 | Okayama et al. | |
| 6,606,633 B1 | 8/2003 | Tabuchi | |
| 6,611,840 B1 | 8/2003 | Baer et al. | |
| 6,769,096 B1 * | 7/2004 | Kuppusamy et al. | 715/234 |
| 6,839,701 B1 | 1/2005 | Baer et al. | |
| 6,886,036 B1 | 4/2005 | Santamaki et al. | |
| 6,910,018 B1 | 6/2005 | Okada et al. | |
| 6,938,007 B1 | 8/2005 | Iulianello et al. | |
| 6,966,026 B1 * | 11/2005 | Sommerer | 715/235 |
| 6,986,102 B1 | 1/2006 | Baer et al. | |
| 7,007,034 B1 | 2/2006 | Hartman et al. | |
| 7,028,258 B1 * | 4/2006 | Thacker et al. | 715/209 |
| 7,043,488 B1 | 5/2006 | Baer et al. | |
| 7,076,494 B1 | 7/2006 | Baer et al. | |
| 7,089,239 B1 | 8/2006 | Baer et al. | |
| 7,185,011 B1 * | 2/2007 | Dujari | 1/1 |
| 7,203,900 B2 * | 4/2007 | Nara et al. | 715/255 |
| 7,340,481 B1 | 3/2008 | Baer et al. | |
| 7,346,844 B1 | 3/2008 | Baer et al. | |
| 7,356,766 B1 | 4/2008 | Baer et al. | |
| 7,383,207 B2 | 6/2008 | Schwartz et al. | |
| 7,401,097 B1 | 7/2008 | Baer et al. | |

(56) References Cited

U.S. PATENT DOCUMENTS

| | | | |
|---|---|---|---|
| 7,613,993 | B1 | 11/2009 | Baer et al. |
| 7,770,123 | B1 | 8/2010 | Meyer et al. |
| 7,895,243 | B1 | 2/2011 | Baer et al. |
| 2001/0056379 | A1 | 12/2001 | Fujinaga et al. |
| 2002/0013792 | A1 | 1/2002 | Imielinski et al. |
| 2002/0099623 | A1* | 7/2002 | Yukino ............ 705/27 |
| 2003/0050916 | A1 | 3/2003 | Ortega et al. |
| 2003/0140315 | A1 | 7/2003 | Blumberg et al. |
| 2003/0208556 | A1 | 11/2003 | Friedman et al. |
| 2009/0157711 | A1 | 6/2009 | Baer et al. |

OTHER PUBLICATIONS

CA: IBM Digital Library "Application Programming Reference", Version 2, Second Edition (Sep. 1997) pp. 1147-1257.

CB: IBM Digital Library "Guide to Object-Oriented and Internet Application Programming", Version 2, Second Edition (Sep. 1997) pp. 1-169.

CC: IBM Digital Library "Text Search Using TextMiner Application : Programming Reference" First Edition, Sep. 1997, pp. 1-246.

Microsoft Power Point presentation presenting how to use Primis Online (http://www.mhhc.com/primis/catalog/pcatalog/primisweb.ppt).

BarnesandNoble.com, Entertainment We Recommend, Copyright 1999, pp. 1-2, <http://web.archive.org/web/19991122052147/www.barnesandnoble.com/subjects/entert/entert.asp?pcount =0>.

The New York Times Company, The New York Times on the Web, Copyright 1999, pp. 1-3, <http://web.archive.org/web/19990208010553/http://times.com/>.

Dimick, Classical and Flamenco Guitar MIDIs, Copyright 1998, pp. 1-2, <http://web.archive.org/web/19990117081725/www.guitarist.com/midis/midis.htm>.

K.G. Sinclair, Free E-books You Can Download, Copyright 1999, pp. 1-4, <http://web.archive.org/web/19991128041349/ksinclair.com/ebooks.htm>.

Jeff Sutherland, Business object design and implementation workshop, ACM SIGPLAN OOPS Messenger, Addendum to the proceedings of the 10th annual conference on Object-oriented programming systems, languages, and applications (Addendum), Oct. 1995, vol. 6, Issue 4.

Haim Kilov et al., Semantic integration in complex systems, ACM SIGPLAN OOPS Messenger, Addendum to the proceedings of the 10th annual conference on Object-oriented programming systems, languages, and applications (Addendum), Oct. 1995, vol. 6, Issue 4.

ezWriter 2.0 for Windows, Aug. 5, 1998 by Lance Vaughn, Atlanta, IN, pp. 1-15.

McGraw-Hill Primis Custom Publishing (www.mhhe.com/primis), archived circa 1998, via the Wayback Machine (www.archive.org).

Adam et al., "Strategic Directions in Electronic Commerce and Digtal Libraries: Towards a Digital Agora", ACM Computing Surveys, vol. 28, issue 4 (Dec. 1996), pp. 818-835.

Henke, Harold, "The Global Impact of eBooks on ePublishing", Proceedings of the 19th annual international conference on Computer documentation, 2001, pp. 172-179.

Argentesi et al., "An Electronic Book for Accessing an Organising Information Distributed Across Internet: Dynamic WAIS Book", IEEE, Feb. 1995, pp. 8/1-8/12.

Book Printing & Binding, 1998 Port City Press, Inc., online:<http://www.portcitypress.com/Services/bookprinting. p. 1.

Yazigi, Colette, TAGINE, and interactive tool for report generation, ACM Proceedings of the international conference on APL, 1981, San Francisco, pp. 347-354.

Walter, Seybold Report on Publishing Systems, vol. 23, No. 13, Mar. 14, 1994, pp. 1-25.

\* cited by examiner

82
| CBO_ID | ATTRIBUTES | PARTNUMS |
PART 1
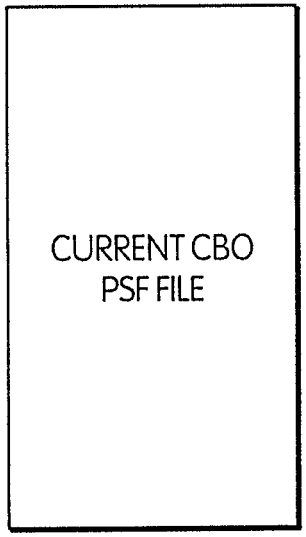
CURRENT CBO
PSF FILE
PART 2
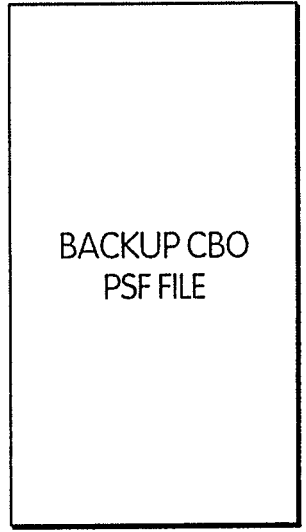
BACKUP CBO
PSF FILE
PART 5X
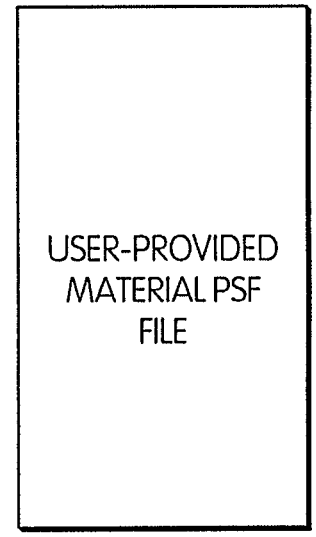
USER-PROVIDED
MATERIAL PSF
FILE
FIG. 7

FIG. 9A

THE PRENTICE HALL ENGINEERING SOURCE

HOME | ABOUT E SOURCE | REGISTER LOGIN | LIBRARY | MY BOOK OUTLINE | FACULTY RESOURCES | HELP

▸ QUICK HELP

WELCOME

Welcome Homeboy Flash Gordon — 111

| University | Approaching |
|---|---|
| Department | Body Building |
| Access Level | Full Access<br>This level allows you to create custom products and place order requests. |

Your Custom Book Outlines — 113

| | My Custom Book Title | Last TS Date | Appr. Status | Request ID |
|---|---|---|---|---|
| —116 | New Custom Book | 07/27/1999 | Rejected | ESOU001051 |
| CBO | Boys don't cry | 10/28/2000 | Submitted | ESOU001057 |
| CBO | What do you mean? | 09/02/1999 | Completed | ESOU002051 |
| CBO | Flash, I love you | 09/02/1999 | Completed | ESOU001058 |
| CBO | He'd save everyone one of us | 08/19/1999 | Approved | ESOU002009 |
| CBO | 12 hours to save the earth | 09/23/1999 | Completed | ESOU002373 |
| CBO | Holy Smokes Bateman | 07/23/1999 | Active | N/A |
| CBO | A Really Really Really Long Long Long Long Long Long Long Long Long Long Long Long Long Long | 07/23/1999 | Active | N/A |

(CBO) —118

FIG. 9B

THE PRENTICE HALL ENGINEERING SOURCE

Home | About E Source | Register Login | L I B R A R Y | My Book Outline | Faculty Resources | Help

MY BOOK OUTLINE

| Your Book Snapshot | Sections: 4 | Pages: 20.0 | Net Price: US $ 2.00

› QUICK HELP

To select another Custom Book Outline, or to create new Custom Book Outline, click on the red "CBO" button   CBO — 119

View My Book
[ View Book ]

This is Your Custom Book Outline

Book Title
My New ESource Book created on 12 / 20 / 1999 at 18 : 47 : 54  } 128

Add Your Content (IPM) to:
[ Add Content ]

| Contents | Price (132) | Pgs. (134) |
|---|---|---|
| VOLUME 1 | | |
| ✗ Table of Contents | 0.60 | 6 |
| ✗ Preface | 0.90 | 9 |
| ✗ Index | 0.50 | 5 |
| TOTAL | $ 2.00 | 20.0 |

} 130

* Approximate

Move Checked Items to:
[ Move Items ]

Remove Checked Items
[ Remove ]

Undo Last Action
[ Undo Last ]

Type the name of a chapter you would like to add to this book and press the "Add" button.
Add new chapter with this title
_____ ⌐ 121    123 ⌐ [ Add ]  } 124

Clear My Book
[ Clear Book ]

Select either book or chapter from the drop down list, type a new name in the text box and press the "Change" button to change the title.
Change [ Book ▼ ] title to [ Internet Basics ]    [ Add ]  } 126
         └ 125              └ 127            └ 129

Submit My Request with Prentice Hall
[ Submit Request ]

— (*Emissary*)

© 1998, 1999, 2000 BY PRENTICE HALL INC

FIG. 10A

THE PRENTICE HALL ENGINEERING SOURCE

HOME | ABOUT E SOURCE | REGISTER LOGIN | LIBRARY | MY BOOK OUTLINE | FACULTY RESOURCES | HELP

MY BOOK OUTLINE

Your Book Snapshot | Sections: 4 | Pages: 20.0 | Net Price: US $2.00

To select another Custom Book Outline, or to create new Custom Book Outline, click on the red "CBO" button

CBO

This is Your Custom Book Outline

Book Title
Internet Basics } 128

QUICK HELP

View My Book
[ View Book ]

Add Your Content (IPM) to:
[ Add Content ]

Move Checked Items to:
[ Move Items ]

Remove Checked Items
[ Remove ]

Undo Last Action
[ Undo Last ]

Clear My Book
[ Clear Book ]

Submit My Request with Prentice Hall
[ Submit Request ]

| Contents | Price | Pgs. |
|---|---|---|
| VOLUME 1 | | |
| ✗ Table of Contents | 0.60 | 6 |
| ✗ Preface | 0.90 | 9 |
| ✗ Index | 0.50 | 5 |
| TOTAL | $ 2.00 | 20.0 |

*Approximate

Type the name of a chapter you would like to add to this book and press the "Add" button.
Add new chapter with this title

| New Chapter Title | | Add |

Select either book or chapter from the drop down list, type a new name in the text box and press the "Change" button to change the title.

Change  Book ▼ title to _____ | Change |

— EMISSARY —

© 1998, 1999, 2000 BY PRENTICE HALL INC

FIG. 10B

THE PRENTICE HALL ENGINEERING SOURCE

HOME | ABOUT E SOURCE | REGISTER LOGIN | L I B R A R Y | MY BOOK OUTLINE | FACULTY RESOURCES | HELP

▸ Browse Library

▸ Search Contents

▸ Ready Made Books

▸ QUICK HELP

ADD Checked Items to:

[ Add to Book ]

BROWSE LIBRARY

| Your Book Snapshot | Sections: 4 | Pages: 20.0 | Net Price: US $ 2.00 |

Use this page both to view content and add content to your custom book. For additional help with using this page, click on the Quick Help button to the left.

Introduction to the Internet
Scott D. James

— 146

Contents — 142              Price    Pgs.*

▼ ✓ CHAPTER 1: Introduction to the Internet
— 141
  ▯  1.1 History                                    0.14    1.4
  ▯  1.2 Internet Culture                           0.06    0.6
— 144 ▯ 1.3 Internet Netiquette                     0.16    1.6
  ▯  1.4 Advantages and Disadvantages of the Internet  0.26  2.6
145 ▯  1.5 Technical Issues                         0.25    2.5

▶ ▯ CHAPTER 2: E-Mail and Finding Addresses

▶ ▯ CHAPTER 3: Mailing Lists and UseNet News

▶ ▯ CHAPTER 4: Telnet, FTP, and Locating Files

▶ ▯ CHAPTER 5: Gopher and WAIS

▶ ▯ CHAPTER 6: The World Wide Web and HTML

▶ ▯ CHAPTER 7: Live Communications on the Internet — 148
  ▯  7.1 The Talk Program                           0.11    1.1
143 ✓ 7.2 IRC: Internet Relay Chat                  0.36    3.6
    ✓ 7.3 The Future of Live Communications         0.54    5.4

▶ ▯ CHAPTER 8: Java

▶ ▯ CHAPTER 9: Computer Security and the Internet

▶ ▯ CHAPTER 10: Appendix

\* Approximate

— EMISSARY                                  © 1998, 1999, 2000 BY PRENTICE HALL INC

FIG. 12

THE PRENTICE HALL ENGINEERING SOURCE
HOME | ABOUT E SOURCE | REGISTER LOGIN | LIBRARY | MY BOOK OUTLINE | FACULTY RESOURCES | HELP

MY BOOK OUTLINE

▸ QUICK HELP

View My Book
[ View Book ]

Add Your Content (IPM) to:
[           ]
[ Add Content ]

Move Checked Items to:
[           ]
[ Move Items ]

Remove Checked Items
[ Remove ]

Undo Last Action
[ Undo Last ]

Clear My Book
[ Clear Book ]

Submit My Request with Prentice Hall
[ Submit Request ]

Your Book Snapshot | Sections: 4 | Pages: 20.0 | Net Price: US $ 2.00

To select another Custom Book Outline, or to create new Custom Book Outline, click on the red "CBO" button     (CBO) — 119

This is Your Custom Book Outline

Book Title
Internet Basics

| Contents | Price | Pgs. |
|---|---|---|
| VOLUME 1 | | |
| ✗ Table of Contents | 0.60 | 6 |
| ✗ Preface | 0.90 | 9 |
| CHAPTER 1: Introduction to the Internet — 146 | | |
| ✗ Sections/Objectives/Science/Engineering Spotlight: Computer-Integrated Manufacturing — 154 | 0.16 | 1.6 |
| ▢ 1.1 History | 0.14 | 1.4 |
| ▢ 1.2 Internet Culture | 0.06 | 0.6 |
| ▢ 1.3 General Netiquette | 0.16 | 1.6 |
| ▢ 1.4 Advantages and Disadvantages of the Internet | 0.26 | 2.6 |
| ▢ 1.5 Technical Issues | 0.25 | 2.5 |
| ✗ Summary/Key Terms — 154 | 0.02 | 0.2 |
| CHAPTER 2: Live Communications on the Internet — 148 | | |
| ✗ Sections/Objectives/Science/Engineering Spotlight: Barcode Technologies — 154 | 0.06 | 0.6 |
| ▢ 2.1 IRC: Internet Relay Chat | 0.36 | 3.6 |
| ▢ 2.2 The Future of Live Communications | 0.54 | 5.4 |
| ✗ Summary/Key Terms/Problems — 154 | 0.04 | 0.4 |
| ✗ Index | 0.50 | .5 |
| TOTAL | $ 4.05 | 40.5 |

\* Approximate

FIG. 13

My Custom Content

| Your Book Snapshot | Sections: 4 | Pages: 20.0 | Net Price: US $7.00 |

Enter Your Custom Content Below.
Please enter your Custom Content below using the provided interface. You may enter as much or as little new material as you would like. ESource will save your material as a section. Simply enter your material hitting the Enter More Custom Content button every time you want a new section. ESource provides the following formatting tools.

> Section Headings: Enter text in the Title Box and it will appear as a section head.
> Paragraph Entries: Type the body of you text into this box. You may also use the cut-and-paste feature of your word processor to enter large blocks of text. All line breaks and spacing will be reproduced as entered.
> Computer Code: to enter computer code, choose the "Code Sample" option for your paragraph entry.
> Any material entered will be reproduced in a standard programming code typestyle. To switch back to regular code, click the Enter More Custom Content option at the bottom of the page, and begin a new section.

When complete, press the Save in My Book Outline button to include this information in your ESource book.

Your Custom Content Title ⟶ 158
| The Internet Wave |

Your Custom Content
The following Paragraph entries are ⦿ Code Sample ⦿ Standard Text
This is a sample chapter/section.

⟶ 160

| Save In My Book Outline | Enter More Custom Content | Back to My Book Outline |

| THE PRENTICE HALL ENGINEERING SOURCE |
| HOME \| ABOUT E SOURCE \| REGISTER LOGIN \| L I B R A R Y \| MY BOOK OUTLINE \| FACULTY RESOURCES \| HELP |

▸ QUICK HELP

MY BOOK OUTLINE

| Your Book Snapshot | Sections: 19 | Pages: 40.5 | Net Price: US $ 9.04

To select another Custom Book Outline, or to create new Custom Book Outline, click on the red "CBO" button   (CBO)

This is Your Custom Book Outline

View My Book
[◀ View Book]

Add Your Content (IPM) to:
[         ]
[◀ Add Content]

Move Checked Items to:
[         ]
[◀ Move Items]

Remove Checked Items
[◀ Remove]

Undo Last Action
[◀ Undo Last]

Clear My Book
[◀ Clear Book]

Submit My Request with Prentice Hall
[Submit Request]

Book Title
Internet Basics

| Contents | Price | Pgs. |
|---|---|---|
| VOLUME 1 | | |
| ✗ Table of Contents | 0.60 | 6 |
| ✗ Preface | 0.90 | 9 |
| ▢ CHAPTER 1: Introduction to the Internet | | |
| ✗ Sections/Objectives/Science/Engineering Spotlight: Computer-Integrated Manufacturing | 0.16 | 1.6 |
| ▢ 1.1 History | 0.14 | 1.4 |
| ▢ 1.2 Internet Culture | 0.06 | 0.6 |
| ▢ 1.3 General Netiquette | 0.16 | 1.6 |
| ▢ 1.4 Advantages and Disadvantages of the Internet | 0.26 | 2.6 |
| ▢ 1.5 Technical Issues | 0.25 | 2.5 |
| ✗ Summary/Key Terms | 0.02 | 0.2 |
| ▢ CHAPTER 2: Live Communications on the Internet | | |
| ✗ Sections/Objectives/Science/Engineering Spotlight: Barcode Technologies | 0.06 | 0.6 |
| ▢ 2.1 IRC: Internet Relay Chat | 0.36 | 3.6 |
| ▢ 2.2 The Future of Live Communications | 0.54 | 5.4 |
| ✗ Summary/Key Terms/Problems | 0.04 | 0.4 |
| ▢ CHAPTER 3: New Chapter | | |
| ▢ Custom Content: The Internet Wave —164 | n/a | 0.0 |
| ✗ Index | 0.50 | .5 |
| TOTAL | $ 9.04* | 40.5 |

\* Approximate

FIG. 15A

THE PRENTICE HALL ENGINEERING SOURCE

HOME | ABOUT E SOURCE | REGISTER LOGIN | LIBRARY | MY BOOK OUTLINE | FACULTY RESOURCES | HELP

▸ QUICK HELP

View My Book
[ View Book ]

Add Your Content (IPM) to:
[ Add Content ]

Move Checked Items to:
[ Move Items ]

Remove Checked Items
[ Remove ]

Undo Last Action
[ Undo Last ]

Clear My Book
[ Clear Book ]

Submit My Request with Prentice Hall
[ Submit Request ]

MY BOOK OUTLINE

Your Book Snapshot | Sections: 20 | Pages: 40.5 | Net Price: US $ 9.04

To select another Custom Book Outline, or to create new Custom Book Outline, click on the red "CBO" button     (CBO)

This is Your Custom Book Outline
176

Book Title
Internet Basics

| Contents | Price | Pgs. |
|---|---|---|
| VOLUME 1 | | |
| ✗ Table of Contents | 0.60 | 6 |
| ✗ Preface | 0.90 | 9 |
| ⬜ CHAPTER 1: Introduction to the Internet | | |
| 168 ✗ Sections/Objectives/Science/Engineering Spotlight: Computer-Integrated Manufacturing | 0.16 | 1.6 |
| 170 ⬜ 1.1 History | 0.14 | 1.4 |
| ⬜ 1.2 Internet Culture | 0.06 | 0.6 |
| 166 ✓ 1.3 General Netiquette | 0.16 | 1.6 |
| ⬜ 1.4 Advantages and Disadvantages of the Internet | 0.26 | 2.6 |
| 172 ⬜ 1.5 Technical Issues | 0.25 | 2.5 |
| ✗ Summary/Key Terms | 0.02 | 0.2 |
| ⬜ CHAPTER 2: Live Communications on the Internet | | |
| 174 ✗ Sections/Objectives/Science/Engineering Spotlight: Barcode Technologies | 0.06 | 0.6 |
| ⬜ 2.1 IRC: Internet Relay Chat | 0.36 | 3.6 |
| 178 ⬜ 2.2 The Future of Live Communications | 0.54 | 5.4 |
| ✗ Summary/Key Terms/Problems | 0.04 | 0.4 |
| ⬜ CHAPTER 3: New Chapter | | |
| 180 ⬜ Custom Content: The Internet Wave | n/a | 0.0 |
| ⬜ CHAPTER 4: Using Good Manners on the Internet —165 | | |
| ✗ Index | 0.50 | .5 |
| TOTAL | $ 9.04 | 40.5 |

| AMISSARY I Source My Book Outline    Microsoft Internet Explorer | _ | 🗗 | ✕ |

File   Edit   View   Favorites   Tools   Help

⬅ Back   ➡ Forward   ✕ Stop   🔄 Refresh   🏠 Home   🔍 Search   ⭐ Favorites   🕒 History   ✉ Mail   🖨 Print   📝 Edit Address | http://emissary.prenhall.com/esource/cgi-bin/Display.cgi | ▼ | Go | Links

---

View Book

Add 1
My Custom Content to:
[ Chapter 1 ▼ ]

[ ⬅ Add Content ]

Move
Checked Items to:
[ Up ▼ ]

[ ⬅ Move Items ]

Remove
Checked Items
[ ⬅ Remove ]

Undo
Last Action
[ ⬅ Undo Last ]

Clear
My Book
[ ⬅ Clear Book ]

Submit My Request
with Prentice Hall
[ ⬅ Submit ]

---

Book Title
Engineering

| Contents | Price | Pgs.* |
|---|---|---|
| VOLUME 1 ― 223 | | |
| ✗ Table of Contents | 0.60 | 6 |
| ✗ Preface | 0.90 | 9 |
| ☐ CHAPTER 1: Professionalism and Code of Ethics ― 221 | | |
| ✗  Sections/Objectives | 0.07 | 0.7 |
| ☐    1.1 Introduction | 0.02 | 0.2 |
| ☐    1.2 Intro. Study Engineering | 0.50 | 5.0 |
| ☐    1.3 Code of Ethics | 0.07 | 6.7 |
| ✗  Key terms/Problems | 0.20 | 2.0 |
| ✗ Index | 0.50 | 5 |
| VOLUME 2 ― 225 | | |
| ✗ Table of Contents | 0.60 | 6 |
| ✗ Preface | 0.90 | 9 |
| ☐ CHAPTER 1: Understanding Ethical Problems ― 224 | | |
| ✗  Sections/Objectives ― 154 | 0.05 | 0.5 |
| ☐    1.1 Introduction ― 227 | 0.03 | 0.3 |
| ☐    1.2 A Brief History of Ethical Problems | 0.07 | 0.7 |
| ☐    1.3 Ethical Theories | 0.90 | 9.0 |
| ✗  Key terms/Problems ― 154 | 0.14 | 1.4 |
| ✗ Index | 0.50 | 5 |
| TOTAL | $ 16.05 | (68.5) |

| | | AMISSARY I Source My Book Outline   Microsoft Internet Explorer | | — ☐ × |
|---|---|---|---|---|

File  Edit  View  Favorites  Tools  Help

⬅ Back  ➡ Forward  ✖ Stop  ⟳ Refresh  🏠 Home  🔍 Search  ⭐ Favorites  🕘 History  ✉ Mail  🖨 Print  ✎ Edit Address: http://emissary.prenhall.com/esource/cgi-bin/Display.cgi  ▼ ⟲Go ‖Links

| | Contents | Price | Pgs.* |
|---|---|---|---|
| ⬅ Add Content | VOLUME 1 | | |
| Move Checked Items to: | ✗ Table of Contents | 0.60 | 6 |
| Up ▼ | ✗ Preface | 0.90 | 9 |
| ⬅ Move Items | ▢ CHAPTER 1: Professionalism and Code of Ethics | | |
| | ✗ Sections/Objectives | 0.07 | 0.7 |
| | ▢ 1.1 Introduction | 0.02 | 0.2 |
| Remove Checked Items | ▢ 1.2 A Engineering Ethics Code | 0.50 | 5.0 |
| | ▢ 1.3 Code of Ethics | 0.87 | 8.7 |
| ⬅ Remove | ▢ 1.4 Introduction ⟵227 | 0.03 | 0.3 |
| Undo Last Action | ✗ Key terms/Problems | 0.02 | 2.0 |
| | ✗ Index | 0.50 | 5 |
| ⬅ Undo Last | | | |
| Clear My Book | VOLUME 2 | | |
| | ✗ Table of Contents | 0.60 | 6 |
| ⬅ Clear Book | ✗ Preface | 0.90 | 9 |
| Submit My Request with Prentice Hall | ▢ CHAPTER 2: Understanding Ethical Problems | | |
| | ✗ Sections/Objectives | 0.05 | 0.5 |
| ⬅ Submit | ▢ 2.1 A Brief History of Ethical Thought | 0.07 | 0.7 |
| | ▢ 2.2 Ethical Theories | 0.90 | 9.0 |
| | ✗ Key terms/Problems | 0.14 | 1.4 |
| | ✗ Index | 0.50 | 5 |
| | TOTAL | $ 16.05 | 68.5 |
| | | | * Approximate |

Type the name of a chapter you would like to add to this book and press the "Add" button. _____

⬤ Internet

FIG. 20C

System Administrator Main Menu

Select an option:

- Approve User ← 251
- Make Products Available ← 252
- Edit/Review/Approve CBO's ← 253

FIG. 22A

Approve User

| | Name ← 256 | University ← 257 | Department ← 258 | Reg. Date ← 259 |
|---|---|---|---|---|
| ☐ | Taylor, James | Duke | Electrical Engineering | 10/01/99 |
| ☐ | Streisand, Barb | Harvard | Applied Physics | 11/05/99 |
| ☐ | Clinton, Bill | Oxford | Physical Sciences | 09/10/99 |
| ☐ | Reno, Janet | MIT | Electrical Engineering | 01/06/00 |
| ☐ | Taylor, Tim | Stanford | Metalurgy | 08/21/99 |

← 254

[ COMMIT ] ← 225

FIG. 22B

Make Products Available

Title ← 260

☐ Engineering Ethics

☐ Introduction to Digital Design

☐ Design Theory

☐ Statistical Analysis

← 261

[ COMMIT ] ← 262

FIG. 22C

Submitted Custom Books

271 → | ← 272

| CBO Title | Owner |
|---|---|
| Fundamental Engineering Concepts | Taylor, James |
| Technical Interships: Gaining Hands-On Experience | Bill Clinton |
| Ethical Dilemmas in the Engineering Field | Al Gore |
| Basic Study Skills | Al Bundy |
| Approach to Statistical Methods | Janet Reno |

FIG. 22D

METHOD AND SYSTEM FOR MANAGING VOLUMES WITHIN A COMPILATION OF CONTENT

CROSS REFERENCE TO RELATED APPLICATIONS

This application is a continuation of U.S. patent application Ser. No. 09/489,143, entitled "Method and System for Calculating Cost of a Compilation of Content" and filed Jan. 21, 2000, the disclosure of which is incorporated herein by reference in its entirety. This application is related to the commonly assigned patent applications listed below, which were filed herewith on Jan. 21, 2000 and are all incorporated by reference herein:
A System and Method for Creating Compilations of Content
Ser. No. 09/489,134
Method and System for Adding Content to a Content Object Stored in a Data Repository
Ser. No. 09/489,576
Method and System for Adding User-Provided Content to a Content Object Stored in a Data Repository
Ser. No. 09/488,976
Method and System for Moving Content in a Content Object Stored in a Data Repository
Ser. No. 09/488,971
Method and System for Removing Content in a Content Object Stored in a Data Repository
Ser. No. 09/489,097, now U.S. Pat. No. 6,611,840
Prerequisite Checking in a System for Creating Compilations of Content
Ser. No. 09/488,969
Method and System for Preventing Mutually Exclusive Content Entities Stored in a Data Repository
Ser. No. 09/489,265, now U.S. Pat. No. 7,089,239
Volume Management Method and System for a Compilation of Content
Ser. No. 09/489,090, now U.S. Pat. No. 6,449,627
Method and System for Storing Hierarchical Content Objects in a Data Repository
Ser. No. 09/489,570, now U.S. Pat. No. 7,043,488
File Structure for Storing Content Objects in a Data Repository
Ser. No. 09/489,730, now U.S. Pat. No. 7,007,034
Providing a Functional Layer for Facilitating Creation and Manipulation of Compilations of Content
Ser. No. 09/489,605, now U.S. Pat. No. 7,076,494
A Hitmask for Querying Hierarchically Related Content Entities
Ser. No. 09/489,133, now U.S. Pat. No. 6,839,701
A Method and Configurable Model for Storing Hierarchical Data in a Non-Hierarchical Data Repository
Ser. No. 09/489,561, now U.S. Pat. No. 6,986,102

BACKGROUND OF THE INVENTION

1. Field of the Invention

The present invention relates to content management, and more specifically, to a system, method and program product for creating compilations of content from hierarchical content stored in a data repository.

2. Background of the Invention

Content management systems have enabled content of all types, e.g., text, still images, moving images, and audio content, to be stored digitally. Content management systems include, for example, relational databases, digital libraries, and media servers. They have further provided functions for manipulating the content, e.g., searching and editing capabilities.

It would be desirable to enable a user to take advantage of vast stores of content to create compilations tailored to the user's needs or desires. For example, a university professor would find value in creating custom textbook tailored to a specific course from prepublished textbooks stored in a content management system. This compilation could be further enhanced to include associated multimedia materials. As another example, a music lover would benefit from a system that allows him to specify musical selections to be included in a custom album. Such systems would have to partition large content objects (e.g., albums, books, videos) into smaller, selectable objects (e.g., musical selection, chapter section, episode) for inclusion in a compilation.

SUMMARY OF THE INVENTION

A web-based system, method and program product are provided for creating a compilation of content stored in a data repository as a group of hierarchically related content entities, managing, displaying, and searching the content, then creating and exporting compilations of content for publication. Also provided are a system, data structure, method, and program product for storing content into a repository for use in creating a compilation of content. The content is hierarchical in nature. Accordingly, entities at each level of the hierarchy except the lowest are defined by "containers". For example, in the case of textual content, the hierarchical structure of the data may include book containers, volume containers, chapter containers, and subsections (noncontainers, because they are at the leaf level of the hierarchy). In the case of audio content, the hierarchical containers may be album, compact disk, and musical selection, and excerpts of the musical selections are defined as noncontainers. In the case of video content, the hierarchical containers may include movies and excerpts from each movie, and frames are defined as noncontainers. If desired, the maximum size of a container may specified. For example, the volume size in a custom book is preferably determined using a threshold value defining maximum amount of content allowable for that container, and a procedure is provided for managing content entities and containers to maintain this maximum.

The hierarchical data and associated metadata are preferably stored in a digital library that includes search support. A web-based user interface is provided for presenting a user with a plurality of selectable objects, each object representing a subset of the hierarchical data (e.g., chapter subsections, musical excerpts, video excerpts, etc.). The plurality of objects may represent all subsets of the stored content or less than all of the subsets (e.g., categorizing the content and by providing a bookshelf for each category that a user may browse). The user then selects one or more of the objects for inclusion in a compilation (e.g., a custom textbook). Alternatively, the user may search the content by specifying search criteria through the interface. Additionally, the user may create new content, e.g., a new chapter or section, for inclusion in the final compilation by inputting user-provided material through the web interface. The system preferably stores the new content and creates a reusable, selectable object associated with the new content.

Each noncontainer content object is preferably stored as a separate entity in the data repository. Each content entity is also stored as a row in a digital library index class as a collection of attributes and references to related content entities. Each container and noncontainer is associated with a unique identifier that preferably includes hierarchical information about its position in the hierarchy.

As the user selects desired objects for inclusion in a compilation, the system arranges the objects hierarchically, e.g., into volumes, chapters and sections according to the order specified by the user. The system then creates a file object (e.g., a CBO) defining the compilation that contains a list or outline of the content entities selected, their identifiers, order and structure. This file object is stored separately in the data repository.

The list or outline is presented to the user at the web interface as a table of contents, and may be edited through the interface. For example, the user may add content, delete content, or move content within and across containers. Editing the list or outline redefines the structure of the compilation. Once the user is satisfied with the organization of the compilation, it is submitted it for publication. The submitted compilation is then forwarded to an approval process and is accepted, rejected, or returned to the user with editorial comments appended by the editor.

An aspect of the invention is the calculation of the compilation's cost by estimating the amount of content it contains and determining a content cost based upon the content estimate. Optionally, a cost is assigned to each content entity in the data repository and these actual costs are summed as part of the cost estimation procedure.

Another aspect of the invention is to provide permission checking. Occasionally, it may be desired to prevent certain content entities from appearing a same compilation as other content entities. For example, an author may specify that his work can not be published in the same compilation as the work of another author. Permission checking first requires associating each container and noncontainer with any mutually exclusive containers or noncontainers. For example, such association may be achieved by defining a set of rules specifying containers and/or content entities that are mutually exclusive. Upon selection of a container or noncontainer to add to the compilation, the permission checking procedure determines if the container or noncontainer is mutually exclusive of any other containers or content objects, e.g., by consulting the rules. If so, the permission checking procedure then analyzes the compilation outline to determine whether any of the other mutually exclusive containers or noncontainers already exists in the compilation. If so, then the selected container or noncontainer is not added to the compilation and the user is notified that the content selected may not be included in the compilation. Otherwise, the content is added.

A further aspect of the invention is to provide prerequisite checking, wherein some entities are associated, e.g., by a set of rules, with content objects that are prerequisites to that object (e.g., front or backmatter associated with the subsection such as an introduction, appendix, or bibliography), and wherein selection by the user of an entity prerequisites causes automatic inclusion of all associated prerequisite objects in the final compilation.

Another aspect of the invention is the provision of a functional layer between the user interface and data repository for facilitating the creation, manipulation, storage and management of content objects in the data repository.

Another aspect of the invention allows a user to create multiple compilations concurrently. Yet another aspect of the invention allows a user to modify a compilation by creating a clone or copy of the compilation and applying user-specified changes to the copy (e.g., in the creation of a new edition or version of an existing work.)

Other aspects of the invention include a configurable model for storing hierarchically related data in a relational database, and a data structure for storing the data and associated metadata, whereby the hierarchical relationship of the data is preserved.

As a further aspect of the invention, queries are executed on the hierarchical containers and noncontainers through an application or user-interface. The results of the independent searches are merged using hit masks. A hit mask is a string of bits, each bit representing a query. For each container and noncontainer in the result set, a hit mask is generated and ones of the bits are set to indicate which of the queries the container or noncontainer satisfies. Container hit masks are OR-ed with their child containers and/or noncontainers to reflect inheritance. Containers and noncontainers with all bits set comprise the merged result set.

DESCRIPTION OF THE DRAWING

FIG. 7 represents parts of a compilation of content stored in the digital library;

FIGS. 8A-21B represent the interface of an embodiment of the present invention;

FIGS. 22A-22E represent the system administrator interface of an embodiment of the present invention;

DETAILED DESCRIPTION

I. System Overview

Figure 1:
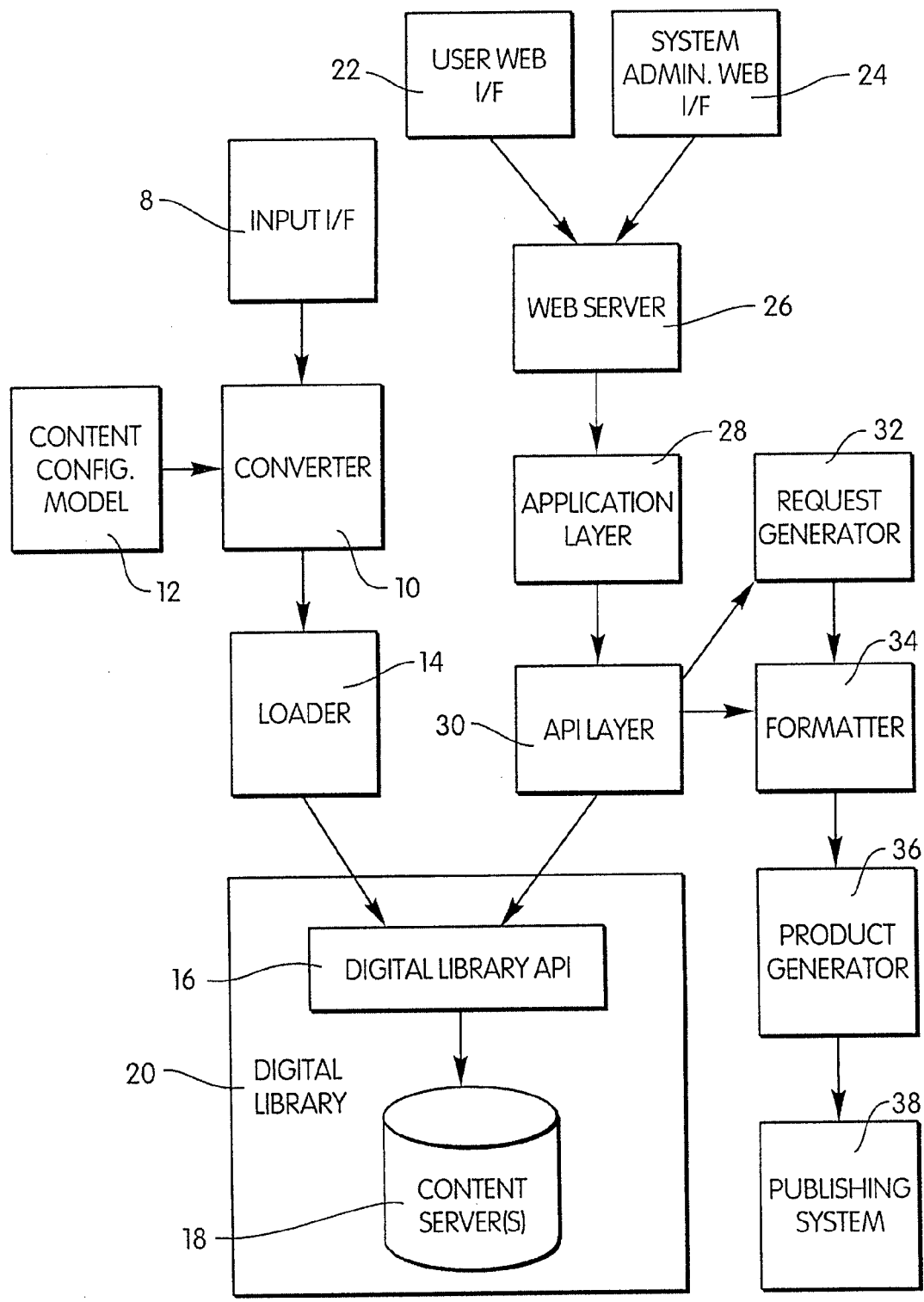
FIG. 1 is a block diagram representing the content management system according to the present invention.
Figure 2:
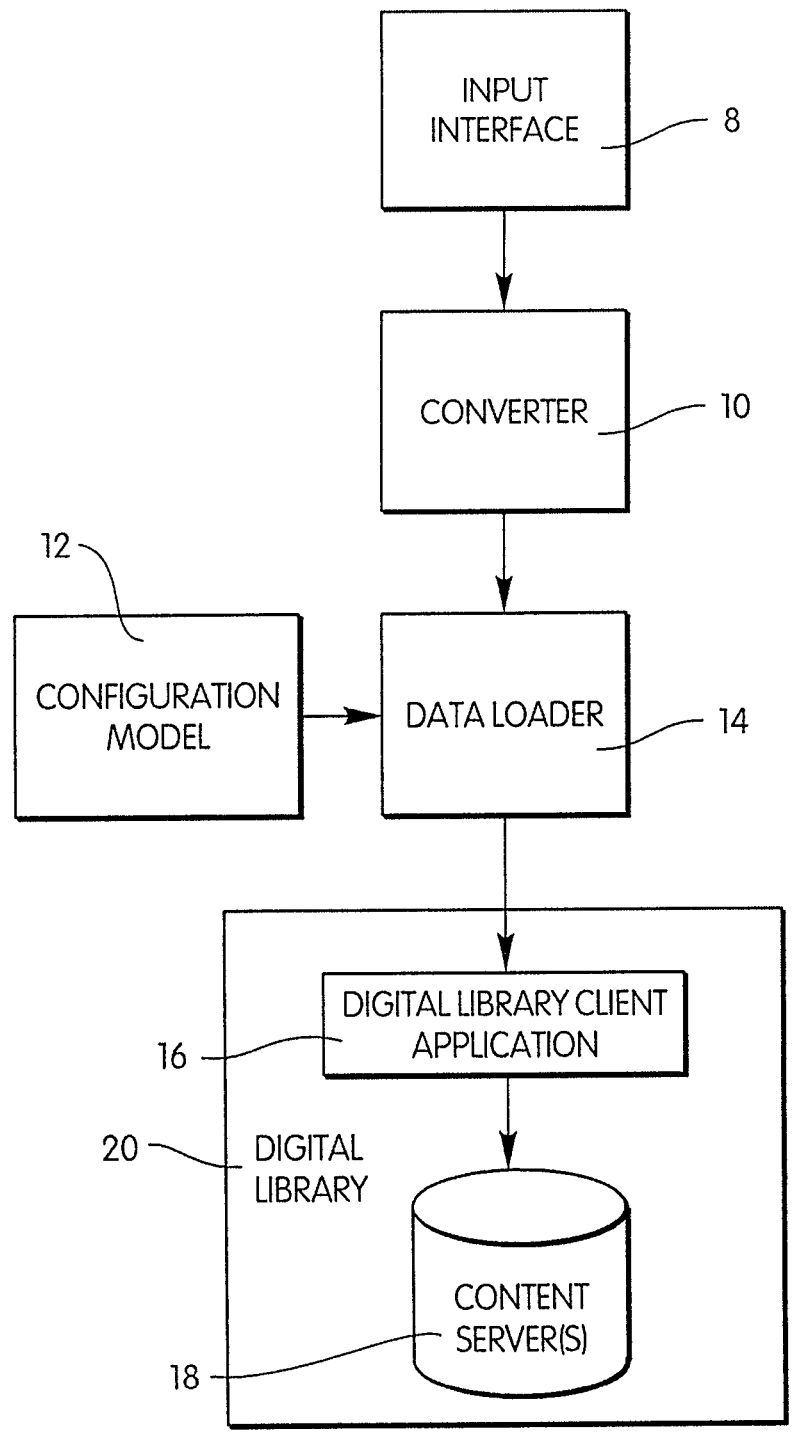
FIG. 2 is a block diagram representing the content input path of the present invention.

FIG. 1 functionally depicts a system for creating compilations of content. It comprises three parts: a path for inputting content to the data repository (FIG. 2), a path for enabling a user to select content and organization from the data repository through a web-based interface for inclusion in a compilation of content (FIG. 3), and a path that interfaces with a publishing system for creating the compilation of content from the user's specification (FIG. 2). Each path will be described in detail below.

The present invention will now be described in terms of a specific embodiment for creating custom textbooks. The intended user group comprises university professors, for example. The content stored in the system comprises a plurality of published textbooks, broken down into hierarchically related objects: book, volume, chapter and chapter subsection.

Using the proposed system in this context, a university professor is able to access content from a collection of textbooks stored in a digital library and select books, volumes, chapters and/or chapter subsections for inclusion in a custom textbook, and is further able to create content objects for inclusion in the final work.

Although the specific embodiment is provided to facilitate the reader's understanding, it will be understood that present invention is of a much broader scope and may be applied in the creation of compilations of all types of content including text, image, audio and video content.

A. Receiving and Storing Content

In the exemplary embodiment of the invention, content and other information is input to digital library 20 through the input data path shown in FIG. 2. Briefly, the content and other information is input by a user in at an input interface represented by block 8. In the preferred embodiment, the input content is provided in SGML format, although other formats may be supported if desired. The content is forwarded by input application 8 to a converter 10 for conversion into the format expected by data loader 14.

After reformatting, converter 10 outputs the reformatted content and other information to a loader application 14. Loader 14 receives and maps the data for storage in the data repository according to a configuration model 12. According to the present example, the data repository is a digital library 20, and the configuration model 12 is specific to the IBM DB2(R) Digital Library data storage model. Loader 14 interfaces with the digital library 20 through the digital library client application 16. Using the configuration model 12, the content loader 14 is able to map the content and other information it receives in a manner appropriate for the structure of the underlying digital library 20. However, the loader 14 of the present invention may be reconfigured for other types of data repositories by defining a configuration model 12 for each data repository used. Thus if the data repository type is later changed, the configuration file 12 can be updated to reconfigure the input path without having to reprogram the loader application 14.

The elements of the input path will now be described in greater detail.

1. Digital Library

Examples of digital libraries suitable for use in the present invention are described in commonly owned U.S. Pat. No. 5,787,413 entitled "C++ classes for a digital library" issued to Kauffman et al., and U.S Pat. No. 5,857,203 entitled "Method and apparatus for dividing, mapping and storing large digital objects in a client/server library system" also issued to Kauffman et al.

Figure 3:
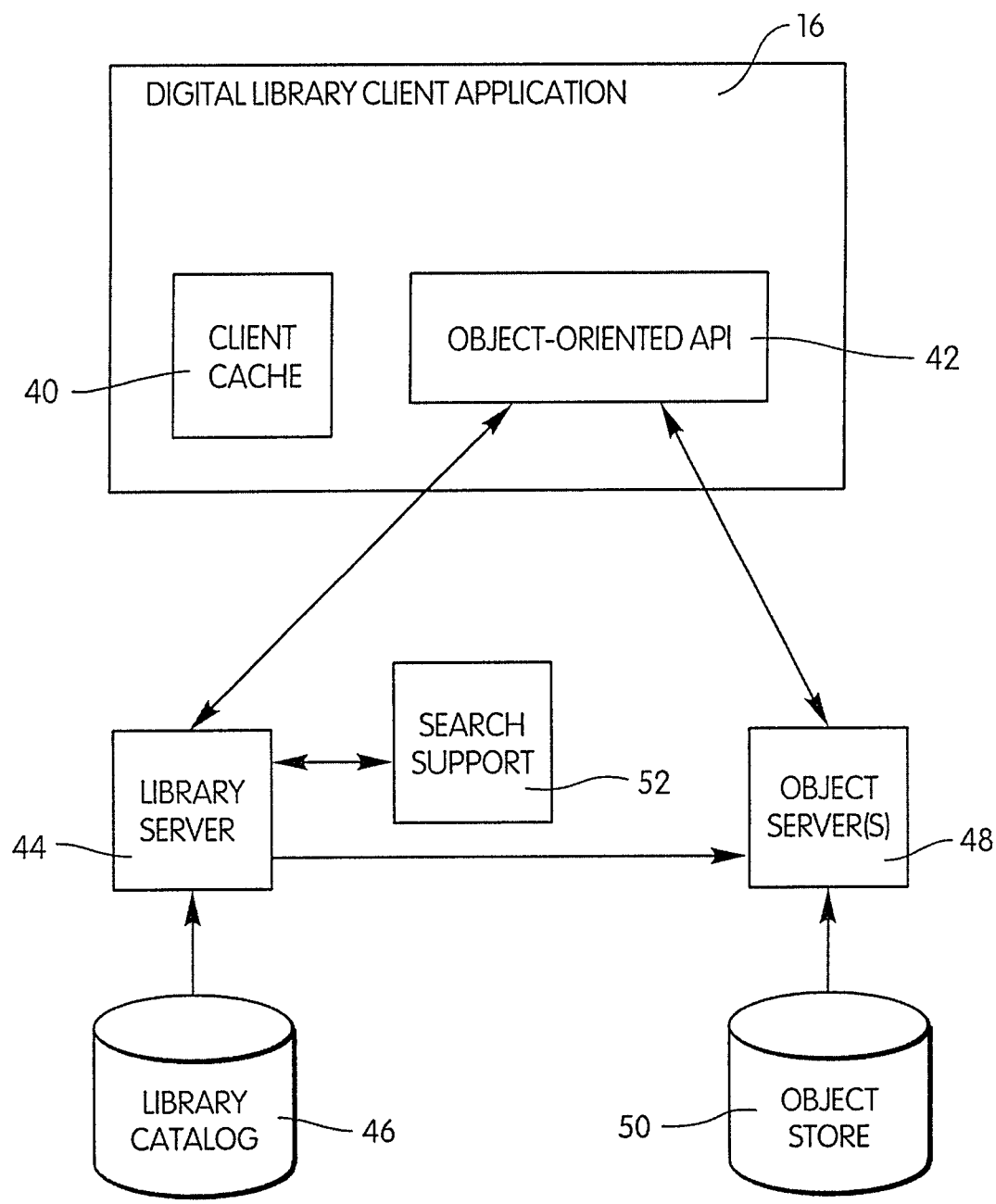
FIG. 3 is a block diagram representing a digital library suitable for practicing the present invention.

In the preferred embodiment of the present invention, the data repository comprises the commercially available IBM DB2 Digital Library. However, other commercially available data repositories may be used either in combination with, or in lieu of, the DB2 Digital Library Digital libraries are used to store and manage a wide variety of digital objects such as documents, graphics, audio, video, spread sheets and word-processing text. A conceptual view of a conventional digital library client/server system is shown in FIG. 3 and includes a library server 44, one or more object servers 48 and a library client 42. Each of the library and object servers and the library client includes an information store. That is, the library server 44 includes a library catalog 46, the is object server 48 includes an object store 50 and the library client 42 includes a client cache 40. The client applications interface to the digital library through an object-oriented API 16. Also, a communications isolator (not shown) is included which allows the library server 44, object server 48 and library client 42 to communicate with one another without concern for complex communications protocols.

The library server, object servers and library clients are connected by a communications network, such as a wide-area network (WAN), but also can be locally connected via a local area network (LAN). In the conventional library client/server system the library client 42 is typically embodied in a workstation, such as a personal computer, and the library server 44 and object servers 48 are typically embodied in a host processor: generally a mainframe computer environment such as a MVS/ESA environment running under CICS. The library server 44 uses a relational database such as the IBM DB2 Universal Database or the Oracle database as a library catalog 46 to manage digital objects and provide data integrity by maintaining index information and controlling access to objects stored on one or more object servers. Object servers can also use a relational database such as IBM DB2 or the Oracle database to manage their contents. Library servers and object servers run, for example, on AIX and Windows NT.

Library Server. The library server 44 directs requests from clients to update or query entries in the library catalog 46, which contains object indexes and descriptive information. Library server 44 additionally performs searches and routes requests to the appropriate object server 48 to store, retrieve, and update objects.

Each user is assigned a set of privileges for access to the library by a system administrator. Library server 44 checks library catalog 46 before processing a request to ensure that the user's name and password are valid, and to ensure that the user has been granted the appropriate privileges to perform the requested action. An example of a library privilege is the ability to delete objects. In typical implementations, there are groups of individuals who need access to the same objects. Therefore, to simplify the process of granting access to objects a system administrator can define patrons as members of a group. When a patron is defined as a member of a group, that patron is able to access any object for which the group has been granted privileges.

The library server 44 also checks to ensure that the object's owner has granted the patron the privileges needed to do what is requested (e.g., update the object). The owner of an object is the user who first stored the object. When an owner stores an object that owner must specify which other patrons are to have access to the object.

If a client request involves the storage, retrieval, or update of an object, library server 44 forwards the request to the object server 48 that contains or will store the object(s) referred to in the request based upon information provided by library catalog 46. If the client request is a query of the information stored in library catalog 46, library server 44 will interact only with the library catalog 46 and will not contact object server 20.

Library Catalog. The library catalog 46 is analogous to a conventional library's card catalog. It is a set of database virtual tables or index classes which contain an index of all the objects stored in the library system and the object servers owning them. Each row of these virtual tables or index classes references one or more stored objects. Implicitly, the first column of each index class contains a unique digital library item identifier (e.g., the IBM DB2 Digital Library ItemID) for the object referenced by its corresponding row. Other information stored in an index class may include textual descriptions for each object, information on the type of object (e.g., image object, spreadsheet, text document), user names and privileges, access authorization data for each object, links between objects, and an object's properties.

An item is a row in an index class and a part is a file within the object server 48 that is stored in an access managed directory structure. The management access of the directory structure is performed by the object server 48, but the directory structure responsibilities are performed by the operating system (i.e. AIX, NT, MVS).

Figure 4:
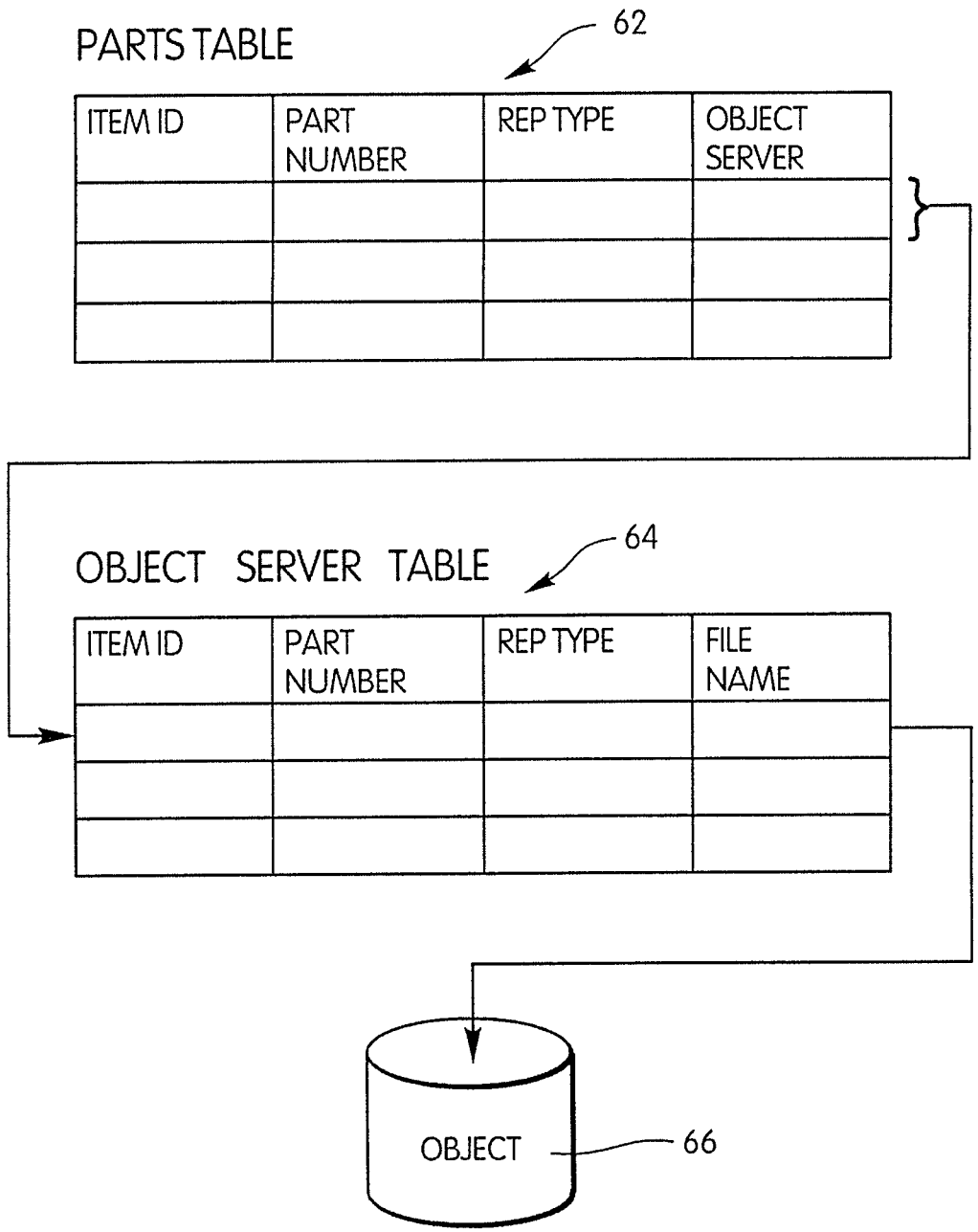
FIG. 4 graphically represents the structures for storing content parts in a digital library.
Figure 5:
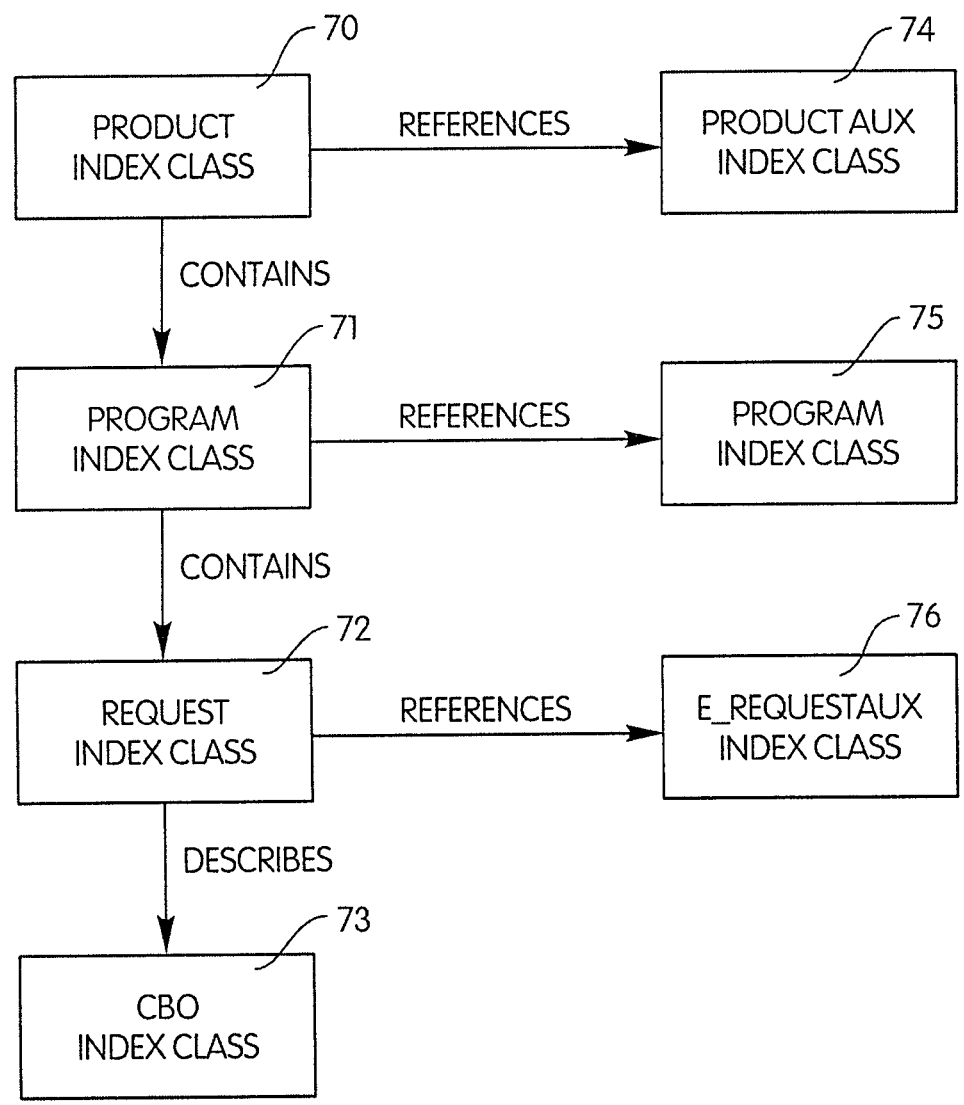
FIG. 5 graphically represents the index classes used in storing content in a digital library.

The library server 44 contains a parts table 62, as shown in FIG. 4, which resides in the library catalog 46. For each part or object in the library system, library server 44 stores information about that part. As shown in the parts table 62 in FIG. 4, the information stored for a part includes the item identifier (ItemID), a part number (PartID), a representation type (REP type) and an object server ID identifying which object server contains the object. In the presently described embodiment of the invention, the REP type is a default value (FRN$NULL).

When a part is stored in the conventional client/server library system 20, library server 44 assigns an item ID and a part number, which are 16 bytes and 4 bytes long, respectively. The item ID is a unique identifier for an item (i.e. row in the library server index class) to which the part belongs. For example, an item could represent a folder in which the part represents a document within that folder. Likewise, the part number is a unique identifier for that part.

The REP type field can be used to indicate the type or class in which the part is classified. For example, if the part is an image stored in a TIFF format, the REP type for that part could indicate that the part is a TIFF formatted image.

Object Servers. An object server 48 maintains objects stored within the library system. Objects are stored or retrieved from an object store 50 by object server 48. Object server 48 receives requests from library server 44 and communicates with library client 42 to complete the requests. Such a library system can contain several distributed object servers. Referring to FIGS. 3 and 4, the object server field in the library server's parts table 62 indicates the identifier for the object server 48 which owns the part. For example, if the part is stored on object store 50 of object server 48, the object server ID field will contain the identifier for object server 48.

Each object server 48 contains an object server table 64 as shown in FIG. 4. The object server 48 uses object server table 64 to manage storage of parts in its storage areas, such as the object store 50. Object server table 64 also contains the same item ID, part number and REP type for the part as does the library server parts table 62. The object server table also contains a file name for the part 66, which indicates the location in object store 50 of stored part 66.

When a user's privileges are defined a default object server can be set for that user. When the user stores an object, it will be stored in his default object server. If it is later determined that an object or a group of objects should be relocated to a different object server, a client application can cause those objects to be moved from one object server to another.

Library Client. The library client 42 is the interface through which application programs can submit requests to the library system. These can include requests to store objects, update/add descriptors to objects, delete objects and query information in the library catalog. Library requests can be submitted through the library client either individually or in batches.

The library client 42 includes a client cache 40 used to locally hold copies of objects that have been stored to or retrieved from the object server 48. These local copies allow very fast access to objects and provide a means for communicating between the library client 42 and the servers 44, 48.

Additional Search Support. IBM DB2 Digital Library includes parametric search support, and is integrated with text search support from the IBM Intelligent Miner for Text. The library server 44 may be further integrated with other search support 52. For example, image querying may be provided by IBM's Query by Image Content (QBIC) technology (see commonly owned U.S. Pat. No. 5,579,471 to Barber et al.).

In the present example for creating compilations of text, library server 44 is preferably coupled to the IBM Intelligent Miner for Text full text search support, allowing the user to automatically index, search, and retrieve documents based on a full text search. Text Miner allows users to locate documents by searching for words or phrases, abbreviations and acronyms, and proper names. In a typical LAN environment, a text search installation comprises one or more servers and several clients. The text search server program is installed on a machine with other Digital Library components. The text search client resides on client workstations and provides access to the server. Text search runs, for example, on AIX and Windows 95 and NT. In addition to the server and client components, text search uses dictionaries to support the linguistic processing of documents in different languages during indexing and retrieval. Dictionaries are installed on the server workstation, and at each client workstation.

Data Flow. Referring to FIGS. 3 and 4, when a requesting library client 42 requests an object, or blob, it sends a request to library server 44. Upon receipt of the request library server 44 consults the parts table 62, among other tables, in the library catalog 46 and determines which object server 48 owns and has the requested object stored in its object store 50. The request contains the item ID, part number and REP type of the requested part. Upon receiving the request, object server 48 retrieves the blob from object store 50 by consulting its object server table 64 and sends a copy of it to client 42. Object server 48 stores the blob in client cache 40. When the blob is successfully transmitted to client cache 40 object server 48 sends a response to library server 44 indicating a successful transfer of the blob to client cache 40. Library server 44, in turn, sends a response to requesting library client 42 indicating that the blob was successfully transferred, which allows the client 42 to retrieve the blob from client cache 40 for use by a client application.

When an application program submits a request for storage of an object in the library system, library client 42 creates a copy of the object in its client cache 40 to allow the appropriate object server 48 to retrieve the object. The library client then sends a storage request to library server 44. Included in the storage request is a handle to the object stored in the client cache 40. The handle is an identifier which is used to locate the object in the client cache.

Upon receiving the storage request, library server 44 updates tables in library catalog 46, including the parts table 62 shown in FIG. 4, to identify the object server 48 in which the object is to be stored. Typically, the object server 48 is selected by default based on the user's identity. Library server 44 then sends a request to object server 48 to retrieve the blob from the client cache 40 and store it in the object store 50. Included in the request is the handle of the object stored in client cache 40 and the item ID, part number and REP type of the part.

The object server 48, upon receiving the request to retrieve a copy of the object, retrieves the copy from client cache 40 and stores it in object store 50, then updates its object server table 64 accordingly to indicate a file name for the blob stored in object store 50. The file name uniquely identifies the location of the blob stored in object store 50.

Upon successfully storing a copy of the blob, object server 48 sends a response to library server 44 to notify it that the object was successfully stored. Library server 44 then updates its tables including the parts table 62 to indicate that the object is successfully stored in object server 48. The library server 44 sends a response to library client 42 indicating that the object was successfully stored so that the library client 42 can take further action based on the fact that the object was successfully stored in object store 50, such as deallocating memory resources for that object in client cache 32.

2. Data Model Definition

Storing content for use in creating a compilation of content first requires defining a Data Model, i.e., the constructs for mapping input content and other information in digital library 20. The data model is dependent on the constructs available within the underlying data repository. It is also defined by the nature of the content and information being input.

The content to be stored comprises products such as books, albums, images and videos. The content of each of these products may be organized hierarchically. For example, the hierarchy of a book may be defined by its volumes, chapters and chapter subsections. Since it is desired to create compilations of content from selected entities of these products, the content of the input products is partitioned into selectable entities. Information about the hierarchical relationship is also stored in the data repository. In the present example, other information to be stored includes user and content category definitions.

In the present example, the data repository is a digital library that includes a relational database, and the data model consists of entity groups defining the constructs in which the content is to be organized and stored within the relational database. Each entity group includes index class definitions, and may include part definitions. The parts store the actual content, and outlines describing the hierarchical relationship of the content entities. The index classes define relational tables for storing parametric attributes parametric (i.e. Integer, Float, Date, Time, String, Char, etc.) of the content, programs, and approval requests. The content index classes further include references to the parts containing them.

There are four entity groups in the present example: the Product Entity Group, the Program Entity Group, the CBO Entity Group and the Request Entity Group. The Product Entity Group defines the constructs for storing prepublished works or "products" in the digital library 20. These products provide the content from which a user can build a compilation of content. The Program Entity Group defines categories for content. In the present example these categories consist of academic programs. For example, "Freshman Engineering" is one program defined in the present example. The CBO Entity Group defines the constructs for storing a compilation of content. The Request Entity Group defines the constructs for storing information about requests for approval of compilations of content.

The following tables represent index class definitions, i.e., the meta definitions of the index classes. The rows within the figures define the columns of the index classes. For example, the Product_Aux index class contains 8 columns: SeqID, ProductItem, ParentItem, SiblingItem, ChildItem, Keyword, Value and NextValueItem.

Each primary index class contains a fixed number of columns. The columns of the index class definitions for the primary index classes define the primary index class column name (first column from the left), attribute type (second column), and source of the attribute value for each column of the index class (third column). In some cases, an attribute value is passed to digital library 20 by the loader 14 application, and the second column of the definition table is used to map the external attribute names to the internal digital library attribute names. In other cases, the attributes are program generated, as is indicated by the value "program generated" in column two. In the index class definition tables below, a fourth column has been added to each table to describe each column. It shall be understood, however, that this column is only provided to facilitate the reader's understanding and is not a part of the index class definitions.

The primary index class columns are restricted to single value attributes. Those columns that are multivalued or were not known when the system was first created are placed into the auxiliary index class.

The Program Index Class, Product Index Class and Request Index Class each have an associated auxiliary index class (ProgramAux Index Class, ProductAux Index Class, and RequestAux Index Class). Use of auxiliary index classes is generally understood by those skilled in the use of digital libraries. Each row within an auxiliary index class defines an additional (theoretical) column to a ROW in the corresponding primary index class (NOT to the entire primary index class). The column is theoretical in the sense that the digital library 20 does not handle auxiliary index class rows as additional columns in the primary index class. Rather, the API layer 30 provides the mapping mechanism to enable this theoretical column notion. Therefore users perceive these auxiliary index class rows as additional columns for a row, but in actuality they are stored as rows within the auxiliary index class. Theoretically, the primary index class appears as a table containing multiple rows and each row contains the columns defined in the primary index class definition plus those columns defined by rows in the auxiliary index class. In other words, these auxiliary index class columns (a.k.a. theoretical columns) are bound to a row within the primary index class and not the primary index class itself.

The manner in which an auxiliary index class defines theoretical columns on rows of a primary index class will now be described with reference to the Product Entity auxiliary index class. The ProductItem column (represented as a row in the auxiliary index class definition, below) contains the itemid, a unique identifier for each row in the primary index class. This column forms the linkage between a row within the auxiliary index class and the corresponding row of the primary index class.

The keyword column of the auxiliary index class (not to be confused with the Keyword column of the auxiliary index class definition) represents the name of the theoretical column to be added to a row of the primary index class. The current domain of theoretical primary index class column names appears in the Keywords column of the product auxiliary index class definition, below (2nd column from left). For example, one theoretical column name is Pub_Med_Type.

Note: In the present example, the domain is not restricted by the digital library 20 other than that the names must not exceed the length of the keyword column definition. Therefore, the domain of theoretical primary index class column names can be continuously enlarged by simply adding additional columns to the auxiliary index class.

The Value column contains the value for the theoretical column identified by the auxiliary index class Keyword column.

In addition to defining additional theoretical primary index class columns, the auxiliary index class can store multiple valued theoretical columns and hierarchical theoretical columns. Similar to theoretical single valued columns, theoretical multiple valued columns can be represented within a relational datastore model by using rows of an auxiliary index class. In the single valued column, only one row is necessary. In the multiple valued column, two or more rows are necessary (1 row for each value needing to be stored). Each value in the multiple valued column is ordered. This order is then used to chain multiple rows within the auxiliary index class together. Furthermore, the NextValueItem column contains the unique identifier of the auxiliary index class row which follows in the multivalued chain.

For example, if one wishes to store a multivalued column, First_Name with values: Fred and Barney and the auxiliary index class row containing Barney in the Value column has a unique identifier equal to ABC then the NextValueItem column for the row containing Fred in the Value column is ABC. Thus, the NextValueItem serves as the pointer to the next value in the multivalued chain.

The ParentItem, SiblingItem and ChildItem columns in the auxiliary index class are used to store hierarchical attributes of a row. Since a book's data model is hierarchical, the concept of hierarchical attribute storage/retrieval is crucial. The ParentItem column of a row in the auxiliary index class contains the unique identifier or itemid of another row in the auxiliary index class that holds a parent attribute of the current row. Similar to the multivalued columns, the children of a container are ordered (chained together). The unique identifier of the auxiliary index class row containing the proceeding child is stored in the SiblingItem field. A container's first child's unique identifier is stored in the ChildItem column of the container row, thereby constructing a link between the container and first child, first child and second child and all other children after.

For example, the AC_Group column in the product auxiliary index class is a hierarchical attribute. AC_Group contains child attributes: ACFORMID and NUMBERAC. This inheritance is identifiable by the tabbing of the terms in the keywords column of the figure. Each AC_Group attribute contains an ACFORMID and NUMBERAC. Therefore the AC_Group is a kind of container.

This attribute family is represented by three rows within the auxiliary index class: one representing an AC_Group, one representing the ACFORMID and one representing the NUMBERAC. The parentItem column for the AC_Group row is blank to indicate that it is a parent attribute, whereas the parentItem column for the ACFORMID and NUMBERAC rows contains the unique identifier of the AC_Group row. The ChildItem column of the AC_Group contains the unique identifier of the ACFORMID row. The SiblingItem column for the ACFORMID contains the unique identifier of the NUMBERAC row. The NUMBERAC row's SiblingItem is left blank representing the last child of AC_Group.

The Product and CBO Entity Groups are associated with Part definitions, since these entities define constructs for storing content in the digital library 20.

Product Entity Group

The Product Entity Group includes two index classes: Product Index Class and ProductAux (Auxiliary) Index Class. These index classes define the storage model for existing content products and their associated attributes to be stored. More specifically, they are used to generate a Product Index class in a relational database representing the content products, and the parts containing the actual content, prerequisite material and hierarchical product outline.

"Product" in this context refers to an existing content product such as a book, album or video. Since users will be selecting excerpts of existing content products to include in a compilation of content, each content product is stored as a group of hierarchically related entities. Entities at each hierarchical level of the work except the lowest is defined by containers. In the present example, the containers are "book", "volume", and "chapter". Each container is described by the subentities or "content entities" it contains. For example, each "book.c" container includes references to all chapters denoted by the keyword, "chapter.c", contained in that textbook product. Similarly, each "chapter.c" container includes references to all sections contained in that chapter. The lowest level of the hierarchy is a "section". All three entities (book.c, chapter.c and section) are described by a unique sequence identifier. Each entity is represented by a row in the Product Index class Product Index Class The product index class defines a relational Product Index Class that is populated with a row for each content entity. Thus for textbook products the resulting product index class includes a row for each book, volume, chapter and section. In addition, each associated component for an entity is also represented by a row in the index class This index class is used as a quick reference for obtaining attribute information about each product entity, as well as a reference to the actual part numbers containing the product files.

Each product entity is assigned a unique identifier or sequence ID. Preferably, the sequence identifier further includes intrinsic information about the hierarchical level of the entity. To illustrate, the sequence ID used to represent textbook components is in the following form:

XXXXXXXXXX.CC.SS where XXXXXXXXXX represents a book's ISBN (International Standard Book Number?), CC represents the chapter number (if any) and SS represents the section number (if any). The CC and SS portions of a book entity sequence identifier will be zeroes. Similarly, the SS portion of a chapter entity sequence identifier will be zero. Thus the sequence number of a container serves as a reference to the subentities of that container, since all subentities will share the same ISBN and container reference number. For leaf entities, the sequence number is used as a reference to the entity's actual content in the data repository.

| Index Class Attribute Name | ATR Mapping | Type | Description |
| --- | --- | --- | --- |
| SeqID | Seq_ID | Ext . . . Alpha [32] INDEXED | Unique sequence identifier for product entity |
| EntityType | PSF | Ext . . . Alpha [32] | Entity type, e.g., book, chapter, section |
| ParentItem | Program generated | Ext . . . Alpha [16] | Unique internal ID of any parent entity (e.g. For a section entity, the parent would be its chapter container) |
| SiblingItem | Program generated | Ext . . . Alpha [16] | Unique internal ID of the next sibling entity (e.g. For a section entity, the siblings would be other sections of the same chapter. |
| ChildItem | Program generated | Ext . . . Alpha [16] | Unique internal ID of the first child entity (e.g. a chapter entity's children would be the sections it contains. |
| AuxItem | Program generated | Ext . . . Alpha [16] | Reference to first entry in the auxiliary table for this entity |

| Index Class Attribute Name | ATR Mapping | Type | Description |
|---|---|---|---|
| ProgramID | PE_ID<br>AC_PE_ID | Alpha [4] | Identifier of Program to which the product belongs |
| Status | Status (SGML)<br>AC_Status (AC) | Alpha [1] | Indicates if entity is available for browse, search or use in a CBO |
| Title | Title<br>AC_Title | Alpha [250] | Entity title |
| Subtitle | Subtitle<br>AC_Subtitle | Alpha [250] | Entity subtitle, if any |
| ISBN | ISBN<br>AC_ISBN | Alpha [10] | Product ISBN |
| CDAOID☐ | CDAOID<br>AC_CDAOID | Ext. Alpha [8] | Associated component attribute |
| YearOfPub | Yr_of_Pub<br>AC_Yr_of_Pub | Numeric [1] | * |
| Edition | Edition<br>AC_Edition | Ext. Alpha [2] | * |
| Revision | Revision<br>AC_Revision | Alpha [2] | * |
| Version | Content_Ver<br>AC_Content_Ver | Ext. Alpha [8] | * |
| PubMediaType | | Ext. Alpha [20] | Media type, e.g., compact disk |
| ContentType | Content_Type<br>AC_Content_Type | Ext. Alpha [8] | Content type, e.g., SGML |
| ContentFilename | Filename<br>AC_Graphic_Filename | Ext. Alpha [254] | Name of file containing the entity's content |
| ImageType | AC_Image_Type | Ext. Alpha [8] | Type of image, e.g., TIF. |
| CharCount | SGML_Char_Cnt | Numeric [8] | Number of non-markup characters in content (used to calculate CBO price) |
| AC_Image_Count | AC_Image_Cnt | Numeric [3] | Number of associated component images in content |
| AvailabilityDate | Date_of_Availability<br>AC_Date_of_Availability | Ext. Alpha [10] | Date entity is available for use |
| ExpirationDate | Date_of_Expiration<br>AC_Date_of_Expiration | Ext. Alpha [10] | Date entity is no longer available for use |
| CreateDate | Create_Date<br>AC_Create_Date | Ext. Alpha [14] | Date that table entry was created |
| CreatedBy | Created_By<br>AC_CreatedBy | Alpha [8] | Identifier of user who created entry |
| LastModifiedDate | Last_Modified_Date<br>AC_Last_Modified_Date | Ext. Alpha [14] | Last date entry was modified |
| LastModifiedBy | Last_Modified_By<br>AC_LastModifiedBy | Alpha [8] | Identifier of user who last modified entry |
| PageCount | PageCount | Alpha [6] | Actual page count of content (used in CBO pricing formula) |

Part Structures & Text Indices

This table defines the digital library parts used to store each entity. For a row that represents a product entity, Part 1 contains the SGML content for a product entity. Parts 5-11 are parts containing subsets of that content that can be searched by Text Miner. The Text Index column contains the Text Miner indices for each of these searchable subsets. For a row that represents an entity's associated component, Part 20 contains the actual associated component file. (e.g., images).

| Part No. | Description | Text Index |
|---|---|---|
| 1 | Content | None |
| 5 | Authored Abstract | EABSTRAC |
| 6 | Generated Abstract | EABSTRAC |
| 7 | Index Terms | EIXTERMS |
| 8 | Key Terms | EIXTERMS |
| 9 | Entity Structure Part | None |
| 10 | Teaching Concepts | ETEACHCO |
| 11 | Concepts Topics | ETOPICS |
| 20 | Associated Component | None |

ProductAux Index Class

In the present example, the auxiliary index class is used to define additional columns in specified rows of the Product Index class Specifically, each label in the Keywords column corresponding to the Keyword attribute defines the name of an additional column in the Product Index class The "value" attribute is the attribute type for each of these keywords. Indentations represent nested keywords. The SeqID, ProductItem, ParentItem, SiblingItem and ChildItem attributes specify the rows in the auxiliary Product Index class for storing hierarchical values. In the present example, "Index_Term" is an example of a multi-valued attribute, meaning that there may be more than one index term defined for each program entity. For performance reasons, the values of a multivalued attribute may be stored in separate rows of the Product Index class Thus The "Next ValueItem" attribute identifies the row of the next item in a set of attribute values. Multivalued attributes are structured as linked lists when loaded into digital library 20, and this order is maintained in the auxiliary Product Index class

| Index Class Attribute Name | Keywords | Type | Description |
|---|---|---|---|
| SeqID | PSF | Ext. Alpha [32] | Sequence ID of entity that this attribute belongs to |
| ProductItem | Program generated | Ext. Alpha [16] | Unique internal ID of the product index class row that this attribute belongs to |
| ParentItem | Program generated | Ext. Alpha [16] | Unique internal ID of the auxiliary product index class row that is this attribute's parent attribute |
| SiblingItem | Program generated | Ext. Alpha [16] | Unique internal ID of the auxiliary product index class row that is this attribute's next sibling attribute |
| ChildItem | Program generated | Ext. Alpha [16] | Unique internal ID of the auxiliary product index class row that is the first child attribute for this attribute |
| Keyword | Pub_Med_Type | Alpha [32] | Media type (e.g., compact disk, audio tape, paper, etc.) |
| | AC_Counts | | AC (Associated Component) attribute group |
| | ACFORMID | | AC type. |
| | NUMBERAC | | The number for each AC type. |
| | Index_Term | | Index term in a product entity |
| | Key_Term | | Key term in a product entity |
| | Contrib_Group<br>Contrib_Role<br>Contrib_Title<br>Contrib_First_Name<br>Contrib_Middle_Name<br>Contrib_Last_Name<br>Contrib_Suffix<br>Job_Title<br>Contrib_Affiliation<br>Contrib_Credentials | | This group defines properties re: one contributing author of a prepublished book. Since a book can have multiple contributors, more than one contrib_group of properties can exist for that book. |
| | Use_Actuals | | Switch variable to determine if actual or estimated page count is to be used in calculating price. |
| Value | Value depends on specific attribute keyword above | Ext. Alpha [254] | Actual value for the keyword above |
| NextValueItem | Program generated | Ext. Alpha [16] | Unique ID of the auxiliary product index class row that is the next value in a multi-valued attribute. |

Program Entity Group

It is sometimes desirable to categorize users and content to facilitate the creation of a compilation. For example, a system user who wishes to compile an album of classical music is not interested in viewing selections from a country music album. Audio content may therefore be categorized according to music type. The user may also be assigned to a particular category, either by default or by personal selection. In a system for creating custom textbooks, subsets are organized according to particular programs or disciplines. For example, prepublished textbooks may be assigned to categories such as Engineering, Mathematics, English, and so on. In the present example, these categories have been defined even more narrowly: Freshman Engineering, Sophomore Engineering, etc.

A Program Entity Group is used to define categories or "programs" to which users and prepublished content can be assigned.

Program Index Class

The Program Index Class definition below defines a Program Index Class or Program Index class that is populated with a row for each user/content category. This index class is used as a quick reference for obtaining attribute information about each program.

| Index Class Attribute Name | ATR Mapping | Type | Description |
|---|---|---|---|
| Program_ID | PE_Program_ID | Alpha [4] INDEXED | Program identifier, e.g. "FE" is the identifier for "Freshman Engineering" |
| EntityType | PSF | Ext. Alpha [32] | Used when programs are nested to define hierarchical level of each program entity |
| ParentItem | Program generated | Ext...Alpha [16] | Supporting hierarchical or "parent" programs |
| Title | PE_Title | Alpha [250] | Program Title |
| Subtitle | PE_Subtitle | Alpha [250] | Program subtitle, if any |
| AvgChrPerImage | PE_AC_Avg_Image_Bytes | Numeric [6] | Average characters per image for products within this program |
| AvgChrPerSGMLAC | PE_AC_Avg_SGML_Bytes | Numeric [6] | Average characters per SGML associated component for products within this program |
| MaxChrPerUPMTier | PE_Chars_Per_UPM_Tier | Numeric [6] | Maximum number of characters allowed for a UPM in this program |
| Status | PE_Status | Alpha [1] | Status indicating whether program entity is currently valid/invalid |
| CreateDate | PE_CreateDate | Ext...Alpha [14] | Date table entry created |
| CreateBy | PE_CreateBy | Alpha [8] | Identifier of user who created entry |
| LastModifiedDate | PE_LastModifiedDate | Ext...Alpha [14] | Date entry was last modified |
| LastModifiedBy | PE_LastModifiedBy | Alpha [8] | Identifier of user who last modified entry |
| SiblingItem | Program generated | Ext...Alpha [16] | Related sibling programs providing support for hierarchical programs. |
| ChildItem | Program generated | Ext...Alpha [16] | Related child programs, if any, providing support for hierarchical programs. |
| AuxItem | Program generated | Ext...Alpha [16] | Reference to auxiliary table |
| SeqID | PSF | Ext. Alpha [32] | Unique program identifier, e.g., "FE" for "Freshman Engineering" |

ProgramAux Index Class

| Index Class Attribute Name | Keywords | Type | Description |
|---|---|---|---|
| SeqID | PSF | Ext. Alpha [32] | Unique identifier (i.e., Sequence ID) of this row. |
| ProgramItem | Program generated | Ext...Alpha [16] | Unique internal ID of row within auxiliary program index class that this attribute belongs to |
| ParentItem | Program generated | Ext...Alpha [16] | Unique internal ID of row within auxiliary program index class that this attribute's parent attribute belongs to |
| SiblingItem | Program generated | Ext...Alpha [16] | Unique internal ID of row within auxiliary program index that this attribute's next sibling attribute belongs to |
| ChildItem | Program generated | Ext...Alpha [16] | Unique internal ID of row within auxiliary program index that the first child attribute for this attribute belongs to |
| Keyword | PE_Req_Count | Alpha [32] | The next available unique identifier for a request |
| | PE_AC_Group | | This group defines associated component attributes used in the pricing formula |
| | PE_AC_FormID | | AC type |
| | PE_AC_ByteCount | | Number of "characters" for that AC type |
| | PE_Price_Group | | This group defines more attributes used in pricing formula |

-continued

| Index Class Attribute Name | Keywords | Type | Description |
|---|---|---|---|
| | PE_Country | | Country |
| | PE_Monetary_Unit | | Monetary unit |
| | PE_Min_Order_Price | | Minimum order price |
| | PE_Base_Cust_Pub_Price | | Base price added to every custom publication |
| | PE_Base_UPM_Fee | | Base price added when UPM is included |
| | PE_Incr_UPM_Fee | | Additional price per UPM pricing block |
| | PE_Source_Price_Per_Page | | Price per page for prepublished content included |
| | PE_UPM_Bytes_Per_Page | | Number of UPM characters in a page |
| | PE_Minimum_Page_Limit | | Minimum number of pages required in a custom publication |
| | PE_Volume_Page_Limit | | Maximum number of pages in a volume |
| Value | Value depends on specific attribute keyword above | Ext. Alph [254] | |
| NextValueItem | Program Generated | Ext...Alpha [16] | Unique internal ID of row within auxiliary program index representing the next value of a multi-valued attribute. |

CustomBookOutline Index Class

The CustomBookOutline Index Class defines a relational CBO Index Class that includes a row for each compilation of content created. Each row further includes a reference to a part containing a road map or outline of the compilation of content. The index class is used as a quick reference for obtaining attribute information about a compilation, as well as for locating the corresponding part numbers. Again, the attributes are a matter of design choice.

| Index Class Attribute Name | Source | Type | Description |
|---|---|---|---|
| ProgramID | Web application | Ext. Alpha [4] | Program identifier |
| CBOTitle | Web application | Alpha [120] | Custom book title |
| ApprovalStatus | Program generated | Alpha [1] | Approval status, i.e., active, submitted, approved, rejected or printed |
| UPMCharCount | Program generated | Alpha [8] | Character count of any user-provided content |
| RightsFee | Program generated | Alpha [8] | License fee |
| SGMLPageEstimate | Program generated | Alpha [4] | Estimated page count for SGML content |
| TotalPageEstimate | Program generated | Alpha [4] | Estimaged total page count |
| PriceEstimate | Program generated | Alpha [8] | Estimated price |
| ISBN | Program generated | Alpha [10] | Unique ISBN assigned to the custom book at submission time. |
| CreatorID | Program generated | Alpha [20] | Creator's unique identifier |
| CreatorTS | Program generated | Alpha [14] | Timestamp representing time of current edit |
| LastModifiedTS | Program generated | Alpha [14] | Timestamp representing time last modified |
| CBOTerms | Program generated | Ext. Alpha [32] | Name of file containing terms and conditions that will apply to custom book? |
| ActiveCBOPartID | Program generated | Alpha [3] | Part number of active custom book |

| Index Class Attribute Name | Source | Type | Description |
|---|---|---|---|
| LastUPMPartID | Program generated | Alpha [3] | Part number of the last user-provided material added |

Part Structures & Text Indices

The part definition describes the parts associated with each compilation. In the present example, three parts are defined: part 1 initially containing the custom book outline, part 2 initially containing a backup copy of the custom book outline for use in undo operations, and parts numbered 50 or higher containing user provided material (UPM). (Note: After undo, part 2 becomes the active CBO, and part 1 is the backup. The attribute value of "ActiveCBOPartID" indicates which is of these is currently the active part.) The first UPM added to a custom book is assigned to part 50, the second UPM added is assigned part 51, and so on. The last UPM part number assigned is stored in the CBO Index class defined above and serves two functions. It is a value that is retrieved and incremented each time new UPM is added. In addition, it serves as an indicator of how many parts the custom book currently contains.

| Part No. | Description | Text Index |
|---|---|---|
| 1 | Part number for Active/Inactive CBO | None |
| 2 | Part number for Active/Inactive CBO | None |
| 50+ | Part numbers for user-provided content | None |

Request Entity Group

Whenever a compilation of content is submitted for publication, the Request Entity Group is used to generate an entry in a Request index class corresponding to the submission request. A unique ISBN is assigned to the CBO once it has been approved for publishing. Attributes are a matter of design choice. In the present example, they describe useful information about the custom book such as its unique identifier, author, approval status, price, etc.

Request Index Class

| Index Class Attribute Name | Source | Type | Description |
|---|---|---|---|
| CBOID | Program generated | Ext. Alpha [20] | Unique CBO identifier assigned at submission time |
| Userid | Program generated | Ext. Alpha [20] | Author |
| ApprovalStatus | Program generated | Alpha [1] | CBO state in the process<br>0 - Active<br>1 - Submitted<br>2 - Approved<br>3 - Rejected<br>4 - Printed |
| TotalPrice | Program generated | Numeric [9] | Price of custom book |
| QtyStudentCopies | Web application | Numeric [4] | Number of student copies requested |
| QtyDeskCopies | Web application | Numeric [2] | Number of desk copies requested |
| QtySupplements | Web application | Numeric [2] | Number of books to be used as supplements |
| NeedByDate | Web application | Ext. Alpha [10] | Date needed by |
| TermStartDate | Web application | Ext. Alpha [10] | Start date of the school term for which this CBO is created |
| TermName | Web application | Ext. Alpha [20] | E.g., Spring, Fall |
| University | Web application | Ext. Alpha [100] | University name, e.g., Stanford University |
| Department | Web application | Ext. Alpha [100] | Department name, e.g., Electrical Engineering |
| ClassName | Web application | Ext. Alpha [128] | Class name, e.g., Engineering Basics |
| ClassNumber | Web application | Ext. Alpha [12] | Class number |
| CourseNumber | Web application | Ext. Alpha [12] | Course number, e.g., 101 |
| ShipToNameTitle | Web application | Ext. Alpha [12] | * |
| ShipToFirstName | Web application | Ext. Alpha [40] | * |
| ShipToLastName | Web application | Ext. Alpha [40] | * |
| ShipToAddrLine1 | Web application | Ext. Alpha [40] | * |
| ShipToAddrLine2 | Web application | Ext. Alpha [40] | * |
| ShipToAddrLine3 | Web application | Ext. Alpha [40] | * |
| ShipToCity | Web application | Ext. Alpha [40] | * |
| ShipToState | Web application | Ext. Alpha [20] | * |
| ShipToCountry | Web application | Ext. Alpha [20] | * |
| ShipToPostalCode | Web application | Ext. Alpha [20] | * |
| PackageISBN | Program generated | Alpha [10] | The ISBN assigned to the entire book. This may be different from the ISBN's assigned to volumes within the book. |
| CreateTS | Program generated | Alpha [14] | Time entry created |
| RequestID | Program generated | Ext. Alpha [16] | Unique request identifier |

* Self-explanatory

RequestAux Index Class

The RequestAux Index Class is used in the present example to add additional columns to designated rows of the Request Index class when a CBO contains more than one volume. More specifically, if greater than one volume exists, the CBO and each volume it contains are each assigned a unique ISBN, and the Volume, VolumeISBN and VolumeID columns are added to the row representing the submission request. The RequestItem, ParentItem, SiblingItem and ChildItem attributes are used to identify the row to which these columns are added.

| Index Class Attribute Name | Source | Type | Description |
|---|---|---|---|
| RequestItem | Program generated | Ext. Alpha [16] | Unique internal ID of row within request index class of entity that this attribute belongs to |
| ParentItem | Program generated | Ext. Alpha [16] | Unique internal ID of row within auxiliary request index class of entity that is this attribute's parent |
| SiblingItem | Program generated | Ext. Alpha [16] | Unique internal ID of row within auxiliary request index class of entity that is this attribute's next sibling (siblings are ordered) |
| ChildItem | Program generated | Ext. Alpha [16] | Unique internal ID of row within auxiliary request index class of entity that is this attribute's first child (children are ordered). |
| Keyword | Volume | Alpha [32] | The parent attribute of the volume information. |
| | VolumeISBN | | The child attribute of Volume which stores the ISBN of the volume. |
| | VolumeID | | unique internal ID of row within request index class of volume entity corresponding to this volume. |
| Value | Program generated | Ext. Alpha [254] | |
| NextValueItem | Program generated | Ext. Alpha [16] | Unique internal ID of row within auxiliary request index representing the next value of a multi valued attribute. |

Login/Registration Database Model

The Users Table simply defines a relational table for storing user information. The fourth column represents if this is a primary key field and the fifth column represents if this is a foreign key field.

| | USERS Table | | | |
|---|---|---|---|---|
| Table Column Name | Table Column Datatype | Table Column Null Option | Table Column Is PK | Table Column Is FK |
| USER_ID | VARCHAR2(30) | NOT NULL | Yes | No |
| DEPT_UD_ID | NUMBER(8) | NULL | No | No |
| UNIV_UD_ID | NUMBER(8) | NULL | No | No |
| DEPARTMENT_ID | NUMBER(8) | NULL | No | No |
| UNIV_ID | NUMBER(8) | NULL | No | No |
| USERNAME | VARCHAR2(30) | NOT NULL | No | No |
| PASSWORD | VARCHAR2(30) | NOT NULL | No | No |
| TITLE | VARCHAR2(100) | NULL | No | No |
| FIRST_NAME | VARCHAR2(30) | NULL | No | No |
| LAST_NAME | VARCHAR2(30) | NULL | No | No |
| ADDRESS1 | VARCHAR2(80) | NULL | No | No |
| ADDRESS2 | VARCHAR2(80) | NULL | No | No |
| ADDRESS3 | VARCHAR2(80) | NULL | No | No |
| CITY | VARCHAR2(50) | NULL | No | No |
| STATE | VARCHAR2(2) | NULL | No | No |
| ZIP | VARCHAR2(10) | NULL | No | No |
| COUNTRY | VARCHAR2(50) | NULL | No | No |
| PHONE | VARCHAR2(15) | NULL | No | No |
| EMAIL | VARCHAR2(80) | NOT NULL | No | No |
| CHALLENGE | VARCHAR2(255) | NOT NULL | No | No |
| RESPONSE | VARCHAR2(255) | NOT NULL | No | No |
| SECURITY | CHAR(1) | NOT NULL | No | No |
| TIMESTAMP | DATE | NULL | No | No |
| CBO_ID | VARCHAR2(64) | NULL | No | No |

USER_CBOS Table
The USER_CBOS table enables a user to have more than one active CBO at a time.

| Table Column Name | Table Column Datatype | Table Column Null Option | Table Column Is PK | Table Column Is FK |
|---|---|---|---|---|
| USER_ID | NUMBER(8) | NOT NULL | Yes | No |
| CBO | VARCHAR2(100) | NULL | No | No |
| TIMESTAMP | DATE | NULL | No | No |

3. Input Interface

An interface 8 is provided to the user for entering information to be stored in digital library 20. Information includes Program categories and prepublished content. The interface can be in a variety of forms, but it must be able to communicate with an OO Api layer 30 which is in the present embodiment comprises a C dll. The interface 8 of the present embodiment is a web based solution consisting of 22, 24, 26 and 28. Alternatively, application code 28 may provide the same function.

In the present example, each prepublished content product is input as one SGML file. The hierarchical levels within that SGML file are discernible by their delimiting tag types. Program information is provided as a field identifying the program for each prepublished content product. The program configuration information is defined in PSF/ATR files and loaded into the datastore using the loader 10.

4. Converter

Converter 10 receives the SGML files and uses the delimiting tags to separate the product entities and associated components. It also builds a file defining the hierarchical relationships of these entities and components, and extracts relevant product attributes. In the present example, the resulting files include four possible file types: a Product Structure File (PSF), Attribute Files (ATR), Content Component Files and Associated Component Files.

Product Structure Files (PSF). For content, the Product Structure File provides a hierarchical outline of the contents in a prepublished product. More specifically, it is a parsable formatted file listing all of the entities making up a content product (e.g., a book container, volume containers, chapter containers and sections, each identified by its sequence identifier). This file is used as a road map (i.e., a list or table of contents) defining the content, order and hierarchical structure of the prepublished product, thereby relating a product's separately stored content entities. It is stored as a part in digital library 20. An example of a PSF file for a content product is shown below:

```
PRODUCT.C:0130808598.00.00.00
    FRONT_AND_BACK_ELEMENT:0130808598.01.01.00
    FRONT_AND_BACK_ELEMENT:0130808598.01.02.00
    FRONT_AND_BACK_ELEMENT:0130808598.01.03.00
    FRONT_AND_BACK_ELEMENT:0130808598.01.04.00
    CHAPTER.C:0130808598.02.00.00
        FRONT_AND_BACK_ELEMENT:0130808598.02.01.00
        SECTION:0130808598.02.02.00
        SECTION:0130808598.02.03.00
        SECTION:0130808598.02.04.00
        SECTION:0130808598.02.05.00
        SECTION:0130808598.02.06.00
        FRONT_AND_BACK_ELEMENT:0130808598.02.07.00
    CHAPTER.C:0130808598.03.00.00
        FRONT_AND_BACK_ELEMENT:0130808598.03.01.00
        SECTION:0130808598.03.02.00
        SECTION:0130808598.03.03.00
        SECTION:0130808598.03.04.00
        SECTION:0130808598.03.05.00
        SECTION:0130808598.03.06.00
        FRONT_AND_BACK_ELEMENT:0130808598.03.07.00
    CHAPTER.C:0130808598.04.00.00
        FRONT_AND_BACK_ELEMENT:0130808598.04.01.00
        SECTION:0130808598.04.02.00
        SECTION:0130808598.04.03.00
        SECTION:0130808598.04.04.00
        SECTION:0130808598.04.05.00
        FRONT_AND_BACK_ELEMENT:0130808598.04.06.00
    CHAPTER.C:0130808598.05.00.00
        FRONT_AND_BACK_ELEMENT:0130808598.05.01.00
        SECTION:0130808598.05.02.00
        SECTION:0130808598.05.03.00
        SECTION:0130808598.05.04.00
        SECTION:0130808598.05.05.00
        SECTION:0130808598.05.06.00
        FRONT_AND_BACK_ELEMENT:0130808598.05.07.00
    CHAPTER.C:0130808598.06.00.00
        FRONT_AND_BACK_ELEMENT:0130808598.06.01.00
        SECTION:0130808598.06.02.00
        SECTION:0130808598.06.03.00
```

-continued

```
        SECTION:0130808598.06.04.00
        SECTION:0130808598.06.05.00
        SECTION:0130808598.06.06.00
        SECTION:0130808598.06.07.00
        SECTION:0130808598.06.08.00
        FRONT_AND_BACK_ELEMENT:0130808598.06.09.00
    CHAPTER.C:0130808598.07.00.00
        FRONT_AND_BACK_ELEMENT:0130808598.07.01.00
        SECTION:0130808598.07.02.00
        SECTION:0130808598.07.03.00
        SECTION:0130808598.07.04.00
        SECTION:0130808598.07.05.00
        FRONT_AND_BACK_ELEMENT:0130808598.07.06.00
    CHAPTER.C:0130808598.08.00.00
        FRONT_AND_BACK_ELEMENT:0130808598.08.01.00
        SECTION:0130808598.08.02.00
        SECTION:0130808598.08.03.00
        FRONT_AND_BACK_ELEMENT:0130808598.08.04.00
    CHAPTER.C:0130808598.09.00.00
        FRONT_AND_BACK_ELEMENT:0130808598.09.01.00
        SECTION:0130808598.09.02.00
        FRONT_AND_BACK_ELEMENT:0130808598.09.03.00
    CHAPTER.C:0130808598.10.00.00
        FRONT_AND_BACK_ELEMENT:0130808598.10.01.00
        SECTION:0130808598.10.02.00
        SECTION:0130808598.10.03.00
        FRONT_AND_BACK_ELEMENT:0130808598.10.04.00
    CHAPTER.C:0130808598.11.00.00
        FRONT_AND_BACK_ELEMENT:0130808598.11.01.00
        SECTION:0130808598.11.02.00
        SECTION:0130808598.11.03.00
        FRONT_AND_BACK_ELEMENT:0130808598.11.04.00
    FRONT_AND_BACK_ELEMENT:0130808598.12.01.00
```

For program categories, the PSF file contains the unique program identifier. As an example, the contents of a PSF file for the "Freshman Engineering" program is shown below:

PROGRAM:fe

Attribute Files (ATR). Attribute files contain metadata about each program or product entity input. This information must be extracted by converter 10. These files are mapped to the program and product index class defined by the Program and Product index classes (using the ELOADER.INI file described below) and stored in digital library 20. There is one attribute file for each program and for each product entity to be stored. Examples of ATR files are shown below. The first is an ATR file for a "book":

```
;;
;; PRODUCT.C - ATR file - Created: 29 October 1999 21:55:06
;;
;; Seq_ID: 0130808598.00.00.00
;;
!SKU:0000000014595
!ISBN:0130808598
!Title:Engineering Success
!Contrib_Group
!       Contrib_First_Name:Peter
!       Contrib_Last_Name:Schiavone
!       Contrib_Affiliation:University of Alberta
!PE_ID:FE
!Status:0
!Page_Count:0
!Use_Actuals:1
!Yr_of_Pub:1999
!Edition:01
!Revision:00
!Version:01.00
!Created_By:BARKER
!LastModified_By:BARKER
```

The ATR for chapter 3 of the preceding book is shown below:

```
;;
;; CHAPTER.C - ATR file - Created: 29 October 1999 21:55:09
;;
;; Seq_ID: 0130808598.03.00.00
;;
!SKU:0000000014618
!Title:Introduction to Engineering and Engineering Study
!Authored_Abstract:"How much do you know about engineering? Why did you choose to study
engineering?What reasons lead you to believe that you are ready and equipped to study
engineering?What are the main differences between studying at a university and studying in high
school?What new success skills do you need to succeed in engineering study?Can you write down 10
answers to each question I have asked you? Go ahead and try."
!Authored_Abstract:This is often how I begin my lecture to freshman engineering students enrolled in an
introductory engineering class. After a little thought, most of them realize just how little they know about
this subject called engineering and (often despite excellent high school averages) how ill equipped they
are to study engineering.
!Authored_Abstract:In this chapter, we address both issues. First, we ask the following questions:What is
engineering?What do engineers do?Why choose to study engineering?
!Authored_Abstract:The answers to these questions are not only interesting and informative, but will help
keep you motivated along the long, hard road to an engineering degree.
!Authored_Abstract:In , we address the question, "Are you prepared and equipped for engineering
study?" In doing so, we examine the study skills required to succeed in the university environment.
For many students, the university is the next logical step after high school, the next academic challenge.
Consequently, they expect their freshman year in engineering to be much like another year of high
school-which, of course, it isn't. In engineering, such an exception often manifests itself in
unacceptably high first-year attrition rates. We address this issue by focusing on what you need to do to
ensure the best possible start to earning your engineering degree. Essentially, you must develop the
necessary:Work strategiesStudy strategiesAttitudesCommunication skillsAbility to work as part of a
teamTime management skills
```

The ATR for section 3.2 of the same book is shown below:

```
;;
;; SECTION - ATR file - Created: 29 October 1999 21:55:09
;;
;; Seq_ID: 0130808598.03.02.00
;;
!Filename:0130808598.03.02.00.sgm
!CDAOID:AABQHDS0
!Index_Term:engineering
!Index_Term:defined
!Index_Term:engineering, study
!Index_Term:introduction to
!Index_Term:engineering, defined
!Title:What Is Engineering?
!SGML_Char_Cnt:2370
!AC_Counts
        ACFORMID:2
        NUMBERAC:1
!Associated_Component
!       AC_PE_ID:FE
!       AC_CDAOID:AABQHDT0
!       AC_Title:FIG1
!       AC_Image_Type:TIFF
!       AC_Graphic_Filename:HiRes\AABQHDT0.TIF
!       AC_Authored_Abstract:None
```

The ATR file for the "Freshman Engineering" program is shown below:

```
;;
;Program ID for Freshman Engineering set to "FE"
!PE_Program_ID:FE
!PE_Title:Freshman Engineering
!PE_Subtitle:
!PE_Req_Count:ESOU002300
; !PE_Related_Material:<value>
!PE_AC_Group
!       PE_AC_FormID:1
!       PE_AC_ByteCount:2
!       PE_AC_FormDesc:Inline Graphic
!PE_AC_Group
!       PE_AC_FormID:2
!       PE_AC_ByteCount:1000
```

-continued

```
!       PE_AC_FormDesc:Display Graphic
!PE_AC_Group
!       PE_AC_FormID:3
!       PE_AC_ByteCount:68
!       PE_AC_FormDesc:Inline Equation
!PE_AC_Group
!       PE_AC_FormID:4
!       PE_AC_ByteCount:180
!       PE_AC_FormDesc:Display Equation
!PE_AC_Group
!       PE_AC_FormID:5
!       PE_AC_ByteCount:2000
!       PE_AC_FormDesc:SGML
!PE_AC_Avg_Image_Bytes:0
!PE_AC_Avg_SGML_Bytes:0
!PE_Chars_Per_UPM_Tier:2000
!PE_Price_Group
!       PE_Country:0
!       PE_Monetary_Unit:USD
!       PE_Min_Order_Price:1000
!       PE_Base_Cust_Pub_Price:1000
!       PE_Base_UPM_Fee:0
!       PE_Incr_UPM_Fee:10
;JDR add 1/21/99
!       PE_Source_Price_Per_Page:10
!       PE_Minimum_Page_Limit:80
!       PE_Volume_Page_Limit:480
!       PE_UPM_Bytes_Per_Page:1000
!PE_Status:F
!PE_CreateDate:1998-12-07
!PE_CreatedBy:UHANAED
!PE_LastModifiedDate:1999-1-19
!PE_LastModifiedBy:UHANAED
```

Content Component Files (SGML). Content component files contain the product entities' actual ASCII or binary content that will be stored as parts in digital library 20. In the present example, these files comprise SGML files containing the ASCII text of chapter sections.

Associated Component Files. Associated Component (AC) Files contain any non-SGML content associated with the product entities. The content in the associated component files is stored as parts in digital library 20.

Both prepublished content and custom book outlines (CBO's), described below, are represented in the described file format. A feature of this format is that content objects such as a prepublished book or CBO are defined by the PSF file. Thus the PSF file may be used to redefine the content, order and structure of the content object without having to access the content itself. This feature proves useful in creating compilations of content, by simplifying the process for adding, moving and deleting content.

Composite PSF & ATR Files. Out of the PSF and ATR format comes a third file format that is a composite form of PSF and ATR. For simplicity, this type is also referred to as a PSF+ATR format. One can think of this file as a merge of PSF and ATR files, where attributes from an entity's ATR file have been inserted after that entity in the .PSF. For example, it may be desirable to include certain attributes with a PSF file (e.g., author and price). It may be desirable to add certain attributes to the product structure file (e.g., author) when it is stored in the digital library. Accordingly, in the present embodiment, what is stored as "Entity Structure Part" described earlier is actually a composite form of PSF and ATR. For a book or product level entity, this file includes all entities in the book (including the book itself) and their attributes. For a chapter level entity, this file includes all entities in the chapter (including the chapter itself) and their attributes. For a section level entity, this file includes the section entity and its attributes. Attributes are also added to PSF files containing custom compilation outlines created by system users, and Equery result files. In the Equery results files, all of the entities returned are treated flat, namely at the same hierarchical level.

An example of a composite file format is shown below:

```
Top_Entity1: sequence_ID
!Attribute1: value
!Attribute2: value
!Attribute3:
!    Subattribute1: value
!    Subattribute2: value
!Attribute4: Value4
    Sub_Entity1: Sequence_ID
    !Attribute1: value
    !Attribute2: value
        Sub_Sub_Entity1: Sequence_ID
        !Attribute1: value
        !Attribute2: value
    Sub_Entity2: Sequence_ID
    !Attribute1: value
    !Attribute2: value
```

An exemplary entity structure part stored in Digital Library is provided in Appendix A.

In the present example, converter 10 is preferably Active System's Attribute Extractor (i.e. AE). Converter 10 creates a load directory for each prepublished content product, identified by that product's ISBN, which contains the product's corresponding Product Structure File (PSF), Attribute Files, Content Component Files and Associated Component Files. It also creates a load directory for each program category, identified by the program identifier and containing the program's corresponding PSF and ATR files. These directories are provided as input to content loader 14.

4. Content Loader

Content loader 14 is a software application for loading the program and prepublished content files described above into the digital library 20. It receives the load directories as input from converter 10, then loads this information into digital library according to a content configuration model 12 defined in the ELOADER.INI configuration file (described below). Content loader 14 interfaces with the digital library content server(s) 18 through the OO API layer 16.

The content loader 14 has three modes of operation: load, delete and purge.

Load. The purpose of this mode of operation is to load or reload the Content Entities, Associated Components and Attributes into the digital library 20. All Content Component Files are stored as binary large objects or BLOBs in the digital library object server 48. All Attribute Files are parsed and the resultant parametric data is stored in the digital library server 44.

As previously noted, the input files to the content loader 14 are a Product Structure File (i.e., a sequence-id.psf), an Attribute file for each product entity loaded (i.e., sequenceid.atr), a file for each Content Component (i.e., sequence-id.sgm) and a file for each Associated Component (i.e., sequenceid.cdaOID.gif)

The output of the ELoader will be placed into the appropriate index class in the digital library 20 as specified by the configuration model contained in the ELOADER.INI file.

Syntax: ELoader-load <sequence-id>

Example #1: ELoader-load 012345678

This load command launches loader 14 into load mode. It looks in the load directory identified by an ISBN="012345678" for all of the Attribute Files, Content Components and Associated Components stored therein, and processes these files.

Example #2: ELoader 012345678.02.00.00

This load command launches loader 14 into load mode. It looks in the load directory identified by an ISBN="012345678" for all Attribute Files, Content Components, and Associated Components associated with chapter container "012345678.02.00.00", and process these files.

Delete. The purpose of this mode of operation is to delete selected Content Entities, Associated Components and Attributes from the Digital Library. The ELoader will delete all content, attributes, and text index entries from digital library 20 for the ISBN/sequence number specified, as well as all child content and attributes associated with that ISBN/sequence number.

Syntax: ELoader-delete <sequence-id>

Example #1: ELoader-delete 012345678

This command launches loader 14 into delete mode and deletes all content and attributes for the prepublished content product whose ISBN="012345678".

Example #2: ELoader-delete 012345678.02.00.00

This command launches loader 14 into delete mode and deletes all entities and attributes for the entity whose sequence number="012345678.02.00.00" as well as all of its children. The rest of the content product remains untouched.

Purge. The purpose of this mode of operation is to purge Content Entities, Associated Components and Attributes from the Digital Library after a Load that did not complete successfully. Loader 14 deletes all content, attributes, and text index entries from the digital library 20 even though it is in a partially loaded state.

Syntax: ELoader-purge <sequence-id>

Example: ELoader-purge 012345678

This command launches loader 14 into purge mode and deletes all content and attributes for the prepublished content product whose ISBN="012345678".

5. Configuration Model

Configuration model 12 is embodied in a configuration file called ELOADER.INI, and associated configuration files that it calls. The configuration files contain all of the switches and parameters necessary to customize the operation of loader 14 to the data model defined above. The primary objective of these files is to minimize the need to change loader 14 program source code if the data model is modified.

The ELOADER.INI file is organized into several sections with multiple keywords and values in each section. The LOGON and DEBUG sections describe parameters that govern the overall loader operation. The ELOADER section and the Individual Group Sections describe the entity types that have been defined in the exemplary data model (i.e., the Program, Product, CBO and Request entity groups). The Individual Entity Sections describe each entity type that belongs to a given entity group. The ATTRIBUTES section and the Individual Attribute Sections describe the set of attributes that may be loaded for the entities in the data model.

The ELOADER.INI file, the data model file, and each of the individual GROUP attribute files are in the same format as an Attribute file as shown in the examples. The GROUP file is in the PSF format.

a. Structure

LOGON Section. This section specifies the digital library USERID and server names for all operations between content loader 14 and digital library 20.

| KEYWORD | VALUE | MEANING |
|---|---|---|
| LIBRARY | name | The name of the DIGITAL LIBRARY Library Server to be used. |
| USERID | name | The USERID that will be used to logon to DIGITAL LIBRARY. |
| PASSWORD | name | The PASSWORD of the USERID. |
| TEXT SERVER | name | The name of the client instance of the Text Miner server. |
| MAX HITS | number | The maximum number of hits to be returned by EQuery (described subsequently). |

DEBUG Section. This section specifies internal switch settings that are only used for debugging, testing, and performance analysis.

| KEYWORD | VALUE | MEANING |
|---|---|---|
| TRACE | 0 | No debug trace will be created. |
| | 1 | Create trace of internal activity for debugging. This is not a log file. |

Log files Section. This section specifies the names of the files to be used for logging and debugging.

| KEYWORD | VALUE | MEANING |
|---|---|---|
| LOADER | name | Filename for Loader log. |
| TRACE | name | Filename for debug trace. |

ELOADER Section. This section specifies the name of the initialization file containing the full data model with all of its data groups. In other words, it is a pointer to a meta-metadata file.

| KEYWORD | VALUE | MEANING |
|---|---|---|
| DATA MODEL | Name | Filename of a file containing each Group name and the name of the Group File. |
| DEFAULT GROUP | Name | Name of the default Group. |
| ROOT ENTITY SID | Name | String to be concatenated to the unique ISBN of a content object to obtain the root sequence-id. |

CONTENT CLASSES Section. This section specifies the digital library content class for each of the possible file extensions of associated component files.

| KEYWORD | VALUE | MEANING |
|---|---|---|
| DEFAULT CONTENT CLASS | Name | BINARY if the component contains non-human readable data. ASCII if the component contains human readable data. |
| File extension | Name | BINARY if the component contains non-human readable data. ASCII if the component contains human readable data. |

Groups File. This section lists the names of all hierarchical groups of entities within the data model. All entity instances that belong to the same group will be stored in the same set of digital library index classes. This is a convenient way to manage product-related entities separately from other business-related entities. There may be one or more GROUPS in a Groups File.

| KEYWORD | VALUE | MEANING |
|---|---|---|
| GROUP | name | All instances of entities within this Entity group will be stored in the same set of digital library index classes. The Entity types that belong to this group may be specified via ENTITY keywords in an Individual Group Section. |

Individual Group Attribute Files. Each filename in the group attribute files is the value of one of the GROUP keywords in the Groups File. It identifies the data model entities that will be stored together as a related group and the digital library index class names that will be used to store them. There is one Individual Group Section for each GROUP keyword in the Groups File.

| KEYWORD | VALUE | MEANING |
|---|---|---|
| ENTITIES CLASS | name | The digital library index class name that will be used to store all instances of entities that belong to this group. |
| ENTITY ID | name | The digital library attribute name in the ENTITIES Index Class for a unique identifier for the entity. It is assumed to be unique and an index. |
| ENTITY TYPE | name | The digital library attribute name in the ENTITIES Index Class for the digital library Type ID of the entity. |
| ENTITY PARENT ID | name | The digital library attribute name in the ENTITIES Index Class for the digital library Item ID of the parent container of this entity. |

-continued

| KEYWORD | VALUE | MEANING |
| --- | --- | --- |
| ENTITY CHILD ID | name | The DIGITAL LIBRARY Attribute Name in the ENTITIES Index Class for the DIGITAL LIBRARY Item ID of the first child of this entity. |
| ENTITY SIBLING ID | name | The DIGITAL LIBRARY Attribute Name in the ENTITIES Index Class for the DIGITAL LIBRARY Item ID of the first sibling of this entity. |
| ENTITY AUX ID | name | The DIGITAL LIBRARY Attribute Name in the ENTITIES Index Class for the first auxiliary attribute of this entity. |
| ENTITY SUBCOMP ID | name | The DIGITAL LIBRARY Attribute Name in the ENTITIES Index Class for the first associated component of this entity. |
| ASSOC COMP ATTR NAME | name | The DIGITAL LIBRARY Attribute Name in the COMPONENTS Index Class for the DIGITAL LIBRARY Item ID of the ENTITIES Index Class item that owns the COMPONENT item. |
| ASSOC COMP ID ATTR NAME | name | The DIGITAL LIBRARY Attribute Name in the COMPONENTS Index Class for the DIGITAL LIBRARY Item ID of the ENTITIES Index Class item that owns the COMPONENT item. |
| ATTRIBUTES CLASS | name | The DIGITAL LIBRARY Index Class name that will be used to store all attributes that are hierarchical or have multiple instances. |
| ATTR ENTITY ID | name | The DIGITAL LIBRARY Attribute Name in the ATTRIBUTES Index Class for the DIGITAL LIBRARY Item ID of the ENTITIES Index Class item that owns the ATTRIBUTE item. |
| ATTR PARENT ID | name | The DIGITAL LIBRARY Attribute Name in the ATTRIBUTES Index Class for the DIGITAL LIBRARY Item ID of the parent container of this entity. |
| ATTR CHILD ID | name | The DIGITAL LIBRARY Attribute Name in the ATTRIBUTES Index Class for the DIGITAL LIBRARY Item ID of the first child container of this entity. |
| ATTR SIBLING ID | name | The DIGITAL LIBRARY Attribute Name in the ATTRIBUTES Index Class for the DIGITAL LIBRARY Item ID of the next sibling container to this entity. |
| ATTR NEXT VALUE | name | The DIGITAL LIBRARY Attribute Name in the ATTRIBUTES Index Class for the DIGITAL LIBRARY Item ID of the next value of this entity. |
| ATTR KEYWORD | name | The DIGITAL LIBRARY Attribute Name in the ATTRIBUTES Index Class for the attribute containing the Attribute's Keyword. |
| ATTR VALUE | name | The DIGITAL LIBRARY Attribute Name in the ATTRIBUTES Index Class for the attribute containing the Attribute's Value. |
| ENTITY | name | Name of the entity type of the root entity. |
| ENTITY STRUCTURE PART | Part Number | Specifies the DIGITAL LIBRARY Part Number where an internally generated summary of attribute values for this entity and all of its descendants will be stored. |

ATTRIBUTE Definitions. Each top-level attribute name that may be present in a Group Attribute file must have keywords defined. Attributes that are part of an attribute hierarchy (i.e. sibling attributes with a parent attribute) are defined by an ATTRIBUTE keyword within the parent's attribute definition.

| KEYWORD | VALUE | MEANING |
| --- | --- | --- |
| ATTRIBUTE | | Defines the beginning of a single attribute. There may be one or more ATTRIBUTE definitions in Group File. Each attribute name that may be present in an attribute file must have keywords defined. |

Attribute Keywords

| KEYWORD | VALUE | MEANING |
|---|---|---|
| NAME | name | The attribute name that will be used to identify this attribute. |
| TYPE | ENTITY | The value of this attribute will be stored as a Primary attribute in the Entities Index Class of the appropriate Entity Group. |
| | COMP | It uses the DIGITAL LIBRARY attribute specified by the DIGITAL LIBRARY NAME keyword. The value of this attribute will be stored as a Primary attribute in the Components Index Class of the appropriate Entity Group. It uses the DIGITAL LIBRARY attribute specified by the DIGITAL LIBRARY NAME keyword. |
| | AUX | The value of this attribute will be stored as an Auxiliary attribute along with its keyword. Depending on its position in the attribute file, it will also contain the DIGITAL LIBRARY Item ID of either an Entities Index Class or a Components Index Class item of the appropriate Entity Group. |
| | SYS | The value of this attribute may not be loaded via ELoader and it is not explicitly stored in the Digital Library. The value of this attribute generated by the DIGITAL LIBRARY query engine and is available for output by EQuery. |
| VALUES | 1 (default) | This attribute may only have one value. The attribute type may be either PRIM or COMP. |
| | * | This attribute may have zero or more values. The attribute type may only be AUX. The values will always be retrieved in the same order that they are stored. |
| DEFAULT | INHERIT | If a value is not explicitly specified for this attribute, the current value of the same attribute of the parent entity is used when the entity is stored (i.e. early binding). |
| | LINK | If a value is not explicitly specified for this attribute, the current value of the same attribute of the parent entity is used when the entity is retrieved (i.e. late binding). |
| | NULL□ | If a value is not explicitly specified for this attribute, the value is assumed to be a NULL string (i.e. no binding). |
| FILE | 0 (default) 1 | This attribute has a normal text value and is not a file name. The value of this attribute is a file name. In addition to storing the file name as the attribute value, the content of the file is stored as a DIGITAL LIBRARY part in the Part number specified by the PART keyword. |
| PART | n | If the PART keyword is specified, the value of the attribute is either a long string or the contents of a file (based on the value of the FILE keyword). The value of the PART keyword specifies the DIGITAL LIBRARY Part Number where value of attribute will be stored. The part will be stored with the item that contains the attribute value. This type of attribute may be searched with Text search, but not parametric search.□ |
| DL NAME | name | The DIGITAL LIBRARY attribute name that will be used to store this attribute. The attribute type must be ENTITY or COMP. |
| SEARCH | P | Allow parametric search. The attribute type must be ENTITY. |
| | T | Allow text search. |
| | PT | Allow parametric and/or text search. The attribute type must be ENTITY. |
| TEXT INDEX | name | The name of the Text Miner index that will be used to index this attribute value. |
| ATTRIBUTE | | The presence of an ATTRIBUTE keyword indicates that the parent attribute has child values. The top-level attribute type must be AUX. The value of this attribute is the aggregation of all of the values of the attributes that are defined by all of the attribute values that it contains. |

Example of an ELOADER.INI File:

```
            !LOGON
            !       LIBRARY:LIBSRVRX
            !       USERID:chuck
            !       PASSWORD:chuck
            !       TEXT SERVER:TM
            !DEBUG
            !       TRACE:1
            !LOG FILES
            !       LOADER:Emissary.log
            !       TRACE:ETrace.log
            !ELOADER
            !       DATA MODEL:EMISSARY.GROUPS
            !       DEFAULT GROUP:PRODUCTS
            !       ROOT ENTITY SID:.00.00.00
            !CONTENT CLASSES
            !       DEFAULT CONTENT CLASS:BINARY
            !       tiff:BINARY
            !       gif:BINARY
            !       jpg:BINARY
            !       eps:ASCII
            !       sgm:ASCII
            !       txt:ASCII
```

E.GROUPS file:

```
                       GROUP:PRODUCTS
                       GROUP: ProgramGroup
```

ProgramGroup.ATR file for the group ProgramGroup:

```
            !NAME:PROGRAM
            ;Index Class control words
            !ENTITIES CLASS:E_Program
            !ENTITY ID:E_SeqID
            !ENTITY TYPE:E_EntityType
            !ENTITY PARENT ID:S_ParentItem
            !ENTITY CHILD ID:S_ChildItem
            !ENTITY SIBLING ID:S_SiblingItem
            !ENTITY AUX ID:S_AuxItem
            !ENTITY STRUCTURE PART:9
            !ASSOC COMP ATTR NAME:Associated_Component
            !ASSOC COMP ID ATTR NAME:AC_CDAOID
            !ATTRIBUTES CLASS:E_ProgramAux
            !ATTR SEQUENCE ID:E_SeqID
            !ATTR ENTITY ID:S_ProgramItem
            !ATTR PARENT ID:S_ParentItem
            !ATTR CHILD ID:S_ChildItem
            !ATTR SIBLING ID:S_SiblingItem
            !ATTR NEXT VALUE:S_NextValueItem
            !ATTR KEYWORD:S_Keyword
            !ATTR VALUE:S_Value
            ;// Data Model "Entity types"
            !ENTITY:PROGRAM
            ;// System attributes
            !ATTRIBUTE
            !NAME:Associated_Component
            !TYPE:SYS
            !ATTRIBUTE
            !NAME:AC_CDAOID
            !TYPE:SYS
            !ATTRIBUTE
            !NAME:Hits
            !TYPE:SYS
            !ATTRIBUTE
            !NAME:HitWords
            !TYPE:SYS
            !ATTRIBUTE
            !NAME:Rank
            !TYPE:SYS
            !DL NAME:DKRANK
            ;// Data Model "Entity attributes"
            !ATTRIBUTE
            !NAME:PE_Program_ID
```

-continued

```
            !TYPE:ENTITY
            !DL NAME:E_ProgramID
            !ATTRIBUTE
            !NAME:PE_Title
            !TYPE:ENTITY
            !DL NAME:E_Title
            !ATTRIBUTE
            !NAME:PE_Subtitle
            !TYPE:ENTITY
            !DL NAME:E_Subtitle
            !ATTRIBUTE
            !NAME:PE_AC_Avg_Image_Bytes
            !TYPE:ENTITY
            !DL NAME:E_AvgChrPerImage
            !ATTRIBUTE
            !NAME:PE_AC_Avg_SGML_Bytes
            !TYPE:ENTITY
            !DL NAME:E_AvgChrPerSGMLAC
            !ATTRIBUTE
            !NAME:PE_Chars_Per_UPM_Tier
            !TYPE:ENTITY
            !DL NAME:E_MaxChrPerUpmTier
            !ATTRIBUTE
            !NAME:PE_Req_Count
            !TYPE:AUX
            !VALUES:*
            !ATTRIBUTE
            !NAME:PE_Related_Material
            !TYPE:AUX
            !VALUES:*
            !ATTRIBUTE
            !NAME:PE_AC_Group
            !TYPE:AUX
            !VALUES:*
            !ATTRIBUTE
            !       NAME:PE_AC_FormID
            !       TYPE:AUX
            !ATTRIBUTE
            !       NAME:PE_AC_ByteCount
            !       TYPE:AUX
            !ATTRIBUTE
            !       NAME:PE_AC_FormDesc
            !       TYPE:AUX
            !ATTRIBUTE
            !NAME:PE_Price_Group
            !TYPE:AUX
            !VALUES:*
            !ATTRIBUTE
            !       NAME:PE_Country
            !       TYPE:AUX
            !ATTRIBUTE
            !       NAME:PE_Monetary_Unit
            !       TYPE:AUX
            !ATTRIBUTE
            !       NAME:PE_Min_Order_Price
            !       TYPE:AUX
            !ATTRIBUTE
            !       NAME:PE_Base_Cust_Pub_Price
            !       TYPE:AUX
            !ATTRIBUTE
            !       NAME:PE_Base_UPM_Fee
            !       TYPE:AUX
            !ATTRIBUTE
            !       NAME:PE_Incr_UPM_Fee
            !       TYPE:AUX
            !ATTRIBUTE
            !       NAME:PE_Source_Price_Per_Page
            !       TYPE:AUX
            !ATTRIBUTE
            !       NAME:PE_UPM_Bytes_Per_Page
            !       TYPE:AUX
            !ATTRIBUTE
            !       NAME:PE_Minimum_Page_Limit
            !       TYPE:AUX
            !ATTRIBUTE
            !       NAME:PE_Volume_Page_Limit
            !       TYPE:AUX
            !ATTRIBUTE
            !       NAME:PE_Status
```

-continued

```
!     TYPE:ENTITY
!     DL NAME:E_Status
!ATTRIBUTE
!     NAME:PE_CreateDate
!     TYPE:ENTITY
!     DL NAME:E_CreateDate
!ATTRIBUTE
!     NAME:PE_CreatedBy
!     TYPE:ENTITY
!     DL NAME:E_CreatedBy
!ATTRIBUTE
!     NAME:PE_LastModifiedDate
!     TYPE:ENTITY
!     DL NAME:E_LastModifiedDate
!ATTRIBUTE
!     NAME:PE_LastModifiedBy
!     TYPE:ENTITY
!     DL NAME:E_LastModifiedBy
```

PRODUCTS.ATR file for the group PRODUCTS:

```
; Index class info for Products
!ENTITIES CLASS:tmpResource2
!ENTITY ID:SeqID
!ENTITY TYPE:EntityType
!ENTITY PARENT ID:ContainerItem
!ENTITY CHILD ID:ChildItem
!ENTITY SIBLING ID:SiblingItem
!ENTITY SUBCOMP ID:SubcompItem
!ENTITY AUX ID:AuxItem
!ASSOC COMP ATTR NAME:Associated_Component
!ASSOC COMP ID ATTR NAME:OID
!ATTRIBUTES CLASS:tmpAux2
!ATTR ENTITY ID:EResourceItem
!ATTR PARENT ID:ContainerItem
!ATTR CHILD ID:ChildItem
!ATTR SIBLING ID:SiblingItem
!ATTR NEXT VALUE:NextValueItem
!ATTR KEYWORD:EKeyword
!ATTR VALUE:EValue
; Data Model Root Entity Types for Products Group
!ENTITY:Product.c
; Data Model Attributes for Products - i.e., mapping of metadata properties
; from PSF attribute files to data locations in the DL data repository
!ATTRIBUTE
!     NAME:TITLE
!     TYPE:ENTITY
!     DL NAME:Title
!ATTRIBUTE
!     NAME:PRICE
!     TYPE:ENTITY
!     DEFAULT:INHERIT
!     DL NAME:CharCount
!ATTRIBUTE
!     NAME:FILE NAME
!     TYPE:ENTITY
!     DL NAME:ContentFileName
!     FILE:1
!     PART:1
!ATTRIBUTE
!     NAME:INDEX TERM
!     TYPE:AUX
!     PART:5
!     TEXT INDEX:TIXTERM
!ATTRIBUTE
!     NAME:ITEM INDEX
!     TYPE:AUX
!     PART:5
!     TEXT INDEX:TIXTERM
!ATTRIBUTE
!     NAME:AUTHOR
!     TYPE:AUX
!     DEFAULT:INHERIT
!     ATTRIBUTE
!         NAME:NAME
!         TYPE:AUX
!         PART:6
!         TEXT INDEX:TIXTERM
!     ATTRIBUTE
!         NAME:SCHOOL
!         TYPE:AUX
!ATTRIBUTE
!     NAME:Associated_Component
!     TYPE:COMP
!     ATTRIBUTE
!         NAME:OID
!         TYPE:COMP
!         DL NAME:ObjectId
!     ATTRIBUTE
!         NAME:TITLE
!         TYPE:COMP
!         DL NAME:Title
!     ATTRIBUTE
!         NAME:SIZE
!         TYPE:AUX
!     ATTRIBUTE
!         NAME:COMP FILE NAME
!         TYPE:COMP
!         DL NAME:ContentFileName
!         FILE:1
!         PART:1
```

B. Selecting Content for a Compilation of Content

Figure 6:
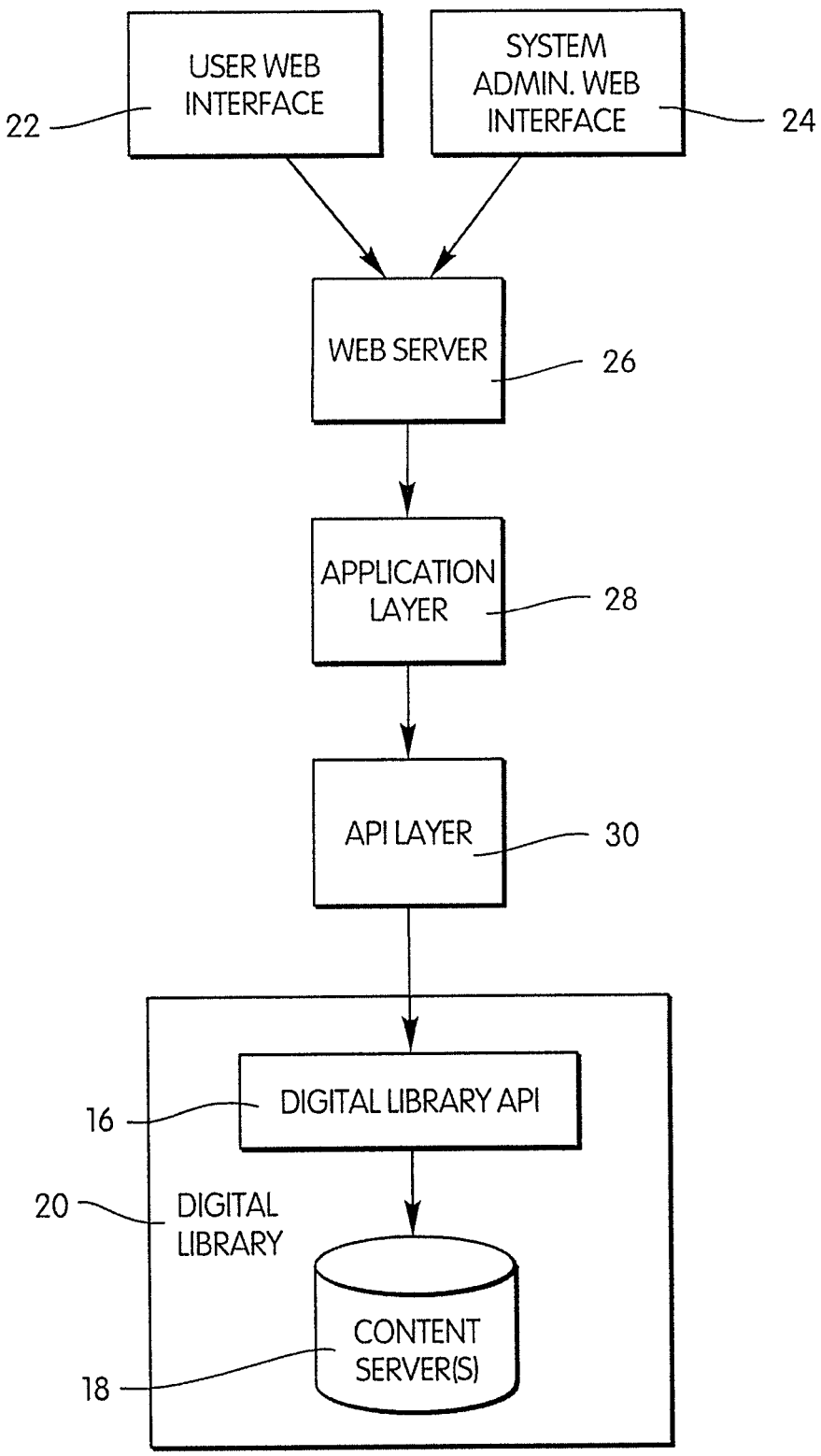
FIG. 6 is a block diagram representing the path for creating and submitting compilations of content according to the present invention.

The selection path for creating a compilation of content is shown in FIG. 6. This path allows a user to interface with the digital library 20 to retrieve and view content objects stored therein, select objects for inclusion in a compilation of content, create new objects for inclusion in the compilation and for storage in the digital library 20, and submit the completed compilation for approval.

In brief, block 22 represents a user interface application 22 which preferably runs within a standard web browser. It comprises HTML and Javascript applications that provide a user interface and some amount of application function such as searching, viewing, selecting, creating, editing, and organizing content accessed from the content server(s). The user creates a compilation in the form of a custom content outline (CCO), which is essentially a formatted text document that includes pointers to the actual content to be included in the final compilation. In the current example for creating custom textbooks, the CCO is called a custom book outline or CBO.

The user-interface application 22 communicates through a web server 26 to an application layer 28. Application layer 28 preferably comprises a set of PERL applications that control some user interface transactions (e.g., login procedures), retrieve data for presentation to the user, perform CCO manipulation and submission, and forward commands to the API Layer 30 to communicate actions requested by the user.

Application layer 28 accesses the content server(s) 18 via API layer 30. The API layer 30 preferably consists of a collection of C++ routines that perform discrete functions such as the actual CCO manipulation functions and digital library 20 functions (e.g., search and retrieve). It also includes a PERL/C++ glue layer between the C++ routines and application layer 28 for bridging parameter lists between C++ and PERL. The API layer 30 is provided to map digital library 20 more closely to the customer's website and application program workflow. Underneath, this API 30 makes use of the digital library API 16 to query/update/delete and retrieve data from digital library 20.

1. Custom Book Outline

Prior to submission, a custom book outline is preferably an abstract representation of the compilation of content being created. For example, the CBO may be a hierarchical outline of the contents to be included in a compilation of content. At this point, it contains only references to the actual content to be included in the final work. This format is more efficient than pulling in content at creation time because it avoids retrieval and manipulation of large BLOBs of information until the CBO is in its final form.

In the present example, the CBO at creation time is a formatted text document comprising a parsable formatted file like the "PSF" filetype previously described. Like the content product PSF files, the CBO is merely an outline with references to the content entities to be included therein. One difference is that a CBO may be a composite PSF+ATR filetype, including attributes particular to the CBO such as author and price. This is the case in the present embodiment.

"Entities" once again refers to the content hierarchy definition. For example, the hierarchy definition of a textbook includes containers representing the higher levels of the hierarchy (cbo.c, volume.c and chapter.c). The smallest entity of the hierarchy is a section. Each entity in the CBO is represented by a sequence ID in the same format as previously described with reference to product entities. The sequence ID of a container entity is used to identify all subentities of that container. The sequence ID's of a leaf node is used to reference the actual content associated with that node.

A CBO according to the present example is stored as a digital library part. Its attributes are also contained in a row of a relational CBO index class defined by the Custom Book Outline Index Class, and its unique identifier for this particular implementation is stored in the User Table, although it could also be stored in the CBO index class The User Table contains this reference for the purpose of identifying the current CBO a user is working with. This allows for the user to log off and log back in and return to the previous CBO "work in progress". The row in the CBO index class includes references to the CBO part number, as well as any associated parts.

FIG. 7 depicts a row 82 representing a CBO. It includes a CBO identifier, CBO attributes, and pointers to one or more PSF files or "parts" associated with the CBO. The first part contains the parsable formatted text outline representing the compilation of content, which in turn includes references to actual product content making up the CBO. A second part comprises a backup downlevel copy of the first part that is used to undo previous transactions. A third part, designated with the number 50 or higher, represents any user-provided content that has been added to the CBO. Each part of this type includes pointers to the actual user-provided content, which is stored in digital library 20.

An example of a CBO is shown below.

```
CBO.C:OW1T8$UEB4H3@SE7
!PE_ID:FE
!Title:Student Loans
!Userid:DaveBaer
!Undoable:FALSE
!Product_Type:CBO
!Create_Date:20001209203630
!Last_Modified_Date:20001214113615
!Status:0
!CBO_State_Changed_Date:20001209203630
!UPM_Terms_And_Conditions_Date:20001214 11:36:13
!Acknowledgement:
!Contrib_Group:
!Price:2216
!UPM_Price:1000
!Page_Count:21.8
!Char_Count:186
!Nextchapter:2
!ECtlSGMLChrPerPage:3800
!ECtlAvgChrPerImage:0
!ECtlAvgChrPerSMGLAC:0
```

-continued

```
!ECtlMaxChrPerUPMTier:2000
!ECtlSourcePricePerPage:10
!ECtlUPMBasePrice:1000
!ECtlUPMIncrPrice:10
!Country_Code:US
!PE_Volume_Page_Limit:480
!PE_Minimum_Page_Limit:80
!PE_Min_Order_Price:1000
!UPM_Bytes_Per_Page:1000
!Base_Cost:1000
    VOLUME.C:V1
    !UPM_price:0
    !Title:My New ESource Book created on 12/09/2000 at 20:36:28
    Volume Number 1
    !Price:216
!Product_Type:
!Publication_Media_Type:
!Page_Count:21.8
    FRONT_AND_BACK_ELEMENT:
    !Title:Table of Contents
    !Page_Count:6
    !Price:60
    FRONT_AND_BACK_ELEMENT:
    !Title:Preface
    !Page_Count:9
    !Price:90
    CHAPTER.C:C1
    !Title:New Chapter
    !Price:16
    !Page_Count:1.8
        SECTION:0137842244.02.02.00
        !Title: Background Ideas
        !SGML_Char_Cnt:2111
        !PE_ID:FE
        !Page_Count:0.6
        !Info_Generated:1
        !Price:6
        SECTION:0137842244.02.03.00
        !Title:Why Study Engineering Ethics?
        !SGML_Char_Cnt:3905
        !PE_ID:FE
        !Page_Count:1.0
        !Info_Generated:1
        !Price:10
        UPM SECTION:50
        !Title:My New UPM Title
        !SGML_Char_Cnt:186
        !AC_Subdoc_Cnt:0
        !AC_Image_Cnt:0
        !Page_Count:0.2
        !Price:0
    FRONT_AND_BACK_ELEMENT:
    !Title:Index
    !Page_Count:5
    !Price:50
```

Attributes are identified by the "!" character. The first line contains a 16 byte CBO_ID, i.e., This is the itemid defined previously in the discussion of the digital library 20. The CBO_ID is the unique identifier for each row in the CustomBookOutline index class.

The outlined structure is primarily defined by lines below the Volume.C container definition and includes the title of the book, a table of contents, a chapter container, two product sections and their corresponding sequence identifiers, and a user provided section and its corresponding part number (UPM SECTION:50). The text above the Volume.C is defining author, pricing, and other desired variables. This format is parsed by the Edit.cgi script within application layer 28 and displayed to the user on a web interface 22 screen.

A CBO according to the present example is presented to the system user through the web user interface 22 as will be described subsequently.

2. Application Layer and API Layer

Application layer 28 and API layer 30 interoperate to execute a group of functions defined to enable creation, submission and request processing of a CBO. The functions are listed below and described subsequently with reference to specific CBO tasks. Each function is a logical procedure, preferably implemented in C++, that defines a set of function rules and includes calls to digital library functions necessary to perform the function (e.g. Queries, writes, etc.). In other words, each function is an encapsulation of a series of oft-repeated functional steps which facilitates the creation and processing of a CBO. Digital library function calls are made through the digital library Client OO API 42. A definition of digital library 20 OO API function calls utilized by API layer 30 is provided in the "IBM Digital Library Programming Reference Version 2", Second Edition (September 1997), and rules for making these function calls are provided in the "IBM Digital Library Guide to Object-Oriented and Internet Application Programming Version 2", Second Edition (September 1997), both available from IBM Corporation.

Each function in API layer 30 has a corresponding function in application layer 28. In the present embodiment, the application layer functions are implemented as Perl scripts. These scripts receive Perl input parameters from Perl function calls residing in the application layer 28. The Perl scripts translate the Perl arguments received into equivalent C++ parameters and then issue calls to their corresponding C++ functions in API layer 30. The API layer functions then execute the actual function steps and return C++ output parameters to their corresponding Perl functions. The Perl functions then translate the C++ arguments into equivalent Perl arguments.

CBO Functions

| |
|---|
| ECBOCreate |
| ECBOClone |
| ECBOAddContent |
| ECBONewContainer |
| ECBORemoveContent |
| ECBODelete |
| ECBOMoveContent |
| ECBORelocateContent |
| ECBOSetTitle |
| ECBOGet |
| ECBOList |
| ECBOListByCreator |
| ECBOUndo |
| ECBOSetState |
| ECBOAddUPM |
| ECBOGetUPM |
| ECBOSetTerms |
| ECBOSubmit |
| CBOCheckPolicies |

Prepublished Content Product Support Functions

| |
|---|
| EProductGetOutline |
| EProductSetState |
| EGetHTML |

Miscellaneous Support Functions

| |
|---|
| EAdminPopulatePageAndPrice |
| EDLAuthCheck |
| EGetProgramAttributes |

It is worthwhile noting at this point that the API layer 30 also includes Request functions. In the present embodiment the Request functions (described with reference to the CBO approval path, below), are called by scripts residing in Request Generator 32 rather than application layer 28. However, this architecture is a matter of design choice and the skilled artisan will appreciate that the Request function calls may be contained in the application layer 28 without departing from the essence of the invention.

Request Processing Support Functions

| |
|---|
| ErequestUpdateStatus |
| ErequestAssignISBN |
| ErequestList |
| ErequestGet |
| ErequestExistsforCBO |
| ErequestGetForCBO |

3. Creating a Custom Book Outline

A user creates a custom book outline by selecting content stored in the data repository 20 through a web-based user interface 22. The user is presented with input screens that lead him through registration, system login, and CBO creation, manipulation and submission. The format and content of the screens is defined by HTML passed to the web browser 26 from functional modules residing in application layer 28 that are invoked by the user's actions. The format may be changed if the system is modified for different purposes. Javascripts in the web browser 26 accept the HTML and use it to build web pages according to known methods. The Javascripts add static elements such as vertical and horizontal navigation bars.

The sequence of events for creating a custom book outline, including a description of the user interface input screens and their underlying functional modules, will now be described.

Login/Create New Account

Figure 8A:
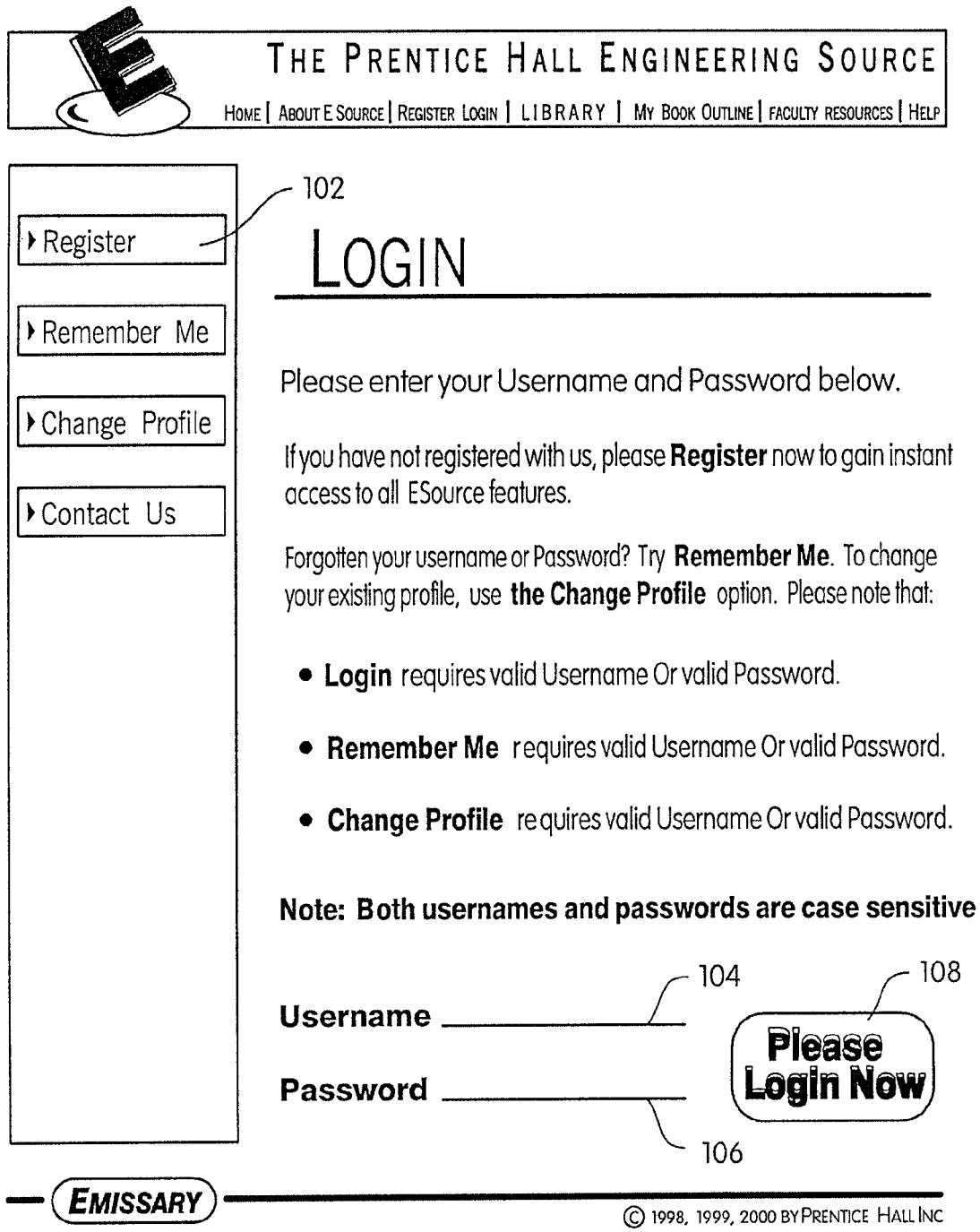

A user entering the system of the present invention is first presented with a login screen as shown in FIG. 8A. The format and content of the login screen are defined by a login procedure. The screen includes input fields 104, 106 for receiving a username and password.

Figure 8B:

If the user is new to the system, he must first register for a username by clicking on the register button 102. Clicking on register button invokes a registration procedure and brings up a new screen as shown in FIG. 8B containing a plurality of input fields. The user is prompted to enter a desired username and other information that will be stored by the system in connection with the user and may later be used to configure the CBO user interface. In the present example, this information is tailored to a university professor who will be creating a textbook in a particular discipline and includes, for example, his name, address, university, department, challenge question and secret response. It includes most of the information listed in the USERS Table data model.

Once the user's information is entered, the user clicks on button 110. The information is retrieved and forwarded with additional information such as a timestamp for storage in an account database. The account database may be the relational database 46 associated with library server 44, for example. Alternatively, an auxiliary database may be provided that is linked directly to the application layer 28. In the present example, an auxiliary database was used. The database stores the information according to the template provided by the USERS Table data model.

Figure 8C:
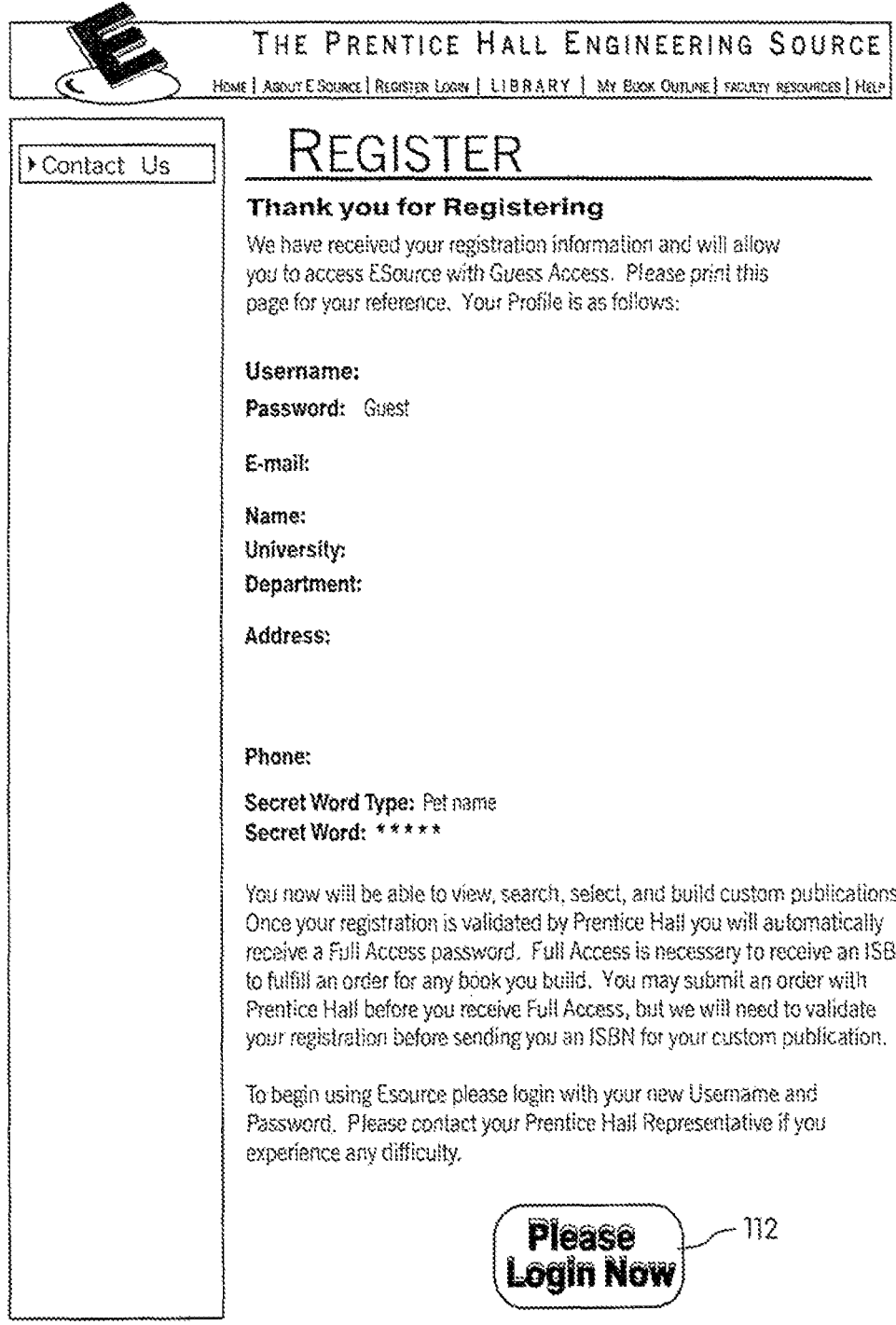

A confirmation screen is displayed next as shown in FIG. 8C with the userid and a temporary password. The user may now log into the system by clicking on the login button 112. This action causes the user to be returned to the login screen of FIG. 8A and control to return to the login procedure. The user then enters his new id and password.

New and returning users complete the login process by clicking on button 108. This action causes a query to be issued to the account database to determine if the username and password match the USER_ID and PASSWORD columns of any rows in the USERS Table. If there is no match, an error message is returned to the user and he is prompted to reenter his ID. If there is a match, the user information is retrieved. This information includes an active CBO_ID. For returning users, it represents the last CBO that the user was working on.

In the case of a new user logging onto the system for the first time, the ECBOCreate, EDLAuthCheck and ECBOSetState functions described below are invoked.

ECBOCreate
Description
  This function creates a new, skeleton CBO, populates whatever data that it knows at this time, and then stores it into the Digital Library. This procedure is invoked whenever a user:
  1. logs into the web site for the first time
  2. clears an active CBO
  3. adds a new CBO to his list of CBO's
Functional Processing
  1. Verify that the PROGRAM ID passed is valid.
  2. Create a new CBO with the user's userid and generate a temporary title. The CBO is a parsable formatted text (i.e., PSF) file.
  3. Mark the CBO status as active (CBO Status="1") with a call to ECBOSetState.
  4. Extract the Program variables related to pricing and virtual page count, storing them in the CBO (described subsequently).
  5. Write the CBO to the digital library 20. Storing a copy of the CBO in the client cache is automatically handled by the digital library client 16.
  6. Parameter List

| Inputs | Username |
| --- | --- |
|  | Password |
|  | Hostname |
|  | Program id |
|  | Userid |
|  | Title |
|  | Distribution country |
|  | Monetary unit |
|  | Composition set |
| Outputs | CBO id |

Index Classes
  CustomBookOutline
  Program
  ProgramAux
EDLAuthCheck
Description
  Before performing any operation, make sure the system-provided datastore login parameters are valid.
Functional Processing
  I. Verify that the datastore username, password and hostname passed are valid by connecting to the DL datastore.
  II. Disconnect from the digital library datastore.
Parameter List

| Inputs | DSUsername |
| --- | --- |
|  | DSPassword |
|  | DSHostname |
| Outputs |  |
| Errors | RC_DS_NOCONNECTION |
|  | RC_DS_NOTAUTHORIZED |
|  | RC_SYSTEM_ERROR |

Index Classes
  None
ECBOSetState
Description
  This function changes the approval status of a CBO as it moves through the workflow from creation, to submission, to approval/return/rejection, to printing through the back-end custom publishing process.
Functional Processing
  I. Verify that the CBO id passed is valid.
  II. Verify that the CBO status passed is valid ("1", "2", "3", or "4").
  III. Update the CBO status in the active CBO.
  IV. Remove all Order Requests for the active CBO if the CBO status is being set to Active.
Parameter List

| Inputs | DSUsername |
| --- | --- |
|  | DSPassword |
|  | DSHostname |
|  | Userid |
|  | CBO id |
|  | CBO state |
| Outputs |  |
| Errors | RC_SYSTEM_ERROR |

Index Classes
  CustomBookOutline
  Request
An new CBO PSF file will look like this:

```
CBO.C:OW1T8$UEB4H3@SE7
!PE_ID:FE
!Title:My New ESource Book created on 12/09/2000 at 20:36:28
!Userid:DaveBaer
!Undoable:FALSE
!Product_Type:CBO
!Create_Date:20001209203630
!Last_Modified_Date:20001209203630
!Status:0
!CBO_State_Changed_Date:20001209203630
!UPM_Terms_And_Conditions_Date:
!Acknowledgement:
!Contrib_Group:
!Price:1000
!UPM_Price:0
!Page_Count:0
!Char_Count:0
!Nextchapter:1
!ECtlSGMLChrPerPage:3800
!ECtlAvgChrPerImage:0
!ECtlAvgChrPerSMGLAC:0
!ECtlMaxChrPerUPMTier:2000
!ECtlSourcePricePerPage:10
!ECtlUPMBasePrice:1000
!ECtlUPMIncrPrice:10
!Country_Code:US
!PE_Volume_Page_Limit:480
!PE_Minimum_Page_Limit:80
!PE_Min_Order_Price:1000
!UPM_Bytes_Per_Page:1000
!Base_Cost:1000
    VOLUME.C:V1
    !UPM_price:0
    !Title:My New ESource Book created on 12/09/2000 at 20:36:28
    Volume Number 1
    !Price:0
    !Product_Type:
    !Publication_Media_Type:
    !Page_Count:0
```

In addition, a cookie is created and stored in the web browser's memory including the user's name, userid, password and active CBO_ID. This cookie is used to establish connections to the content management system as necessary and transparently to the user, according to conventional methods.

Figure 9A:
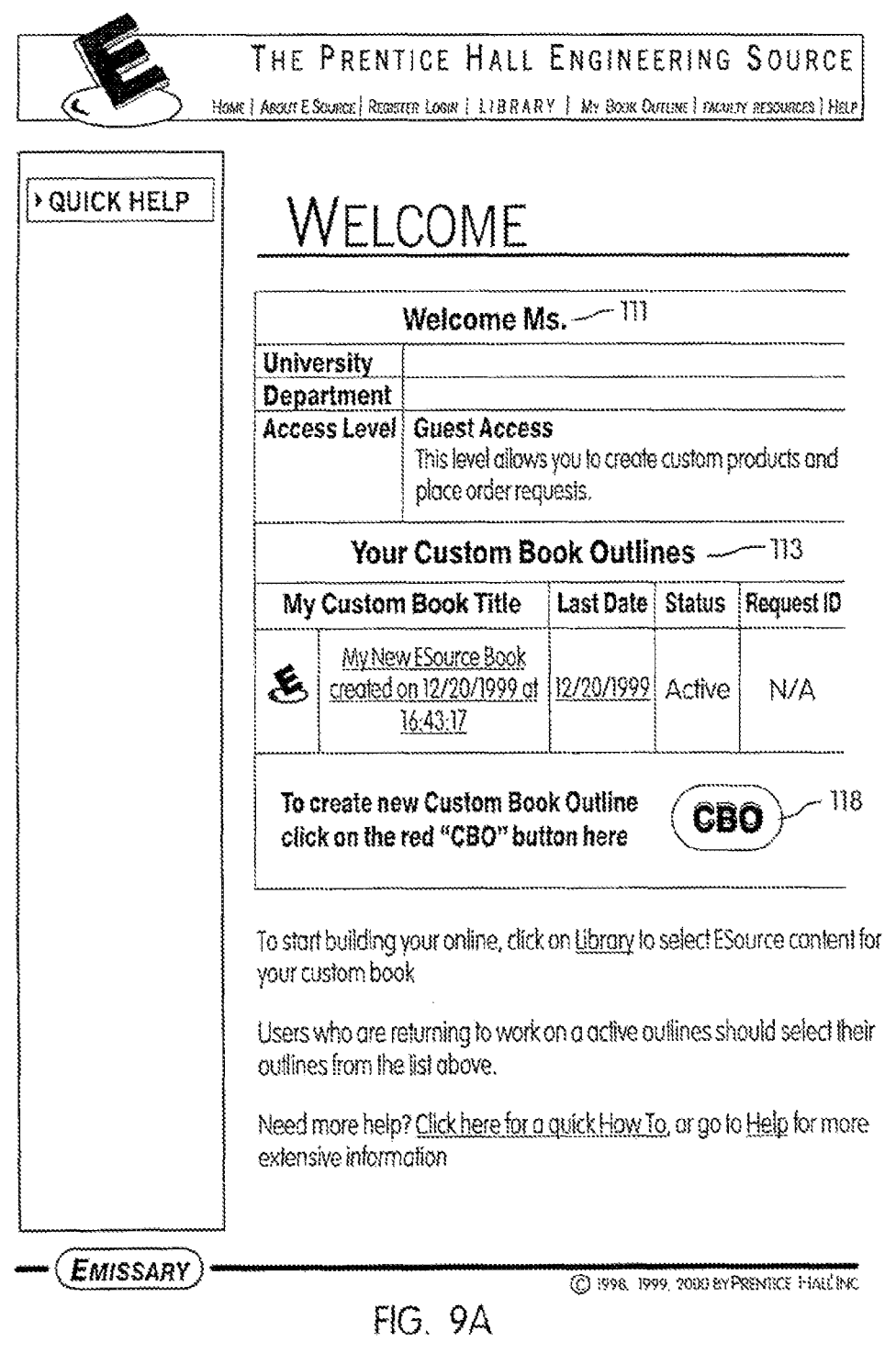

A welcome screen is presented to the new user by a MYBOOKOUTLINE procedure, as shown in FIG. 9A. A first section 111 identifies the user and information about the user—in this case her university name, department and guest access level. A second section 113 lists the user's new custom book outline. The list includes a "My Custom Book" column containing a temporary title and creation date, a "Last Date" column reflecting the CBO's last date of modification, a "Status" column indicating that the CBO is active, and a "Request ID" column that is null at this point to indicate that the CBO has not been submitted for approval.

The user now has two options: 1) he may select the new CBO for modification by clicking on the temporary CBO title, which is a hypertext link to the new CBO.; or 2) he may create another CBO by clicking on CBO button 118. Button 118 once again invokes the ECBOCreate procedure. Clicking on the CBO title causes the MYBOOKOUTLINE procedure to issue a call to the ECBOGet procedure to retrieve the CBO formatted text from the digital library 20. It then parses the text and displays the empty CBO to the user as shown in FIG. 10A. The ECBOGet procedure is described below.

ECBOGet
Description
  The content of the custom book outline/CBO is returned.
Functional Processing
  1. Verify that the CBO id passed is valid.
  2. Retrieve content of the CBO.
  3. Add Preface and Table of Contents front matter elements to the very beginning of the CBO:
  4. Add the Index back matter element to the very end of the CBO:
  5. Pricing and virtual page counts are pre-determined for these front or back matter elements and are hard-coded at this time. The attributes are adjusted for the affected Volumes as well as the CBO totals.
Parameter List

| Inputs | DSUsername |
|---|---|
|  | DSPassword |
|  | DSHostname |
|  | Userid |
|  | CBO id |
| Outputs | CBO description |
| Errors | RC_SYSTEM_ERROR |

Index Classes
  CustomBookOutline

The custom book outline is displayed in a first portion 122 of the screen of FIG. 10A. It includes the temporary title and creation date 128. A "Content" column 130 shows the default format that initially includes the volume, table of contents, preface and index. A price column 132 reflects the price of the compilation calculated thus far, as is determined by prices associated with the elements of column 130. Similarly, a "Pgs" column 134 reflects a page count calculated so far, as determined by page estimates for the elements of column 130.

The user may elect to return to the Welcome page by clicking on "CBO" button 119. Section 124 of the screen is provided to allow the user to add new chapters to the CBO. This function will be described in more detail subsequently. Section 126 enables the user to change any container (book, volume, chapter) or noncontainer (section) title by selecting the entity type via pull-down menu 125 and inserting the new title in entry field 127, then clicking on "Change" button 129. In the present example, let us assume that the user wishes to change the book title to "Internet Basics". Entity type "book" has been selected in menu 125 and the desired title has been inserted in field 127. By clicking on button 129, the ECBO-SetTitle procedure is invoked, as described below.

ECBOSetTitle
Description
  This modifies the book and container/chapter titles of the active CBO to whatever the user specifies.
Functional Processing
  1. Verify that the CBO id passed is valid.
  2. Verify that the target sequence id passed exists in the CBO. Otherwise, the target becomes the CBO itself.
  3. Set the title of the target element within the CBO.
  4. When renaming, determine if the title is protected and cannot be changed
  5. When renaming, the title text is validated by Javascript on the web page
  6. When renaming, the "<" and ">" symbols will be changed to HTML equivalents: "<"; ">"
Parameter List

| Inputs | DSUsername |
|---|---|
|  | DSPassword |
|  | DSHostname |
|  | Userid |
|  | CBO id |
|  | Target id |
|  | Title |
| Outputs | New CBO description |
| Errors | RC_SYSTEM_ERROR |

Index Classes
  CustomBookOutline

FIG. 10B shows the CBO with its new title. Let us assume that the user now wishes to add preexisting content to the CBO.

Adding Prepublished Content to a CBO
  There are two methods for selecting preexisting content: viewing a "bookshelf" of content available to the user, or searching the stored content. Searching shall be described in more detail subsequently.

To access a bookshelf, the user clicks on the "Library" tab 136 on the vertical menu bar. This action invokes a Browse-Bookshelf procedure to retrieve all or a subset of the prepublished content stored in the digital library 20. For convenience, a subset or "bookshelf" may be tailored to the particular user. In the present example, content is grouped into academic programs such as Engineering, Mathematics, English etc. Each program is assigned a unique ProgramID, and each program entity's ProgramID is stored in the Product Index class defined by the Product Entity Index Classes. Users are assigned to a program based upon department information entered at the time of system registration.

Figure 11:
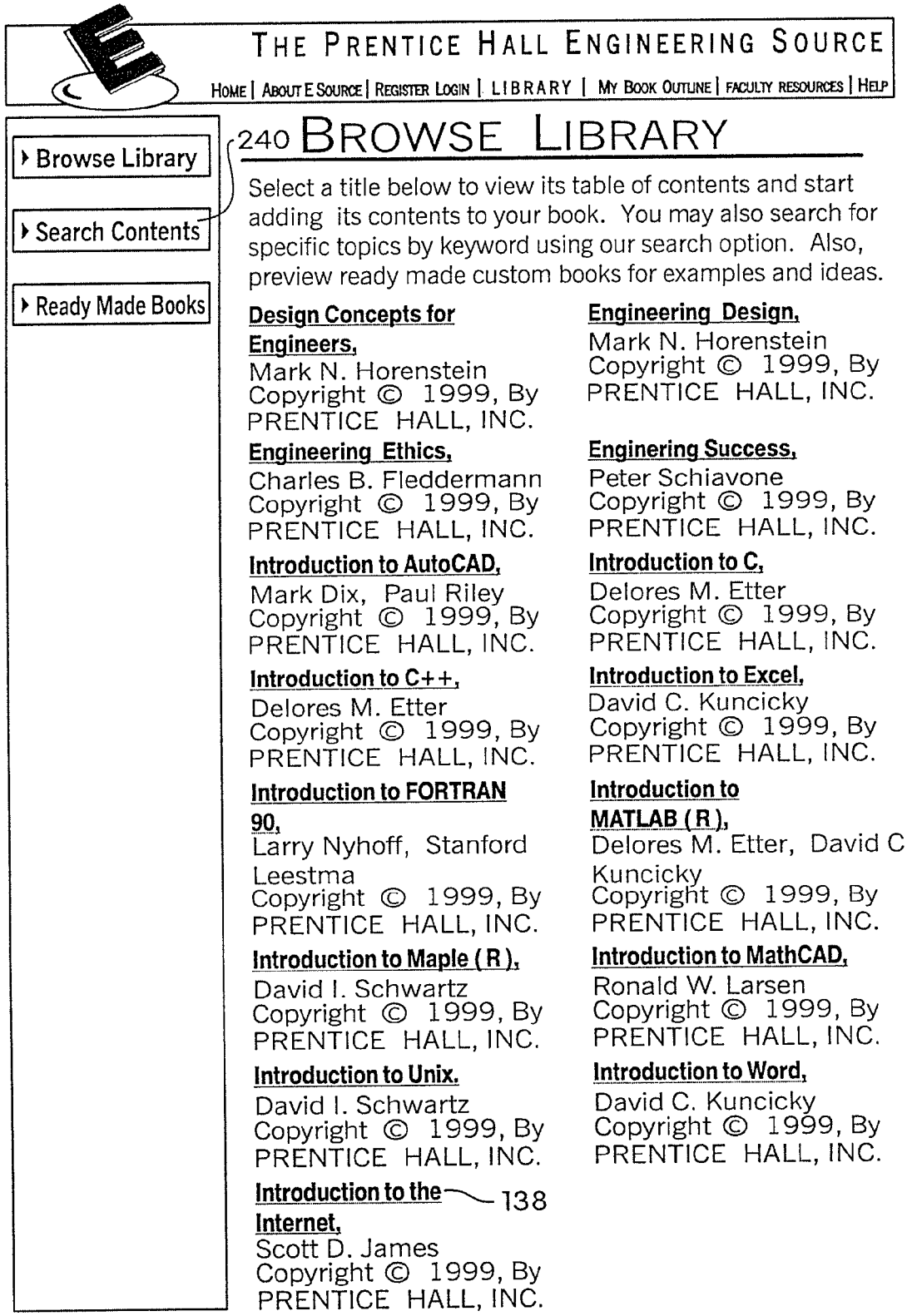

An exemplary bookshelf tailored to an Engineering program is shown in the user-interface screen of FIG. 11. It includes a list of prepublished books whose titles are hypertext links to their corresponding PSF files. By clicking on one of these titles 138, the user invokes the EProductGetOutline procedure call which retrieves the PSF file, parses it, and displays it to the user as shown in FIG. 12. The EProductine function is described below.

EProductGetOutline
Description
  This returns attribute information about an existing product stored in the digital library. It allows calling applications to retrieve the only the attributes that it needs or all attributes. It will return attributes for all entities within the product hierarchy, exposing the product outline. Sysadmin prepubcall when book becomes public. Returns entire outline/browse of bookshelf Functional Processing
I. Search for any existing prepublished content product with the product id passed.
II. Verify that there is exactly one match for the product id.
III. If the attribute list is not null, only those attributes in the list are of interest.
  A. Retrieve the requested attributes along with the various levels of entities in the existing copyright product
  B. If an attribute of interest is not found for the existing copyright product, an attribute value of null is assumed.
IV. If the attribute list is null, all attributes are of interest.
  A. Retrieve all attributes along with the various levels of entities in the existing copyright product.
  B. Retrieve the program-specific attributes related to pricing and virtual page count.
  C. Calculate and update the pricing and virtual page count information for each level of entities in the existing copyright product.
V. Export the attributes and entities description into the output buffer.
VI. Parameter List

| Inputs | DSUsername |
| --- | --- |
|  | DSPassword |
|  | DSHostname |
|  | Product id |
|  | Attribute list |
|  | Distribution country |
|  | Monetary unit |
|  | Composition set |
| Outputs | Product description |
| Errors | RC_SYSTEM_ERROR |

Index Classes
  Product
  ProductAux
  Program
  ProgramAux

The selected book is displayed by chapter as defined by the PSF format A chapter may be expanded to view its sections by clicking on its corresponding expand button 141. In FIG. 12, chapters 1 and 7 have been expanded. Each chapter and section is provided with a select box 145. The user selects content for inclusion in his custom book by checking the boxes next to the chapters and sections he desire. In the example of FIG. 12, Chapters 1 146 and 7 148 have been selected. According to the present embodiment, a user can not add chapters and sections at the same time. However, it should be apparent to the user that this implementation is merely a matter of design choice, ant that if desired, chapters and sections could be added at the same time.

Once selection is complete, the user clicks on the "Add to Book" button 144 on the vertical menu bar. This action adds the selected text to the CBO by invoking the ECBOAddContent procedure described below.

ECBOAddContent
  Description
    There are two types of content: (chapters and sections) also referred to as containers and non-containers that can be added using this function. ECBOAddContent defines separate processes depending on the content type being added.
  This function adds pre-published content into the CBO once the user has selected which content he wants to include in his CBO. The function verifies rights and pre-requisite content before the content is included. Additional volumes are constructed on an as needed basis.

Functional Processing
1. Verify that the CBO id passed is valid.
2. Check the country code in the CBO.
3. Verify that the CBO chapter location reference is valid if specified.
4. Verify that each piece of content does not already exist in the CBO.
5. For content containers (e.g. Chapter):
   a) Retrieve the piece of content by its content id (sequence number).
   b) Verify that the piece of content is indeed a container.
   c) Validate the right to distribute it.
   d) Validate the right to combine it with other contents in the CBO.
   e) If the CBO chapter location reference is valid, add the content container after the chapter location reference.
   f) If the CBO chapter location reference is null or invalid, add the piece of content to the end of the CBO. This situation occurs when a CBO contains no chapters (a.k.a. empty).
6. For content components (e.g. Sections):
   a) Retrieve the piece of content by sequence id.
   b) Verify that the piece of content is indeed a non-container.
   c) Validate the right to distribute it.
   d) Validate the right to combine it with other contents in the CBO.
   e) If the CBO chapter location reference is valid, add the piece of content to the end of the chapter location referenced, immediately before any back matter elements in that chapter.
   f) If the CBO chapter location reference is null or invalid, return error.
7. For content components (e.g. Section), process prerequisites listed one at a time:
   a) Retrieve the piece of prerequisite content by sequence id.
   b) Validate the right to distribute it.
   c) Validate the right to combine it with other contents in the CBO.
   d) If the piece of pre-requisite content does not already exist in the CBO, add it to the end of the chapter location referenced, immediately before any back matter elements. Mark it as pre-requisite, so it cannot be deleted later.
   e) If the piece of pre-requisite content already exists in the CBO, but it has never been pre-requisite before, downgrade it to the pre-requisite status so it cannot be deleted later. Location of the piece of pre-requisite content remains unchanged.
   f) If the piece of pre-requisite content already exists in the CBO, and is already in pre-requisite status, update the pre-requisite information with the current requiring content id. Location of the piece of pre-requisite content remains unchanged.
9. Perform volume management (described subsequently).
10. Perform pricing and page count calculations (described subsequently).

Parameter List

| Inputs | DSUsername |
| --- | --- |
|  | DSPassword |
|  | DSHostname |

|  | Userid |
|---|---|
|  | CBO id |
|  | Content id list |
|  | Content id count |
|  | Container flag |
|  | CBO chapter location reference |
| Outputs | New CBO description if OK; |
|  | Offending content ids if error |
| Errors | RC_NOT_FOUND |
|  | RC_DUPLICATE_NOT_ALLOWED |
|  | RC_CONTENT_NOT_CHAPTER |
|  | RC_CBO_NO_VOLUME |
|  | RC_INVALID_CBO |
|  | RC_BAD_CHAPTER |
|  | RC_BAD_CONTENT |
|  | RC_INVALID_PREREQ |
|  | RC_NO_DIST_RIGHTS |
|  | RC_NOT_COMB_RIGHTS |

Index Classes
 CustomBookOutline
 Rights
 RightsAux
 Prereq
 PrereqAux
 Product

Steps 6.d) and 7.c) above are performed to prevent mutually exclusive content entities stored in the digital library from being included the same compilation of content. The substeps necessary to perform this mutual exclusion are defined subsequently. When a content entity is added to a CBO, the Product Index class is referenced to determine if the content entity is mutually exclusive of any other content entities. If it is, then the CBO is checked to determine if any of the mutually exclusive content entities already exists in the compilation. If not, the content entity is added to the compilation, but if a mutually exclusive content entity is present, the add fails and the user is given an error message.

After the selected content is added to the CBO, the user is returned to the CBO screen and is able to view his new additions (see FIG. 13A). In the present example, the ECBOAddContent procedure has retrieved and inserted the titles of all of the sections 150 of selected chapter 1 146 and the selected sections 152 of Chapter 7 148, and has assigned new chapter and section numbers accordingly. It has also retrieved and inserted references to front and back matter 154 associated with the selected content (e.g., introductory text, summary text and sample problems). Selection boxes 157 are provided next to each chapter title and section title to facilitate further editing of the CBO.

Let us now assume that the user wishes to add his own content to the CBO.

Adding User-Provided Content to a CBO

User Provided Material (UPM) is content an instructor contributes to a CBO that is not part of the pre-published content. UPM consists of two components: title and content. The title of the UPM is inserted into the CBO's index class of contents and added to the content outline. The content is stored as a part in digital library 20. UPM can be added at either the chapter or section level. In other words, UPM can be siblings of chapters or sections.

The user first selects a location at which the UPM content is to be inserted using pull-down menu 155 (see FIG. 13). In the present example, the user may select to add the UPM to one of the existing chapters or to a new, untitled chapter. New chapter is selected in this case (not shown). The user then clicks on the "Add Content" button 156. This action invokes a UPM procedure which displays a "My Custom Content" screen as shown in FIG. 14. The user enters a title in title field 158, and the UPM content in entry window 160. The content may be designated as standard text or as a code sample. Once the content has been entered, the user clicks on button 162 to add the content to the CBO. This action invokes the ECBOAddUPM procedure described below. In the present example, ECBOSetTerms procedure is also invoked the first time the user creates UPM.

ECBOSetTerms
 Description
  The first time an UPM is created in the active CBO, the user is first asked to read the UPM terms and conditions (e.g., copyright ownership, etc.). If the user accepts them, the date/time stamp of the acceptance is recorded with the CBO.
 Functional Processing
  I. Verify that the CBO id passed is valid.
  II. Set the UPM terms and conditions date/time stamp to the time string passed in the active CBO.
 Parameter List

| Inputs | DSUsername |
|---|---|
|  | DSPassword |
|  | DSHostname |
|  | Userid |
|  | CBO id |
|  | Time string |
| Outputs |  |
| Errors | RC_SYSTEM_ERROR |

Index Classes
 E_CustomBookOutline
ECBOAddUPM
 Description
  This function adds the UPM that a user has entered into the web application into the CBO. ECBOAddUPM validates the designated insert location and stores the UPM with its associated location attributes in the digital library. The UPM title and size are stored within the CBO part. The UPM text is stored in a separate part The UPM is stored as a part whose number is determined by a UPM counter initialized to 50. This function performs the following tasks.
 Functional Processing
  1. Verify that the CBO id passed is valid.
  2. Verify that the container id passed is valid, if specified.
  3. Verify that the UPM id passed is valid, if specified.
  4. If the UPM id passed is null, this is a UPM add operation:
   a) Create a new UPM with the passed UPM title and text blob as the content. The UPM Title is placed into the CBO part and the content is placed into a new UPM part having a unique identifier defined by the attribute, S_LastUpmPartID which is an incremental counter. S_LastUpmPartID, resides in the E_CustomBookOutline index class and contains the UPM id used in the creation process. Once the UPM is stored within DL, this attribute is incremented.
   b) If the container id passed is null or invalid, insert the UPM at the end of the last chapter in the CBO, before any back matter elements in the chapter.
   c) If the container id passed is valid, insert the UPM at the end of the container referenced, before any back matter elements in the container.
   d) Note that an UPM add operation is always in the context of a container. The UPM can be moved outside the container as needed.

5. If the UPM id passed is not null, this is an UPM update operation.
  a) Verify that the UPM does exist in the CBO.
  b) Update the content of the UPM with the UPM text blob passed.
  c) The location of the UPM remains unchanged.
6. Set the UPM Title attribute in the CBO to the title passed.
7. Volume size management is performed. If an add or update causes the total virtual page count of the current volume to go above or below the volume virtual page count limit, the volumes are reorganized.
8. Pricing and virtual page count calculations are performed for each add or update operation. The net results are stored as attributes for the affected Chapter, Volumes as well as the CBO totals.

Parameter List

| Inputs | DSUsername |
|---|---|
| | DSPassword |
| | DSHostname |
| | Userid |
| | CBO id |
| | Container id |
| | Title |
| | UPM id |
| | UPM text blob |
| Outputs | New CBO description |
| Errors | RC_NOT_FOUND |
| | RC_INVALID_CBO |
| | RC_SYSTEM_ERROR |

After the UPM has been added to the CBO, the user is returned to the CBO screen where he can view the newly added material 164 (see FIG. 15A).

User-provided material may be edited by clicking on the UPM title, which is a hypertext link to the UPM part. This action invokes the ECBOGetUPM procedure to retrieves the UPM part and display it in editing window 160 of the "My Custom Content" screen (FIG. 14).

ECBOGetUPM
Description
  This will return the UPM content of an UPM section, including all of the UPM elements.
Functional Processing
  I. Verify that the CBO id passed is valid.
  II. Verify that the UPM id passed is valid.
  III. Retrieve the content of the UPM.
    A. If there is one single element in the UPM, retrieve its content into a text buffer.
    B. If there are multiple elements in the UPM, retrieve all their contents in one single text buffer, in the order they appear in the UPM.
Parameter List

| Inputs | DSUsername |
|---|---|
| | DSPassword |
| | DSHostname |
| | Userid |
| | CBO id |
| | UPM id |
| Outputs | UPM text blob |
| Errors | RC_SYSTEM_ERROR |

Index Classes
  CustomBookOutline
Once the user has entered his desired changes, he clicks on button 162 and once again invokes the ECBOAddUPM procedure. This time, the procedure recognizes the UPM as an update and follows the alternate processing path described above.

Figure 15B:
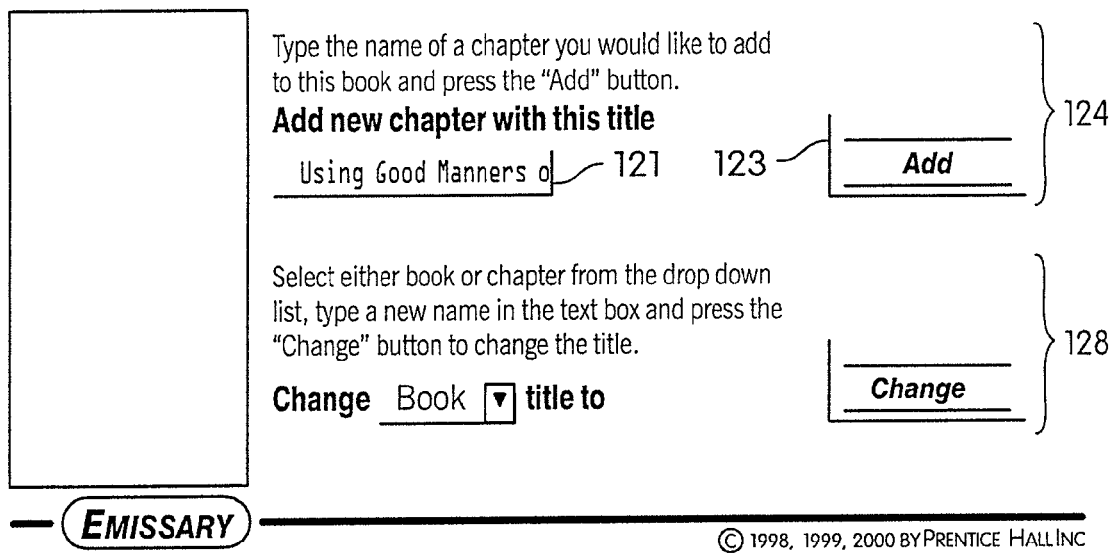

Adding New Containers to the CBO
  FIG. 15B represents the lower portion of the "My Book Outline" screen, including the "Add" and "Change" sections 124, 126 previously described. We will now assume that the user wishes to add a custom container (i.e., chapter) to the CBO in FIG. 15A. To do so, he enters a desired container title in field 121 and clicks on the "Add" button 124. This action invokes the ECBONewContainer procedure described below.

ECBONewContainer
Description
  This function will add a new container (e.g. chapter) into the user's active CBO. It does not add content to the container.
Functional Processing
  I. Verify that the CBO id passed is valid.
  II. Verify that the container type passed is valid.
  III. Create a new empty container at the end of the CBO.
  IV. Set the title attribute to the container title if specified; otherwise set the title to the default.
Parameter List

| Inputs | DSUsername |
|---|---|
| | DSPassword |
| | DSHostname |
| | Userid |
| | CBO id |
| | Container type |
| | Container title |
| | Output flag |
| Outputs | New CBO description if output flag 0; |
| | New container id if output flag 1 |
| Errors | RC_NOT_FOUND |
| | RC_INVALID_CONTAINER_TYPE |

Index Classes
  CustomBookOutline
The new container 165 is added to the CBO as shown in FIG. 16. We will now assume that the user wishes to rearrange the entities in his CBO.

Moving and Relocating Content
  There are two separate processes involving the movement of content within a CBO. These processes are: moving and relocating. Moving content involves some piece of content moving up or down by one item within a CBO. Relocation involves moving a piece of content to some other location within the CBO. Sections, UPM and chapters are the only entities permitted to be moved within a CBO. For a movement or relocation task to complete without error, the following rules must be obeyed.
1. A section must reside within a chapter
2. A chapter must reside within a volume
3. UPM must reside within either a chapter or a volume
4. A chapter/UPM is not permitted before a volume's front matter
5. A chapter/UPM is not permitted after a volume's back matter
6. A section is not permitted before a chapter's front matter
7. A section is not permitted after a chapter's back matter
8. All content must move/relocate without error, or none of the content is moved/relocated.

Content is moved within a CBO via the "My Book Outline" display screen (see FIG. 16). A user selects the content to be moved by checking its corresponding select box. In the present example, section 1.3 has been selected 166. He then specifies a target location using drop down box 168. Within the box the user may select to move an entity up or down (by one of the same entity), select an existing chapter from a current list of chapter titles, or create a new untitled chapter. In the present example, the user has selected to move section 1.3 to existing Chapter 4. After selection, the user clicks on the "Move Items" button 170.

If the user selects to move content up or down, the ECBO-MoveContent function is invoked. If he selects to move content to a different chapter or a new chapter, the ECBORelocateContent function is invoked. Both functions are described below. Both procedures cause page and price totals to be recalculated and stored in digital library via the EAdminPopulatePageAndPrice procedure, also described below.

ECBOMoveConte

Description

This function will move content up and down within the CBO per the instructors' direction. This function permits moving one or more pieces of similar content in the same call. Similar content is defined to be either all sections and UPM's or all chapters, but not hybrids of the two. It will make sure that all rules are adhered to and will also request Volume Size Management when necessary.

Functional Processing

1. Verify that the CBO id passed is valid.
2. Verify that selected content is either all chapter containers or all sections, but not a mixture of both.
3. Contents listed are moved one at a time. For moving up, the contents are processed in the order listed. For moving down, the contents are processed in the reverse order.
4. Verify that the piece of content does exist in the CBO.
5. Verify that the piece of content is not a front or back matter element. Front or back matter elements can only be moved implicitly when an entire chapter is moved.
6. When moving containers down (e.g. Chapter):
    a) Verify that after this piece of container content in the CBO, there is at least one more piece of content at the same level (e.g. Chapter, UPM Section outside a chapter).
    b) Move the piece of container content to the position after that next piece of content.
7. When moving content components Sections down:
    a) If it is the last section besides any back matter elements in a chapter, verify that chapter is not the last chapter in the CBO.
    b) Move the piece of content down by one position, but skip over any front or back matter elements. If leaving a chapter, it is moved to the beginning of the next chapter.
8. When moving content component UPM Sections down:
    a) If it is outside chapters, verify that it is not the very last element in the CBO.
    b) Move the piece of content down by one position, but skip over any front or back matter elements. If leaving a chapter, move it to the position immediately after the chapter thus at the same level as a chapter. If entering a chapter, move it after any lead front matter in the chapter.
9. When moving containers up:
    a) Verify that before this piece of container content in the CBO, there is at least one more piece of content prior to it at the same level (e.g. Chapter, UPM Section outside a chapter).
    b) Move the piece of container content to the position before that previous piece of content.
10. When moving content components up:
    a) If it is the first section besides any front matter elements in a chapter, verify that chapter is not the first chapter in the CBO.
    b) Move the piece of content up by one position, but skip over any front or back matter elements. If leaving a chapter, it is moved to the end of the previous chapter.
11. When moving content component UPM Sections up:
    a) If it is outside chapters, verify that it is not the very first element in the CBO.
    b) Move the piece of content up by one position, but skip over any front or back matter elements. If leaving a chapter, it is moved to the position immediately before the chapter thus at the same level as a chapter. If entering a chapter, move it before any trailing back matter in the chapter.
    If a move causes the total virtual page count of the current volume to go above or below the volume virtual page count limit, the volumes are reorganized.
12. Pricing and virtual page count calculations (described subsequently) are performed for each move operation and stored in digital library via the EAdminPopulatePageAndPrice procedure. The net results are stored as attributes for the affected Chapters, Volumes as well as the CBO totals.

Parameter List

| Inputs | DSUsername |
|---|---|
| | DSPassword |
| | DSHostname |
| | Userid |
| | CBO id |
| | Content id list |
| | Content id count |
| | Container flag |
| | Move flag |
| Outputs | New CBO description if OK; |
| | Offending content ids if error |
| Errors | RC_NOT_FOUND |
| | RC_INVALID_CBO |
| | RC_INVALID_MOVE |

Index Classes

CustomBookOutline

ECBORelocateContent

Description

This will relocate content to a specific location within the same CBO that was specified by the instructor. It is different than a move, which moves content one position at a time, yet it adheres to the same rules and has much of the same processing.

Functional Processing

1. Verify that the CBO id passed is valid.
2. Verify that the destination container id passed exists in the CBO.
3. Contents listed are relocated one at a time in the order provided.
4. Verify that the piece of content does exist in the CBO.
5. For content containers (e.g. Chapter), add it after the container specified.
6. For content components (e.g. Section, UPM Section), add it to the end of the container specified, before any back matter elements in that container.
    If a relocate causes the total virtual page count of the current volume to go above or below the volume virtual page count limit, the volumes are reorganized.
7. Pricing and virtual page count calculations (described subsequently) are performed for each relocate operation. The net results are stored in the digital library via the EAdminPopulatePageAndPrice function as attributes for the affected Chapters, Volumes as well as the CBO totals.

Parameter List

| Inputs | DSUsername |
|---|---|
| | DSPassword |
| | DSHostname |
| | Userid |
| | CBO id |
| | Content id list |
| | Content id count |
| | Container id |
| Outputs | New CBO description if OK; |
| | Offending content ids if error |
| Errors | RC_NOT_FOUND |
| | RC_INVALID_CBO |

Index Classes
  CustomBookOutline

EAdminPopulatePageAndPrice

Description
  Calculate and update the pricing and virtual page count information of either an existing prepublished content product or a CBO. For prepublished content products, this function is called at load time. For CBO's, it is called every time a CBO is modified in a manner affects the CBO page count or price.

Functional Processing
  I. Import content of the input filename, which is description of either one existing prepublished content product or one CBO.
  II. Retrieve the program-specific attributes related to pricing and virtual page count.
  III. Calculate and update the pricing and virtual page count information for each level of entities in the prepublished content product or CBO description.
  IV. Export the updated description as content of the output filename.

Parameter List

| Inputs | DSUsername |
|---|---|
| | DSPassword |
| | DSHostname |
| | Input filename |
| | Output filename |
| Outputs | (Content of the output file named) |
| Errors | RC_SYSTEM_ERROR |

Index Classes
  Program
  ProgramAux

Figure 17:

In the present example, "General Netiquette" section 1.3 166 is relocated to Chapter 4 by the ECBORelocateContent procedure, as shown in FIG. 17. Affected sections have been renumbered.

Deleting Content from a CBO

Content may be deleted from the custom book outline by checking the select box next to the entity to be deleted and then clicking on the "Remove" button 172 on the vertical menu bar (see FIG. 16). This action invokes the ECBORemoveContent procedure, described below.

ECBORemoveContent

Description
  This will remove content from an active CBO. It After the instructor selects sections/chapters in his active CBO, he may remove them from the CBO. It also will ensure that no content is removed that is a prerequisite to another. It will merge content back into a single volume if possible.

Functional Processing
  1. Verify that the CBO id passed is valid.
  2. Content comes in two categories, containers and non-containers. Selected content must be either all containers or all content components, but not a mixture of both.
  3. Contents listed are removed one at a time from the active CBO.
  4. Verify that the piece of content does exist in the CBO.
  5. Verify that the piece of content is not a pre-requisite of any contents in the CBO, other than those being removed this time.
  6. Remove the piece of content from the CBO.
  7. If a remove causes the total virtual page count of the current volume to go below the volume virtual page count limit, check whether it is possible to move some or all its content elements to the previous volume. If after the adjustment the current volume becomes empty, the current volume is deleted. If subsequent removes cause the total virtual page count of the current volume to go below the volume virtual page count limit, further adjustments are made as needed.
  8. Pricing and virtual page count calculations are performed for each remove operation. The net results are stored as attributes for the affected Chapter, Volumes as well as the CBO totals.

Parameter List

| Inputs | DSUsername |
|---|---|
| | DSPassword |
| | DSHostname |
| | Userid |
| | CBO id |
| | Container flag |
| | Content id list |
| | Content id count |
| Outputs | New CBO description if OK; |
| | Offending content ids if error |
| Errors | RC_NOT_FOUND |
| | RC_PREREQ_ERROR |
| | RC_INVALID_CBO |

Index Classes
  CustomBookOutline

Certain entities can be protected from deletion. In the present example, these include automatically generated components such as the Table of Contents, Preface, and Index. They also include front and back matter associated with the content sections inserted by the user. Consequently, these entities are not provided with select boxes.

A user may clear all contents of an active CBO by clicking on the "Clear Book" button 178. This action invokes a simplified version of the previous function, which essentially selects all entities, including front and back matter, UPM's and titles, and removes them from the CBO. The actual implementation is a call to the ECBODelete function, followed by a call to the ECBOCreate function. The user is left with an empty CBO shell like that of FIG. 10A.

ECBODelete

Description
  This function discards all contents of an active CBO.

Functional Processing
  1. Verify that the CBO id passed is valid.
  2. Remove the CBO entirely from the datastore.

Parameter List

| Inputs | DSUsername |
|---|---|
| | DSPassword |
| | DSHostname |

Index Classes
  CustomBookOutline

Undoing Changes to CBO

With some exceptions, a user may undo the last change to the content of his active CBO. Referring to FIG. 17, this is accomplished by clicking on the "Undo Last" button, which invokes the ECBOUndo procedure described below.

ECBOUndo

Description

This function undoes the last change to the content of the active CBO. Note that this is a single level undo capability.

For each CBO, two versions of the CBO content are maintained as separate parts in the digital library. As each CBO operation is performed, if the operation will change the content of the CBO, the active version before the change is saved as the backup version. And the new active version will include the change. Later on when the undo operation is required, the backup version is restored into the active one.

Functional Processing

I. Verify that the CBO id passed is valid.
II. Verify that the active version of the CBO is available.
III. Verify that the backup version of the CBO is available.
IV. Set the Undoable status to False in the backup version.
V. Mark the backup version as the new active version of the CBO.
VI. Remove the old obsolete active version of the CBO.
VII. The following CBO operations can be undone:
  A. ECBOAddContent
  B. ECBONewContainer
  C. ECBORemoveContent
  D. ECBOMoveContent
  E. ECBORelocateContent
  F. ECBOSetTitle
  G. ECBOSetState
  H. ECBOSetTerms
VIII. The following CBO operations cannot be undone:
  A. ECBOCreate
  B. ECBODelete
  C. ECBOUndo
  D. ECBOAddUPM
  E. ECBOSubmit
IX. The following CBO operations have no impact on the undoable status since there was no change to the CBO:
  A. ECBOGet
  B. ECBOList
  C. ECBOListByCreator
  D. ECBOGetUPM Parameter List

|         |                         |
|---------|-------------------------|
| Inputs  | DSUsername              |
|         | DSPassword              |
|         | DSHostname              |
|         | Userid                  |
|         | CBO id                  |
| Outputs | New CBO description     |
| Errors  | RC_CBO_NOT_UNDOABLE     |
|         | RC_SYSTEM_ERROR         |

Index Classes
  CustomBookOutline

Editing an Existing CBO

Returning users may already have CBO's stored in the digital library 20 that were created in previous sessions. Thus at logon, the logon procedure invokes the ECBOListByCreator procedure, which issues a query to the digital library 20 to find any CBO entries in which the E_CreatorID column matches the userid. The ECBOListByCreator function is described below.

ECBOListByCreator

Description

This will return a list of CBO's created by a particular user within a Program ID.

Functional Processing

1. Verify that program id passed is valid.
2. Search for CBO's with the program id and the creator id specified.
3. For each CBO found, output the CBO id, Type, Title, Creator id, Modification timestamp, and CBO status.

Parameter List

|         |                              |
|---------|------------------------------|
| Inputs  | DSUsername                   |
|         | DSPassword                   |
|         | DSHostname                   |
|         | Program id                   |
|         | Creator id                   |
| Outputs | CBO id list                  |
| Errors  | RC_INVALID_OR_MISSING_INPUT  |
|         | RC_SYSTEM_ERROR              |

Index Classes
  CustomBookOutline
  Program

FIG. 9B is an example of a welcome screen that may be presented to a returning user by the ECBO ListByCreator procedure. The Custom Book Outlines section 113 lists CBO's that the user created in previous sessions.

The user now has three options. He may 1) select an active CBO for modification by clicking on its title, 2) "CLONE" and modify an existing CBO by clicking on the CBO's corresponding CLONE button 116, or 3) create a new CBO by clicking on button 118.

To modify an existing CBO, the user clicks on its title. This action invokes the EDIT procedure, which retrieves the corresponding CBO and associated parts from digital library 20 (but not the actual content). The CBO is parsed and displayed to the user in the same format previously described with reference to editing a new CBO. In this case, however, there will already be entities present in the outline. The user may now add, move, or delete content as previously described.

The user may wish to create a new version of a CBO while preserving the original CBO. This can be achieved by invoking a "CLONE" function. In brief, the "CLONE" function makes a duplicate copy of an existing CBO which the user may then modify as desired. The user merely clicks on the "CLONE" button 116 corresponding to the CBO to be copied. This action invokes the ECBOClone procedure described below.

ECBOClone

Description

This function will copy an existing CBO to a new CBO for a user. It copies all UPM and pre-published material contained within the CBO. Users clone CBO's when then they:

---continued---

|         |                 |
|---------|-----------------|
|         | Userid          |
|         | CBO id          |
| Outputs |                 |
| Errors  | RC_SYSTEM_ERROR |

I. Click on the Clone button within the Login page
II. Click on the Clone button within the MyBookOutline page Functional Processing
I. Copy the existing CBO to a new CBO with user's userid and title specified.
II. Mark the new CBO's status as Working (CBO Status="1").
III. Extract the Program variables related to pricing and virtual page count, storing them in the CBO. The estimated page count and prices from the original CBO are kept on the new CBO.
IV. Writes the CBO to the digital library Parameter List

| Inputs | DSUsername |
| --- | --- |
| | DSPassword |
| | DSHostname |
| | Program id |
| | Userid |
| | Existing CBO id |
| | New CBO Title |
| Outputs | New CBO id |
| Errors | RC_INVALID_OR_MISSING_INPUT |
| | RC_SYSTEM_ERROR |

Index Classes
 CustomBookOutline
 Program
 ProgramAux

Viewing a CBO

Figure 18:

When the user has completed creating his custom book outline, he may view its contents by clicking on "Submit Request" button 180 on the vertical menu bar (see FIG. 16). This action invokes View procedure in application layer 28. Briefly, the view procedure displays the custom book in a manner as shown in FIG. 18, i.e., in a table of contents format wherein the section titles are hypertext links 190 to files containing the actual section content files retrieved. By clicking on any section title, the user invokes the EGetHTML procedure. In brief, the EGetHTML procedure retrieves the part containing the SGML contents of the selected section and passes them to an SGML to HTML converter. An example of an SGML to HTML converter suitable for use according to the present embodiment is the publicly available Omnimark Konstructor. The SGML to HTML converter performs the conversion using a data type dictionary, which defines the SGML content. The EGetHTML procedure is described in more detail below.

EGetHTML
Description
 This function retrieves the SGML content for a particular sequence id and then passes the content blob to an SGML to HTML converter (e.g., Konstructor). Search words are also passed so that the converter can highlight found words. It communicates over a TCP socket to Konstructor.
 The low resolution associated components for all sections are stored on the front-end web server for fast retrieval on presentation. Therefore, the content does not have to make a digital library call for each image, speeding up retrieval.

Functional Processing
I. Construct the header that contains tags for the sequence id, title hit words and index hit words.
II. Search for a product entity with the sequence id passed.
III. Retrieve the SGML part of this entity.
IV. Connect to the Konstructor server using the SGML hostname/IP address and port number passed.
V. Send the header information that contains tags for the sequence id, title hit words and index hit words.
VI. Send the SGML data for translation.
VII. Receive from the Konstructor server the HTML blob resulted from the translation.
VIII. Disconnect from the Konstructor server.

Parameter List

| Inputs | DSUsername |
| --- | --- |
| | DSPassword |
| | DSHostname |
| | Userid |
| | SGML hostname or IP address |
| | SGML port number |
| | Sequence id |
| | Title hit words |
| | Index hit words |
| Outputs | HTML blob |
| Errors | RC_SYSTEM_ERROR-1 |

Index Classes
 Product

4. Page and Price Calculation

The Page and Price calculations are performed by EProductGetOutline and the CBO routines using a set of algorithms against data that is stored in the digital library in both the Program and Section entities. This estimated page count and price can be overridden with actual page counts from the original pre-published sections by system administrators.
 Inputs

| CBO | UPMBYTES | Derived number of bytes of UPM in the CBO |
| --- | --- | --- |
| E_Program | AvgChrPerImage | Average characters per image |
| | AvgChrPerSGMLAC | Average characters per SGML Associated Component |
| | MaxChrPerUpmTier | Number of characters in an UPM pricing block |
| E_ProgramAux | PE_Base_Cust_Pub_Price | Base price to be added to every custom publication |
| | PE_Base_UPM_Fee | Base price to be added whenever UPM is included |
| | PE_Incr_UPM_Fee | Additional price for each UPM pricing block |
| | PE_Source_Price_Per_Page | Price per page for pre-published content included |
| | PE_UPM_Bytes_Per_Page | Number of UPM characters in a page |
| | PE_Minimum_Page_Limit | The minimum number of pages required in a custom publ. |
| | PE_Volume_Page_Limit | The maximum number of pages in a volume |
| | PE_AC_Form_ID | The associated component type defined in. |
| | PE_AC_ByteCount | Number of "characters" for that associated component type |
| E_Product | Image_Type | Type of image, as defined in |
| | Image_Type | Number of non-markup characters in content |
| | AC_ImageCount | Number of associated component images in content |
| | ACSubdocCount | Number of SGML subdocuments in content |
| | PageCount | Actual page count of content |

| | | |
|---|---|---|
| E_ProductAux | AC_Counts.ACFORMID | The associated component type defined in. |
| | AC_Counts. NUMBERAC | The number for each associated component type |
| | Use_Actuals | Switch to determine if content actual page count is used |

Outputs

None

It is desirable to construct a page and price calculator for the purpose of estimating page and pricing information for a CBO. The following page and price calculator described below was devised for this purpose. Each time the ECBOGet function is called to retrieve a CBO for displaying, the Page and Price calculation routines are run for the CBO.

Actual Page and Price calculations occur several times throughout the life of a CBO, e.g., Page and Price calculations for Chapters, Volumes and the entire CBO occur any time there is an operation performed on that CBO which includes adding, moving, or deleting content. For pricing consistency the Page and Price calculation for a pre-published section in the present embodiment occurs one and only one time for the entire life of that content inside the CBO. However, it will be understood that a system designer can alternatively decide to permit changes to prepublished sections if desired.

The price of a CBO is dependent on the page count. Therefore, the page count is calculated first. According to the present embodiment, the Chapter Page Count calculation is the aggregation of the Section and UPM Page Counts for any content that exists in that chapter. The Chapter Price calculation is the aggregation of only the Section Prices for any sections that exist in that chapter. Calculation of the Pages for volumes is the aggregation of the Chapter and UPM Page Counts for all chapters in that volume and UPM that exist as a direct child of that Volume. The Volume Price calculation is the aggregation of only the Chapter Prices for any Chapters that exist in that volume. Calculation of the Page Counts for the entire CBO is the aggregation of all of the Volume Page Counts. Price calculations for the CBO are done with the Volume Page Counts, Total UPM Page Count, Volume Prices, and the specific program variables as inputs into the CBO price calculation formula. This embodiment implies the following page count calculation order:

1. Section/UPM Page Count
2. Chapter/UPM Page Count
3. Volume Page Count
4. Book Page Count A section's page counts are estimated based upon the number of non-tag characters in the content, plus the number and type of associated components (AC). AC's are graphics appearing in the section and cannot exist outside of the section. In an effort to make the page estimating process more accurate, AC's are broken up into five different categories based on size. The categories below are differentiated and their values stored in the Program_Aux index class and their values stored in PE_AC_ByteCount. The E_ProductAux index class will then contain matching ACFORMIDs and NUMBERAC values to use in the calculation. Page counts will be rounded to the nearest tenth of a page.

1 Associated Component Categories

| | |
|---|---|
| 1 | Inline Graphic |
| 2 | Display Graphic |
| 3 | Inline Equation |
| 4 | Display Equation |
| 5 | SGML |

In some cases, the automated page/price calculator does not prove to be accurate to the original pre-published material's figures. Therefore, a Use_Actuals option is provided within the calculator. This option provides the system administrator with the capability to override a calculated value for the page and/or price values for a pre-published content. This Use_Actuals capability forms the beginning of the calculator process.

Page and Price Count Calculator Process

1. When Use_Actuals is "1" and PageCount has a value, then use PageCount
2. When Use_Actuals is "0" or PageCount has no value, then use the calculation below.
   a) First, calculate the number of "characters" in the content, using textual SGML, images, graphics, and sub-document SGML. These values are preferably calculated by Converter 10 and are loaded by the Eloader program. The calculator then multiplies the number of each category of associated component by the average byte count for each category and then adds the number of source characters (Char_Count) in the SGML. Char_Count is stored within the Product Index Class.

$$\text{Characters} = (E\_Char\_Count + \sum 1-n(NumberAC \times PE\_AC\_ByteCount)) \quad \text{Equation 2.}$$
Characters per page calculation b) Second, divide the number of "characters" by the average number of "characters" per page (AvgCharPerPage) to get the estimated page count. The AvgCharPerPage variable is stored within the Program index class and placed within the CBO at CBO create time.

$$\text{Pages} = \text{Characters}/E\_AvgChrPerPage \quad \text{Equation 3.}$$
Estimated Pre-published pages calculation 3. Calculate the UPM Estimated Page Count by dividing the number of UPM characters (UPMBytes) by the number of UPM characters per page (PE_UPM_Bytes_Per_Page). The UPMBytes is the UPM file size and is computed when the UPM is added to the CBO and stored into the CBO. The PE_UPM_Bytes_Per_Page variable is stored within the E_ProgramAux index class and placed within the CBO at CBO create time.

$$\text{UPM Page Count} = \text{UPMBytes}/PE\_UPM\_Bytes\_Per\_Page \quad \text{Equation 4. UPM Page Count Calculation}$$

Once the page count is computed, the pricing information can be derived. Pre-published content pricing is determined by first multiplying the estimated page count with the price per page value.

$$\text{Estimated Price} = \text{Pages} \times PE\_Source\_Price\_Per\_Page \quad \text{Equation 5. Estimated Base Price Calculation}$$

Note that UPM pricing is calculated at the CBO level. Therefore, the price for an UPM Section is never calculated. However, the UPM Section Page Counts are calculated every time the CBO Page and Prices are calculated.

Next, the UPM cost is calculated and added to make a total publication cost. The UPM calculation is based on a base charge for all books containing UPM content. This base charge is the minimum cost added to a book containing UPM. If a CBO contains UPM then the UPM estimated page count (UPM_Page_Count) is used to select the equation to be used. When the UPM Page Count is greater than the UPM Base Size (PE_Chars_Per_UPM Tier) perform the calculation in Equation 5. Otherwise, use the calculation in Equation 6. PE_Chars_Per_UPM_Tier is stored within the Program Index Class and stored within the CBO at creation time.

Use the greater of the minimum CBO cost (PEiMin_Order_Price) and the CBO Estimated Price.
If UPMBytes >0, then UPM_Base_Charge=PE_Base_UPM_Fee; otherwise UPM_Base_Charge=0;

CBO Estimated Price=PE_Base_Cust_Pub_Price+
$\Sigma^{1-n}$(Pages)×PE_Source_Price_Per_Page+PE_Base_UPM_Fee+((UPMBytes−PE_Chars_Per_UPM_Tier)/PE_UPM_Bytes_Per_Page)×PE_Incr_UPM-Fee       Equation 6.
Estimated Price Calculation with UPM greater than base If UPMBytes>0, then UPM_Base_Charge=PE_Base_UPM_Fee; otherwise UPM_Base_Charge=0;

CBO Estimated Price=PE_Base_Cust_Pub_Price+
$\Sigma^{1-n}$ (Pages)+PE_Base_UPM_Fee       Equation 67.
Estimated Price Calculation with UPM less than base

EXAMPLE

Figure 19:
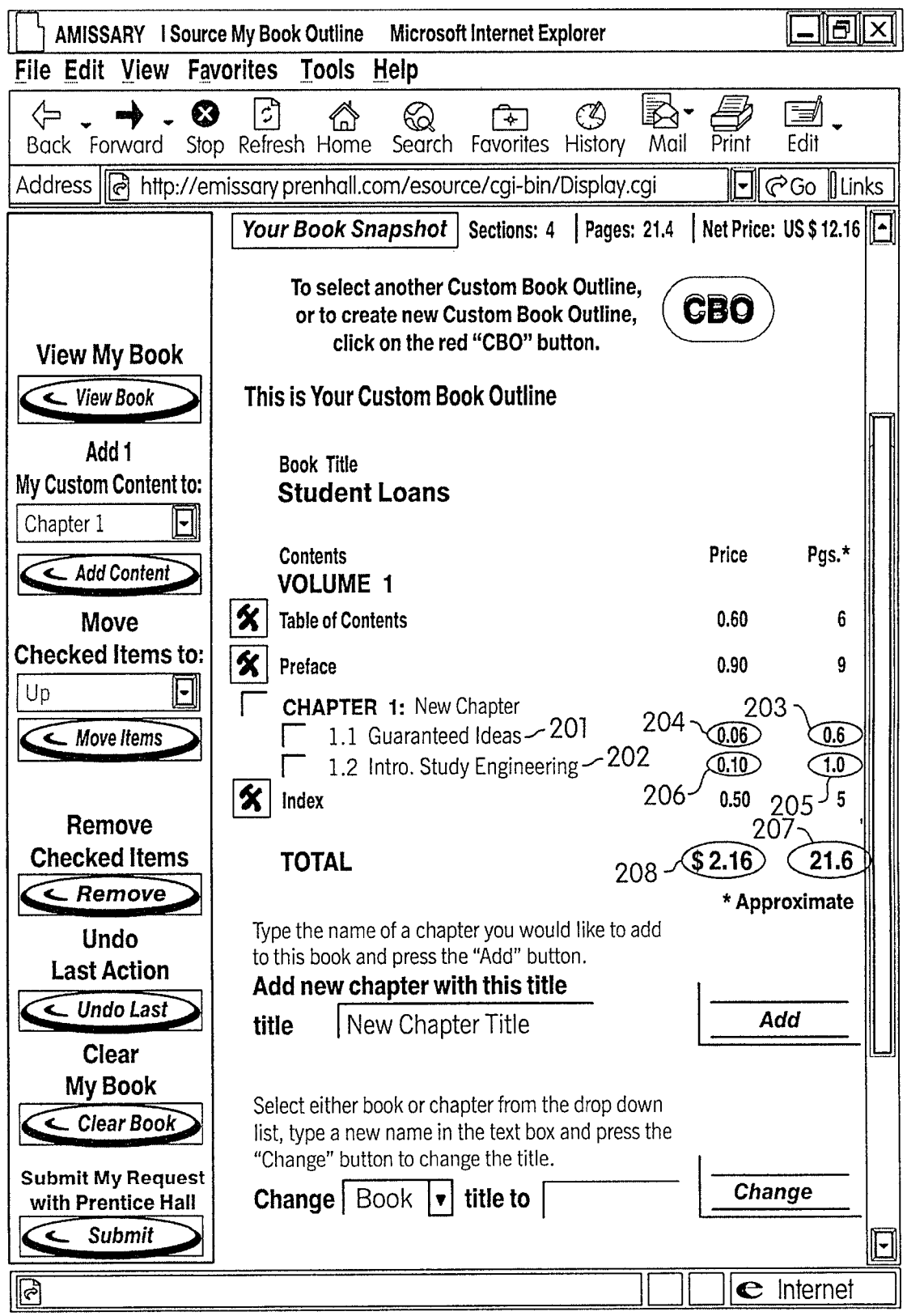

The Page and Price count example consists of a Custom Book Outline (CBO) entitled Student Loans. Referring to FIG. 19, two pre-published sections 201, 202 are added to the CBO resulting in the HTML table of contents view shown.

In the above example, the ECBOGet function was called at the conclusion of adding the two pre-published sections (ECBOAddContent). The CBO calculations are shown below.

Section 1.1 Characters=(40+(2×50)+(3×10))=170

Section 1.1 Pages=170/290=0.586=0.6 rounded       (203)

Section 1.1 Estimated Price=0.586×0.10=0.0586=0.06 rounded       (204)

Section 1.2 Characters=(70+(3×50)+(7×10))=290

Section 1.2 Pages=290/290=1.0       (205)

Section 1.2 Estimated Prices=1.0×0.10=0.1       (206)

After calculating the newly added section page and prices, the chapter's page and price calculations can be performed. This consists of the summation of it's contents. For chapter one the calculation is:

Chapter 1 Pages=0.6+1.0=1.6

Chapter 1 Estimated Price=0.06+0.1=0.16

Next, the volume page and price is calculated by summing the chapter values and adding the cost associated with the front matter and back matter (i.e. index). In this case, volume 1 contains only one chapter, 1. The page and price counts for the volume are shown below. It assumes the page and costs of the front and back matter are: 15 and 5 respectively.

Volume 1 Pages=1.6+15+5=21.6       (207)

Volume 1 Estimated Price=0.16+1.5+0.5=2.16       (208)

Lastly, the book's values are calculated by summing all the volume values. In this case, there is only one volume. The book's values are therefore the same as the Volume 1 page count and estimated price.

5. Volume Boundaries Determination

One of the inherent properties of a CBO is a maximum number of pages allowed to exist in a Volume. This volume page count limitation is retrieved from the ProgramAux index class and stored into the CBO when it is created. It is that value, stored in the CBO, that is used to define the volume boundaries for the life of that CBO. Several operations that the user can perform, including moving, relocating, adding, and deleting content, will create a need for the volume page counts for that CBO to be examined. Alterations to the layout of the volumes to accommodate Page Limits will occur automatically by this routine with the following conditions:

1) All changes to volumes are done with a move up or move down.
2) Added/Updated UPM can never have a higher page count than the Volume Page Limit
3) Added/Updated Chapters can never have a higher page count than the Volume Page Limit
4) If a Chapter is moved from one Volume to another, the Chapter is moved in its entirety. No "Chapter Splitting" is permitted.
5) After content is moved from one volume to another, the sequential order of content in the table of contents for the CBO should be exactly as before the move occurred.
6) A new volume is created if a volume page limit is exceeded and there are no volumes below that volume in which to move the exceeding content.
7) Content can be moved up if there is enough space created in a preceding volume to fit the first piece of content from the next volume.
8) If a volume no longer contains any content, it is removed.

ReorganizeCBO Routine

The reorganizeCBO routine is an internal function not defined in the API layer. It is used by other public functions (i.e. ECBOAddUPM, etc.) to facilitate volume management. This routine is responsible for managing the volume page limits of a CBO. This routine accomplishes this task in the following steps:

1) Retrieve this CBO's volume page limit from inside the CBO
2) For each volume in the CBO do the following:
   a) Calculate the number of pages in a volume X
   b) If the number of pages in volume X is greater than the limit
      i) Find the last piece of content in volume X
      ii) Make sure the size of the last piece of content is less than the Volume Page Limit
      iii) Get the next volume, X+1, in the system, or create a new one if there isn't one
      iv) Place the last piece of content at the head of volume, X+1
      v) recalculate the page counts for volume X and X+1
      vi) Re-call (a.k.a. recursion) the reorganizeCBO routine from the beginning to see if moving the last piece of content from volume X+1 to volume X has balanced everything out.
   a) Check to see if volume X−1 has enough space to move the first piece of content from volume X up into volume X−1. If volume X−1 does not exist, this step and substeps are skipped.
      i) Place the first piece of content from volume X at the end of volume X−1
      ii) Recalculate the page counts for both volume X−1 and X
      iii) Re-call (a.k.a. recursion) the reorganizeCBO routine from the beginning to see if moving the first piece of content up a volume has balanced everything out.
   a) Check to see if the volume X is empty. If so, it can be deleted.
   b) Recalculate the page and prices for the entire CBO and then go back to step a) using the next volume in the CBO. When all volumes make it through step e) the CBO is balanced and the pages and prices for the CBO have been recalculated and the routine is finished.

Figure 20A:
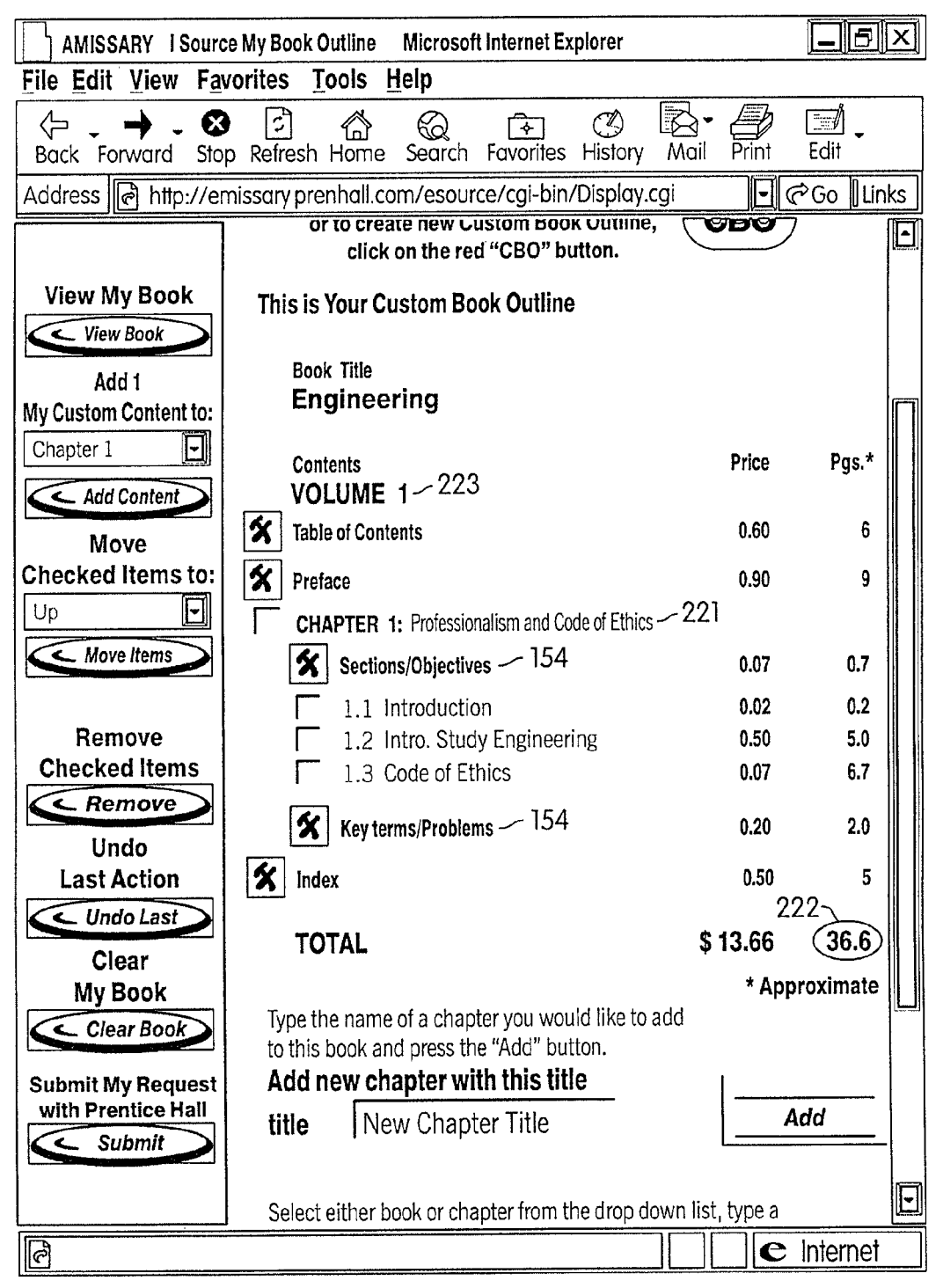

Referring to FIG. 20A, suppose we have a CBO entitled, Engineering, and the volume page limit is 45 pages. This is a rather small volume page limit, but it is suitable for this example. This CBO contains one chapter 221 entitled, Professionalism and Codes of Ethics. The page count 222 for this CBO is 36.6 pages. It remains under the 45 pages per volume limit therefore only one volume 223 exists.

Referring now to FIG. 20B, assume that we want to add a second chapter 224, Understanding Ethical Problems, consisting of 11.9 pages. Since 36.6 (chapter 1 page count including volume front and back matter)+11.9 (chapter two page count) is greater than 45, a new volume 225 must be created to hold this second chapter. This new volume 225 contains front matter and back matter 154 of its own. This additional front and back matter 154 results in a larger final page count 226 of 68.5 for both volumes.

Suppose we would like to move Chapter 2, section 2.1 227 entitled "Introduction" into Chapter 1. This can be done because section 2.1 contains only 0.3 pages and there are over 4 pages of extra room left in volume 1. The results of this move are shown in FIG. 20C.

6. Prerequisite Checking

One of the tasks performed during the process of adding and deleting content involves validation of prerequisite prepublished content. Prerequisite content is some pre-published material, B, that is required within a CBO when a piece of material, A, is included in the CBO. The location of B and A within the CBO is the responsibility of the add and delete routines. The focus of this discussion is to determine the required content for a piece of material, A.

The Business Problem

Often times within the publishing industry, a piece of content requires other content to be included. For example, a section discussing Calculus integration requires a section outlining the integration homework problems. The Calculus integration section is known as the requiring section and the homework problems is the section being required. It is important to note prerequisite content is only definable at the section level and therefore precludes chapters and volumes from being prerequisite material. These required sections are most easily understood in the form of business rules.

The table below shows six prerequisite business rules. The "Requiring Resource" column defines the resource requiring prerequisite material. The "Required Resource List" column defines the prerequisite material required. The term "Case" is equivalent to a Section, i.e., both are leaf nodes in the hierarchical model. The "Requirement Type" column is the type of the requirement. It can be either "one" or "all". If it is "one", then only one of the required resources needs to be placed into the CBO. If the CBO, contains none of the required resources then the first required resource in the list is included. In the event that the type requirement is "all", all required resources must be placed into the CBO.

The "Program Restriction" column defines the program restriction type. This column coupled with the "Programs to Include or Exclude" column defines the program context of the prerequisite material. The value of this column can be either "include" or "exclude". If it is "include", then the requiring rule only applies to those programs listed in the "Programs to Include or Exclude" column. If it is "exclude", then the requiring rule only applies to those programs not listed in the "Programs to Include or Exclude" column. "All" specifies all programs rather than having to explicitly define each one.

The "Temporal Restriction", "Effective Start Date" and "Effective Termination Date" columns define a time context for the requiring rule. A time context states for the rule to either apply only during a specified time period or not to apply at all during the specific time period. The "Effective Start Date" and "Effective Termination Date" columns define the start and terminate dates for a rule. The "Temporal Restriction" column can contain two values: "includes" and "excludes". If the value is "includes", the rule is to be applied only during the time period outlined by the "Effective Start Date" and "Effective Termination Date" columns. If the value is "excludes", the rule is not to be applied during the time period outlined in these columns.

| Requiring Resource | Requirement Type (all or one) | Required Resource List | Program Restriction Includes or Excludes | Programs to Include or Exclude | Temporal Restriction Includes or Excludes | Effective Start Date | Effective Termination Date |
|---|---|---|---|---|---|---|---|
| Section 3 | ALL | Section 2 | N/A | N/A | N/A | N/A | N/A |
| Case D* | ONE | Case B, Case C | N/A | All | N/A | N/A | N/A |
| Section 4 | ALL | Section 3 | N/A | All | Includes | May 1998 | May 1999 |
| Section 3 | ALL | Section 2 | N/A | All | Excludes | May 1999 | September 1999 |
| Case D* | ONE | Case B, Case C | Excludes | Business and Economics | Excludes | May 1999 | September 1999 |
| Case B* | ALL | Case A | Includes | MIS | N/A | N/A | N/A |

In the business rule represented by row 1, the requiring resource is Section 3 of a prepublished book and requires section two. Since the "Program Restriction" and "Programs to Include or Exclude" columns are marked "N/A", this rule is to be applied to all programs. In addition, it is to be applied all the time since no start and end dates are specified. The business rule in row 4 also pertains to Section 3. The rules of rows 1 and four are similar with the exception of the applicable time period. In this situation, section 2 is included prior to May 1999 and after September 1999. Thus, rules can be combined to form more complicated rules relationships.

A Solution

To apply the above rules to the system of the present invention, a few assumptions have been made. First, it is assumed the data model previously defined for pre-published content cannot be altered significantly to incorporate these changes. Second, when a piece of content is added or deleted, it is assumed the corresponding function handles the location of the material within the CBO. Third, it is assumed this solution must only define the applicable business rules for defining prerequisite material.

A challenge posed by the business rules shown above is in the area of program and time period exclusions. This is due to the fact exclusion and inclusion rules can often conflict with one another. In the present embodiment, the defining of rules has been limited to "positive" rules to reduce the possibility of exclusion time periods. In other words, in the example described previously regarding section 3 requiring section 2, the 1st and 4th rules can be replaced with the following two rules.

| Requiring Resource | Requirement Type (all or one) | Required Resource List | Program Restriction Includes | Program to Include | Temporal Restriction Includes | Effective Start Date | Effective Termination Date |
|---|---|---|---|---|---|---|---|
| Section 3 | ALL | Section 2 | N/A | N/A | Includes | September 1977 | May 1999 |
| Section 3 | ALL | Section 2 | N/A | N/A | Includes | May 1999 | September 1999 |

In an effort to reduce the possibility for conflicting rules, the negative or exclusive rules have been replaced with positive rules. In addition, the required resource list is only permitted to have one section per rule (row). This implies that the requirement type is always one and can therefore be eliminated from the grid. Similar to the resource column, the "Programs to Include" column is only permitted to have one program per rule (row). Lastly, it is assumed the program is explicitly stated. The grid below shows a simplified grid as a result of making these assumptions.

| Requiring Resource | Required Resource | Program to Include | Effective Start Date | Effective Termination Date |
|---|---|---|---|---|
| Section 3 | Section 2 | Business Economics | September 1977 | May 1999 |
| Section 3 | Section 2 | Business Economics | September 1999 | September 2099 |

The following grid shows another example involving the two rules (rows 2 and 5) for Case D defined in the first table. The 5th rule has been converted into four rules (rows 1-4, below) and the 2nd rule has been converted into two rules (rows 5 and 6, below).

| Requiring Resource | Required Resource | Program to Include | Effective Start Date | Effective Termination Date |
|---|---|---|---|---|
| Case D | Case B | Business Economics | N/A | N/A |
| Case D | Case C | Business Economics | N/A | N/A |
| Case D | Case B | Business Economics | September 1997 | May 1999 |
| Case D | Case B | Business Economics | September 1999 | September 2099 |
| Case D | Case C | Business Economics | September 1997 | May 1999 |
| Case D | Case C | Business Economics | September 1999 | September 2099 |

A rule collision exists in the preceding table for the program business economics between the dates of May 1999 and September 1999. During this time, rules 3-6 do not apply. However, rules 1 and 2 do apply since they do not have a defined start and termination time period. The result is that Cases B and C are prerequisites at all times (even between May 1999 and September 1999). Prior to May 1999, rules 3 and 4 are exercised. Between May 1999 and September 1999, rules 1 and 2 are exercised and after September 1999 rules 5 and 6 are used. The effect desired is for no rules to be exercised between May 1999 and September 1999. This can be accomplished by removing rules 1 and 2. At the present time, this problem has a low likelihood of occurring and is thus left to the system administrator to manage. The system administrator is informed this is an erroneous situation and is requested to remove rules 1 and 2.

The prerequisite content is defined at the time a pre-published book is loaded. An editor identifies the prerequisite content for a pre-published book and defines it in the format defined in the grid below. Ths format is placed into a PSF/ATR file and loaded into DL using the same facility that loaded the pre-published books, batch load facility.

| BNF Grammar Construct | Value |
|---|---|
| <prereq content> | <relation> |
| <relation> | RELATION: <sequence id> [ <prereq attr group> ]+ |
| <prereq attr group> | !PREREQ !KIND: <kind> !PROGRAM: <program id> !REQUIREDID: <sequence id> !STARTDATE: <date> !ENDDATE: <date> !DESCRIPTION: <description> |
| <kind> | Requires |
| <program id> | A 2 letter string |
| <sequence id> | XXXXXXXXXX.CC.SS.00 where X is the ISBN number; C is the chapter number; S is the section number. |
| <date> | mm/dd/yy where mm is the month; dd is the day and yy is the year. |
| <description> | A text description to the end of line |

Suppose Section 3's ISBN number is 0234567891.01.03.00 and Section 2's ISBN number is 0343434343.02.02.00. The following grid defines two sample rules. The following PSF/ATR file format represents these two rules.

| Requiring Resource | Required Resource | Program to Include | Effective Start Date | Effective Termination Date |
|---|---|---|---|---|
| Section 3 | Section 2 | Business Economics | September 1977 | May 1999 |
| Section 3 | Section 2 | Business Economics | September 1999 | September 2099 |

```
RELATION: 0234567891.01.03.00
  !PREREQ
    !KIND: Requires
    !PROGRAM: FE
    !REQUIREDID: 0343434343.02.02.00
    !STARTDATE: 09/01/1977
    !ENDDATE: 05/01/1999
    !DESCRIPTION: Rule One
  !PREREQ
    !KIND: Requires
    !PROGRAM: FE
    !REQUIREDID: 0343434343.02.02.00
    !STARTDATE: 09/01/1999
    !ENDDATE: 09/01/2099
    !DESCRIPTION: Rule Two
```

A group of configuration files are used in defining the DL data model to PSF/ATR file format mappings. In the case of prerequisite information, the DL data model consists of the following two index classes. The index class attribute to PSF/ATR file mappings are also provided.

Prereq Index Class

| SeqID | Seq__ID | Ext..Alpha [32] INDEXED |
|---|---|---|
| EntityType | PSF | Ext..Alpha [32] |
| ParentItem | Program generated | Ext..Alpha [16] |
| SiblingItem | Program generated | Ext..Alpha [16] |
| ChildItem | Program generated | Ext..Alpha [16] |
| AuxItem | Program generated | Ext..Alpha [16] |
| SubcompItem | Program generated | Ext..Alpha [16] |
| ProgramID | PE__ID<br>AC__PE__ID | Alpha [4] |

PrereqAux Index Class

| SeqID | PSF | Ext. Alpha [32] |
|---|---|---|
| PrereqItem | Program generated | Ext. Alpha [16] |
| ParentItem | Program generated | Ext. Alpha [16] |
| SiblingItem | Program generated | Ext. Alpha [16] |
| ChildItem | Program generated | Ext. Alpha [16] |
| Keyword | Relation<br>Kind<br>RequiredID<br>StartDate<br>EndDate<br>Description | Alpha [32] |
| Value | ATR file | Ext. Alpha [254] |
| NextValueItem | Program generated | Ext. Alpha [16] |

Once the data is loaded into these index classes, it can be queried by the add and delete functions. Each time the add and delete functions need to determine the applicable rules, a query is made to the PreReq index class. A sample query which searches for those rules applicable to a section, 0562423452.03.02.00, is shown below.

```
EntityType == RELATION
Kind == 'Requires' AND
Program == 'FE' AND
Seq__ ID == '0562423452.03.02.00' AND
StartDate <= 'today's date' AND
EndDate >= 'today's date'
```

The results from the query are the list of required sequence identifiers for the specified requiring sequence identifier. With the list of requiring ids identified, the add, and delete operations can manipulate the sections appropriately.

7. Rights Management (Mutual Exclusiveness)

One of the tasks performed during the process of adding content involves validation of rights management. Rights management consists of performing mutual exclusive checks on content prior to adding it to a CBO. Mutual exclusive content is some pre-published material, B, that is not permitted in the same publication as some piece of material, A. The location of B and A within the CBO is the responsibility of the add routine. The focus of this discussion is to determine the mutually exclusive content for a piece of material, A.

The Business Problem

At times within the publishing industry, a piece of content is not permitted to appear in the same publication as another piece of content. For example, two authors, Joe and Sarah, have a dislike for one another and have stated they do not allow their works to be published together. To prevent this situation, a check is performed when adding pre-published content authored by Joe to a CBO to make sure the CBO does not already contain pre-published content by Sarah.

The described problem requires business rules for pre-published content to be defined in the datastore. These business rules are in the form of: content A cannot exist with content B. Due to the term "cannot" in these business rules, the rules are considered negative business rules. This is in contrast to prerequisite checking, where positive business rules of pre-published content inclusion applied. In the event one of the negative business rules are true, the pre-published content is not added to the CBO.

Each negative business rule consists of two pieces of information: the pre-published content, A, being added and the pre-published content, B, not permitted to exist with A. One or more negative business rules can be defined for a pre-published content A having different pre-published content B specified.

The following grid illustrates two negative business rules. In the first rule, pre-published content, A, is not permitted to be added to a CBO containing pre-published content, B. In the second rule, pre-published content, A, is not permitted to be added to a CBO containing pre-published content, C.

| Prepublished Content to be Added | Prepublished Content Not Permitted to Exist Within CBO |
|---|---|
| A | B |
| A | C |

A Solution

To apply the above negative rules to the system of the present invention, a few assumptions have been made. First, it is assumed the data model previously defined for pre-published content cannot be altered significantly to incorporate these changes. Second, when a piece of content is added, it is assumed the corresponding function handles the location of the material within the CBO. Third, it is assumed that this solution must only define the applicable business rules for defining mutually exclusive material.

Unlike the pre-requisite material, mutually exclusive material does not have a time period associated with it. A mutually exclusive rule is assumed to be in effect at all times. Since no time period is defined for the rules, contradictory rules cannot exist. Thus the data model representing these rules is simpler than that for pre-requisite material rules.

The mutually exclusive content is defined at the time a pre-published book is loaded. An editor identifies the mutually exclusive content for a pre-published book and defines it in the format defined in the grid below. This format is placed into a PSF/ATR file and loaded into DL using the same facility that loaded the pre-published books, i.e., the loader 14 batch load facility.

| BNF Grammar Construct | Value |
|---|---|
| <mutually exclusive content> | <relation> |
| <relation> | RELATION: <sequence id><br>[ <prereq attr group> ]+ |
| <prereq attr group> | !EXCLUSION<br>!PROGRAM: <program id><br>!EXCLUDEID: <sequence id><br>!DESCRIPTION: <description> |
| <program id> | A 2 letter string |
| <sequence id> | XXXXXXXXXX.CC.SS.00 where X is the ISBN number; C is the chapter number; S is the section number. |
| <description> | A text description to the end of line |

Suppose a Section 3 has an ISBN number is 0234567891.01.03.00 and a Section 2 has an ISBN number is 0343434343.02.02.00. Both sections have been selected for addition to a CBO. The following grid defines two sample rules. The first rule states to not permit pre-published content, Section 3, to be added to a CBO containing pre-published content, Section 2, for a program, Business Economics. The second rule states to not permit pre-published content, Section 2A, to be added to a CBO containing Section 3C, for the program, Freshmen Engineering.

| Prepublished Content to Add | Mutually Exclusive Pre-Published Content | Program to Include |
|---|---|---|
| Section 3 | Section 2 | Business Economics |
| Section 2 | Section 3 | Freshmen Engineering |

The following PSF/ATR file format represents these two rules.

```
RELATION: 0234567891.01.03.00
    !EXCLUSION
        !PROGRAM: BE
        !EXCLUDEID: 0343434343.02.02.00
        !DESCRIPTION: Rule One
RELATION: 0343434343.02.02.00
    !EXCLUSION
        !PROGRAM: FE
        !EXCLUDEID: 0234567891.01.03.00
        !DESCRIPTION: Rule Two
```

Assuming only the preceding two rules exist in a system, adding Section 2 to a CBO containing Section 3 within the Business Economics program would be permitted, contrary to the intended result. The following reciprocal rule can be generated to eliminate this situation.

| Prepublished Content to Add | Mutually Exclusive Pre-Published Content | Program to Include |
|---|---|---|
| Section 2 | Section 3 | Business Economics |

Therefore, each rule excludes a section of material, A, from being added to a CBO containing another section of material, B. If it is desired to have material A exclude material B and material B exclude material A then two business rules are necessary. One rule for each exclusion.

As previously described, group of configuration files are used in defining the digital library 20 data model to PSF/ATR file format mappings. In the case of rights management information, the data model consists of the following two index classes. The index class attribute to PSF/ATR file mappings are also provided.

Rights Index Class

| SeqID | Seq_ID | Ext . . . Alpha [32] INDEXED |
|---|---|---|
| AuxItem | Program generated | Ext . . . Alpha [16] |
| ProgramID | PE_ID | Alpha [4] |
|  | AC_PE_ID |  |

RightsAux Index Class

| SeqID | PSF | Ext. Alpha [32] |
|---|---|---|
| RightsItem | Program generated | Ext. Alpha [16] |
| SiblingItem | Program generated | Ext. Alpha [16] |
| ChildItem | Program generated | Ext. Alpha [16] |
| Keyword | Relation Description | Alpha [32] |
| Value | ATR file | Ext. Alpha [254] |

For each relation defined in the PSF files, a row is added to the Rights index class. For each exclusion within the relation, a row is added to the Rights_Aux index class. All the exclusions for a relation are ordered prior to loading into these index classes. The unique identifier of the first exclusion's row is placed into the AuxItem column of the relation's AuxItem column within the Rights index class. The SiblingItem column of each exclusion contains the unique identifier of the next exclusion within a relation. The last exclusion for a relation contains nothing in the SiblingItem field. Once the data is loaded into these index classes, it can be queried by the add function. Each time the add function needs to determine the applicable rules, a query is made to the Rights index class. A sample query which searches for those rules applicable to a section, 0562423452.03.02.00, is shown below.

```
EntityType == RELATION
ProgramID == 'FE' AND
Seq_ID == '0562423452.03.02.00'
Return the AuxItem column
```

The results from the query are the values within the AuxItem column that are required sequence identifiers for the specified excluded sequence identifier. The Rights Aux index class can be further queried to determine those sequenced ids of the excluded material. With the list of exclusion's ids identified, add operations can manipulate the sections appropriately.

8. Searching for Content

As mentioned previously, there are two methods for selecting content to include in a custom book outline. The first is to select content from a bookshelf. The second is to search the content by querying the digital library 20 based on user-provided search terms. Referring back to FIGS. 3 and 6, the search capability is defined by the search support 52 in the underlying digital library 20.

In the present example, the IBM Digital Library includes a parametric search capability for searching attributes defined in the data model, and a text searching capability (through the IBM Intelligent Miner for Text) for searching the content itself. It will be understood that no search capability is required for the present system to be functional. Other types of search capability may be provided in addition to, or in place of the search capability described. For example, the IBM Digital Library is also able to provide legacy searching capability, search gateways, and Query by Image Content.

The search capabilities present are made available to the user through an EQuery application in API Layer 30 communicating with the digital library 20. The EQuery API and application layers provide the ability to perform hierarchical searches against digital library, which is a non-hierarchical data store. This is achieved by the way the data is stored in the entity groups: primary/auxiliary. All hierarchical levels of a pre-pub book are stored within the same digital library index class. Therefore, one or more simple digital library/Intelligent Miner for Text queries on these primary/auxiliary index classes are all that are needed to perform hierarchical searches.

An interesting challenge still remains—merging the results of individual queries performed on different hierarchical levels. This problem is addressed using "hit masks", and will be discussed in more detail subsequently.

EQuery as implemented in the present embodiment includes two formal interfaces: One is internal and available directly as a native language function call, i.e., a Search function residing in application layer 28. The other is external and available via the command line and is used primarily for testing and diagnostics. The native language call uses memory buffers for the input search criteria and output search results. The command line version uses files for the input search criteria and output search results. Both interfaces use the same search criteria format and search results format according to the following rules:

Search Criteria Specification

General Rules

1. Every line is terminated by a newline charater.
2. Each line that begins with a semicolon in the first column will be ignored. It may be used to start some comments.
3. Search Criteria structure consists of one or more Individual Queries.
4. The results of all the Individual Queries will be merged by entities to form one single Search Results structure.

Individual Query Rules

1. Each line that begins in the first column (assuming not a semicolon) is the beginning of a new Individual Query.
2. The scope ENTITY indicates that the query scope will be the particular entity type specified by the Search Level. Only those entity types listed in the group attribute files (*.atr files) are valid.
2. The scope GROUP indicates that the query scope will be all the entity types within one particular data model group specified by the Search Level. Only those data model groups listed in the groups file are valid.
3. The Return Attribute List is a list of attributes to be returned for each hit. The list is optional. If the list is left out, only Entity Type and Sequence-ID for each hit will be returned. Only those attributes of type ENTITY or type SYS are supported in the Return Attribute List. If an attribute specified is not found or its attribute value is NULL for a particular hit, the attribute is simply ignored with no errors.
4. The body of an Individual Query may contain one Text Search Expression, or one Parametric Expression, or one Text Search Expression followed by one Parametric Expression.

Text Search Expression Rules

1. A line that begins with exactly one tab followed by TEXT=is the beginning of a Text Search Section.
2. The Text Attribute following TEXT=indicates indirectly which text index in TextMiner to query on. Only those attribute defined to be associated with a text index are valid.
3. The body of a Text Search Section may contain one Free Text term, or one Text Search Expression, or one Free Text term followed by one Text Search Expression.
4. The valid Boolean Operators are AND (set intersection) and OR (set union).
5. The valid Text Search Types are EQ (contained in document), NE (not contained in document), II (is in document), NI (is not in document).
6. Since the text index type chosen, Ngram, does not support Free Text, the Free Text term is provided only for backward compatibility purpose. The Free Text search string is always converted internally to multiple search words grouped by OR.
7. A line may not have more than one additional tab from the previous line, if the previous line contains a Boolean operator. A line may not have more tabs than the previous line in all other cases.
8. A line with fewer tabs than the line previous to it is a sibling of the most recent line with the same number of tabs as the current line.

Parametric Expression Rules

1. A line that begins with exactly one tab that is not followed by TEXT=is the beginning of a Parametric Section.
2. The valid Boolean Operators are AND (set intersection) and OR (set union).
3. The valid Parametric Types are EQ (equal), NE (not equal), II (is in), NI (is not in).
4. The Parametric Value NULL is only valid when the Parametric Type is either EQ or NE.
5. The Parametric Attribute indicates which column in the underlying database to query on. Only those attributes defined as mapped to a DL attribute are valid.
6. A line may not have more than one additional tab from the previous line, if the previous line contains a Boolean operator. A line may not have more tabs than the previous line in all other cases.
7. A line with fewer tabs than the line previous to it is a sibling of the most recent line with the same number of tabs as the current line.

EQuery BNF Grammar

```
Search_Criteria := <Indiviual Query> | {<Indiviual Query>]*
Individual Query := <Query_Header> <Query_Body>
Query Header := <Scope> =<Search_Level> :<Return_Attribute_List> \n
Scope := ENTITY || GROUP
Search_Level := <Entity_Search_Level> || <Group_Search_Level>
     Entity_Search_Level := Name of any entity type defined in the group attribute
file
     Group_Search_Level := Name of any data model group defined in the groups
file
Return_Attribute_List := <Attribute>[,<Attribute>]*
Attribute := <Parametric_Attribute>|| <System_Attribute>
     Parametric_Attribute := Name of a DIGITAL LIBRARY attribute
defined in a group attribute file
     System_Attribute := Name of an attribute defined in a group attribute file
generated by system
Query Body := <Text_Search_Section> | <Parametric_Section>] || <Parametric_Section>
Text_Search_Section := \tTEXT=<Text_Attribute> \n<Text_Search_Option>
Text Attribute := Name of an attribute defined in a group attribute file with a text index
Text_Search_Option := <Text_Search_FreeText>[<Text_Search_Expression>] ||
<Text_Search_Expression>
Text_Search_FreeText := \t\t<String>,IT\n
```

-continued

```
Text_Search_Expression := <Text_Search_Term> ||
<Text_Search_Boolean_Expression>
Text_Search_Term := <TS_Tab_Level>
<Text_Search_Argument>,<Text_Search_Type>\n
TS_Tab_Level := The level/sublevel of tab nesting
Text_Search_Argument := "<String>"
String := Any search string
Text_Search_Type := EQ || NE || II || NI
Text_Search_Boolean_Expression := <TS_Tab_Level>
<Boolean_Operator>\n<Text_Search_Expression> [<Text_Search_Expression>]*
Boolean_Operator := AND || OR
Text_Search_End_Term := <Text_Search_Term><Text_Search_Term>
Parametric Section :=\t<Parametric_Expression>
Parametric_Expression := <Parametric_Term> || <Parametric_Boolean_Expression>
Parametric_Term :=
<PM_Tab_Level><Parametric_Value>,<Parametric_Type><Parametric_Keyword>\n
PM_Tab_Level := appropriate number of tabs for this level
Parametric_Value := "<String>" || NULL
Parametric_Type := EQ || NE || II || NI
Parametric_Keyword := "<Parametric_Attribute>"
Text_Search_Boolean_Expression := <PM_Tab_Level> <Boolean_Operator>\n
<Parametric_Expression> [<Parametric_End_Term>]*
```

Interface Specification
Native Language Call Arguments

Linkage:
```
        int EQuery(  char*            pCriteriaBufferCriteria,
                     char**           ppResultsBuffer);
``` pCriteriaBuffer points to a null-terminated buffer containing the search criteria. PResultsBuffer points to another pointer, which will point to a null-terminated buffer containing the search results.

The buffer needed to hold the results will be dynamically allocated, and *ppResultsBuffer will point to the new buffer. If there is no results, the results buffer is allocated, but is empty. If an error is encountered, the results buffer is not allocated, leaving *ppResultsBuffer set to NULL.

Command Line Arguments
Syntax:
EQuery <query file name> 
<query file name> names a file containing the search criteria as described in Appendix A.
 names a file where the search results as described in Appendix B should be placed.
Example:
EQuery 012345678.qry 012345678.res This will launch EQuery using the file called "012345678.qry" to get the query search criteria. The hit results will be stored in the file "012345678.res".

Figure 21A:
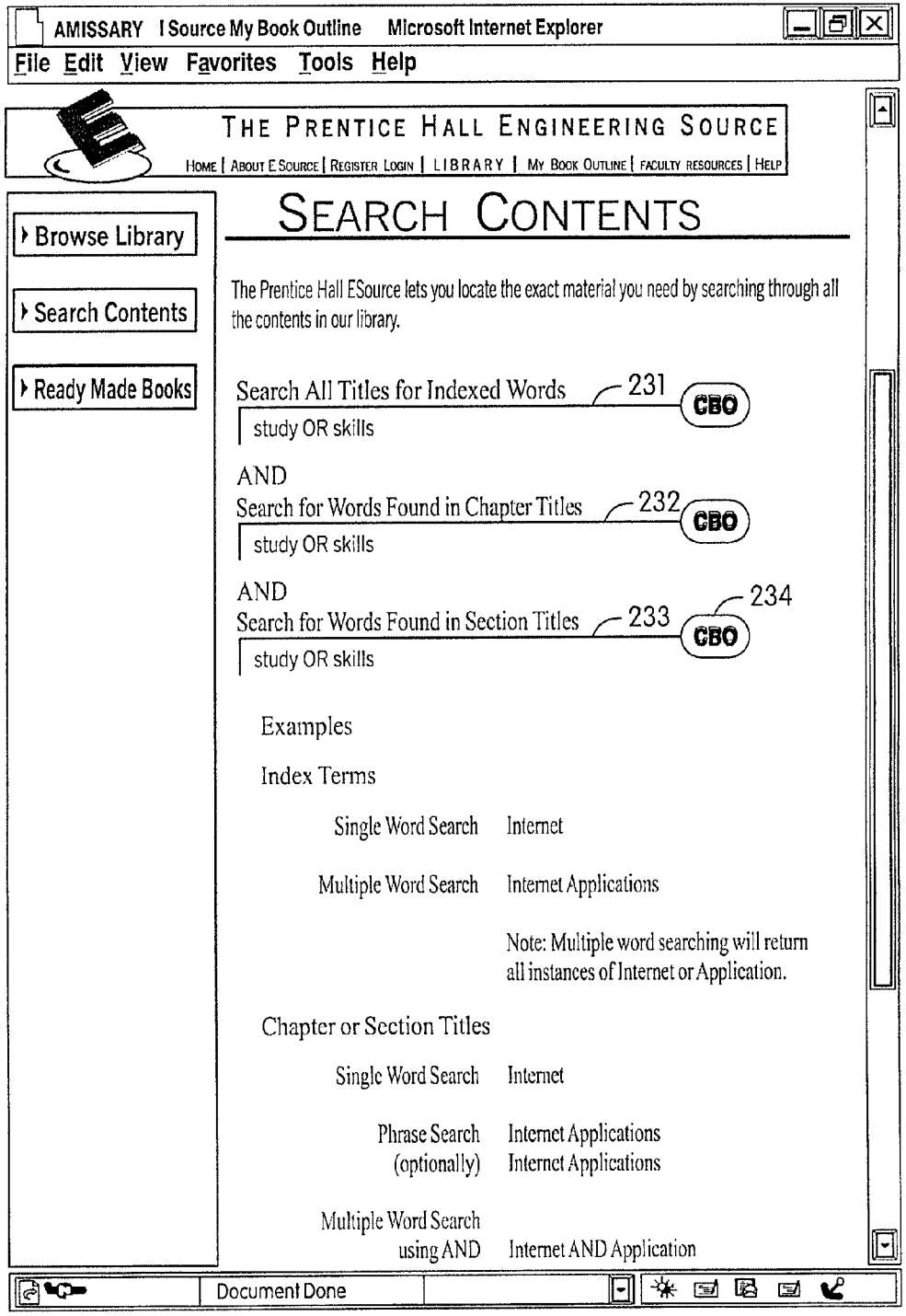

To initiate a search through the native language call, the user inputs search terms via a static HTML search screen displayed in FIG. 22. The search screen is invoked by clicking on the "Search Contents" button 240 provided on the vertical menu bar of the Bookshelf page (see FIG. 11). An exemplary search screen is shown in FIG. 21A. The search screen includes input fields appropriate for the search capabilities supported. The "Chapter Titles" field 232 and a "Section Titles" field 233 of the present example are provided in support of parametric searching of the Title attribute defined in the Product Index Class. These fields are a matter of design choice and may be changed to specify any or all attributes defined in the data model. The "Index Words" field 231 is provided for entering text search terms in support of free text searching. By design choice, the search criteria entered into these fields will be ANDed together, as indicated by the "AND's" between the fields. However, other Boolean operators may be supported. Full Boolean logic is preferably supported within all fields.

Assume that the user is interested in finding chapters with the string "Engineering" in the titles, and the chapters contain sections with either "engineering" or "study" or "skills" in the titles, and the word "study" or "skills" is one of the index terms for the sections. To that end, the user has entered the search terms "study OR skills" into the text search field 231, "Engineering" into chapter title field 232, and "engineering OR study OR skills" into section title field 233, as shown in FIG. 21A. By clicking on any "GO" button 234, the user invokes the Search procedure.

The search procedure receives the search terms and formats it for delivery to the EQuery search application. Input criteria from each field are treated as separate queries. Below is an example of the formatted search criteria, passed as the input parameter to Equery.

```
ENTITY=CHAPTER.C:Hits,Rank,Title,HitWords
    AND
            "engineering",II,"Title"
            "FE",EQ,"PE_ID"
            "1",EQ,"Status"
    ENTITY=SECTION:Hits,Rank,Title,HitWords
    AND
            OR
                "engineering",II,"Title"
                "study",II,"Title"
                "skills",II,"Title"
            "FE",EQ,"PE_ID"
            "1",EQ,"Status"
    ENTITY=SECTION:Hits,Title,Rank,HitWords
        TEXT=Index_Term
            OR
                "study",II
                "skills",II
        AND
            "FE",EQ,"PE_ID"
            "1",EQ,"Status"
```

Additional parametric constraints may be appended at this time to improve the efficiency of the search. For example, the search criteria above have been ANDed with the user's program ID (PE_ID) and a status value equal to "1" (indicating that the prepublished text is available for use). In addition, the chapter title search criteria are ANDed with the constraint of entity type equal to chapter, and section title search criteria are ANDed with the constraint of entity type equal to section.

EQuery receives the search criteria and reformats them as necessary for input to the data repository. The query input format depends on the search support available. In the present example, the query is reformatted for input to the IBM DB2 Digital Library with TextMiner support. This involves parsing the search criteria and mapping the attribute names known by the web site into the attribute names in digital library as defined by the ELOADER.INI configuration file, EQuery sends the following search conditions (as part of the query strings) to the digital library OO API 42.

```
Query 1, Text Search condition:
    NONE
Query 1, Parametric condition:
    COND=((E_EntityType == "CHAPTER.C") AND
    ((E_Title LIKE "%engineering%") AND
    (E_ProgramID == "FE") AND (E_Status == "1")))
Query 2, Text Search condition:
    NONE
Query 2, Parametric condition:
    COND=((E_EntityType == "SECTION") AND
    (((E_Title LIKE "%engineering%") OR (E_Title LIKE %study%")
    OR
    (E_Title LIKE "%skills%")) AND
    (E_ProgramID == "FE") AND (E_Status == "1")))
Query 3, Text Search condition (conceptually):
    COND=('study' OR 'skills')
Query 3, Parametric condition:
    COND=((E_EntityType == "SECTION") AND
    ((E_ProgramID == "FE") AND (E_Status == "1")))
```

The OO API 42 receives this input, then sends the text search to Text Miner through the TextMiner API, and the parametric search to the digital library. The TextMiner API and indexing requirements are described in the Digital Library Text Search Using TextMiner Application Programming Reference, First Edition (September 1997) available from IBM Corporation.

A set of entities is returned by digital library 20 that matches the search criteria for each individual query. If more than one query is specified, as in the example, then all queries are performed and the individual result sets are combined via a set union operation and returned as a single result set. During the union process, a hit mask is built for the Entity (described in more detail subsequently) to indicate which one or more of individual queries returned the Entity. This hit mask is returned with the merged result set if the "Hit" term has been specified in the return attribute list. The Entities will be returned in sequence-ID order.

Each query may list a subset of all possible attributes to be output for each Entity found. Only attributes with non-NULL values will be placed in the output. The format of the attributes will be the same as the Attribute File as defined in "ATTRIBUTE Definitions" above. Additional system generated attributes may be added to the list of attributes for each item found. These may include a query-hit mask, text search relevance ranking, and hit words for titles and index terms, for example.

Search Results Specification

The format of the Search Results is a merging of a Product Structure File (PSF) and an Attribute File. Each hit from an Individual Query will produce at least one line in the file. The line includes the Entity Type and the Sequence_ID as defined in the original PSF. In addition, if any attribute name was specified in the Return Attribute List and the attribute value is not NULL for this hit, the attribute name-value pair will be included in a line with a leading exclamation mark.

Hits, Rank, and HitWords are special system attributes. To place one such attribute in the results, that attribute name is included in the Return Attribute list. The Hits attribute is a "hit mask" comprising a string of bits indicating how may of the individual queries had hits. It is available for each Entity in the merged result set. Hit masks are described in more detail subsequently. Every character in the string corresponds to one Individual Query that has been executed. The first character in the string corresponds to the first query, the second character in the string corresponds to the second query, and so on. If the Entity is present in the result set of a given query, that character in the attribute value string will be a one. If the Entity is not present in the result set, the character will be a zero. One, more, or all (but never none) of the characters in the string will be one.

The Rank attribute is a number and it is available for only part of the merged result set. Rank is a number between 1 and 100 given by Intelligent Miner for Text to represent the relevance ranking of each hit relative to all hits from one text search query. The attribute is available for each Entity hit from an Individual Query containing a Text Search Criteria Term.

The HitWords attribute is available only for part of the merged result set. More specifically, it is only available for an Entity hit of type SECTION. When included as part of the Return Attribute list, up to two system-generated attributes, section_sectiontitle and section_idx, may be included in the results. The section_sectiontitle attribute keeps a list of word hits in a section title, with a comma as the word separator. The section_idx attribute keeps a list of word hits in the index terms or key terms for a section, with comma as the word separator. The existence of these attributes is for applications to determine which words to highlight when the hit document is displayed. To implement these, user inputs for querying section title or index terms are parsed AS IS into individual words and stored in the attributes.

Below is an example of a merged results file returned as the output parameter from EQuery for the preceding queries:

```
SECTION:013011037X.10.03.00
!Hits:010
!Title:Social Engineering
!search-sectiontitle:engineering,study,skills
CHAPTER.C:0130131490.02.00.00
!Hits:100
!Title:An Introduction to Engineering Problem Solving
!search-chaptertitle:engineering
SECTION:0130131490.02.04.00
!Hits:010
!Title:An Engineering Problem-Solving Methodology
!search-sectiontitle:engineering,study,skills
CHAPTER.C:0130808598.02.00.00
!Hits:100
!Title:Studying Engineering: The Keys to Success
!search-chaptertitle:engineering
SECTION:0130808598.02.02.00
!Hits:001
!Title:Commitment
!Rank:24
!search-idx:study,skills
SECTION:0130808598.02.03.00
!Hits:001
!Title:Application
!Rank:24
!search-idx:study,skills
SECTION:0130808598.02.04.00
!Hits:001
!Title:Strategy
!Rank:24
```

```
!search-idx:study,skills
SECTION:0130808598.02.05.00
!Hits:001
!Title:Perseverance
!Rank:24
!search-idx:study,skills
SECTION:0130808598.02.06.00
!Hits:001
!Title:Associations
!Rank:24
!search-idx:study,skills
CHAPTER.C:0130808598.03.00.00
!Hits:100
!Title:Introduction to Engineering and Engineering Study
!search-chaptertitle:engineering
SECTION:0130808598.03.02.00
!Hits:011
!Title:What Is Engineering?
!search-sectiontitle:engineering,study,skills
!Rank:24
!search-idx:study,skills
SECTION:0130808598.03.03.00
!Hits:001
!Title:What Do Engineers Do?
!Rank:22
!search-idx:study,skills
SECTION:0130808598.03.04.00
!Hits:011
!Title:Why Choose to Study Engineering?
!search-sectiontitle:engineering,study,skills
!Rank:31
!search-idx:study,skills
SECTION:0130808598.03.05.00
!Hits:011
!Title:Equipping Yourself for Engineering Study
!search-sectiontitle:engineering,study,skills
!Rank:64
!search-idx:study,skills
SECTION:0130808598.03.06.00
!Hits:001
!Title:Cooperative Education Programs (Co-ops) and Internships
!Rank:24
!search-idx:study,skills
SECTION:0130808598.04.03.00
!Hits:010
!Title:Making Effective Use of the Engineering -
Professor
!search-sectiontitle:engineering,study,skills
SECTION:0130808598.05.04.00
!Hits:011
!Title:Group Study
!search-sectiontitle:engineering,study,skills
!Rank:24
!search-idx:study,skills
SECTION:0130808598.05.06.00
!Hits:010
!Title:Engineering Ethics and Code of Student Behavior
!search-sectiontitle:engineering,study,skills
CHAPTER.C:0130808598.06.00.00
!Hits:100
!Title:Key Strategies for Maximizing Performance in Engineering Courses
!search-chaptertitle:engineering
SECTION:0130808598.06.02.00
!Hits:001
!Title:Time Management Strategies
!Rank:24
!search-idx:study,skills
SECTION:0130808598.06.03.00
!Hits:010
!Title:Preparing for an Engineering Course: Making Sure Your
Prerequisite Works
!search-sectiontitle:engineering,study,skills
SECTION:0130808598.06.08.00
!Hits:011
!Title:Using Tutors and Study Guides
!search-sectiontitle:engineering,study,skills
!Rank:31
!search-idx:study,skills
SECTION:0130808598.07.03.00
```

```
!Hits:001
!Title:Preparing for Examinations: Getting Organized
!Rank:24
!search-idx:study,skills
CHAPTER.C:0130808598.10.00.00
!Hits:100
!Title:Developing Engineering Skills
!search-chaptertitle:engineering
SECTION:0130808598.10.02.00
!Hits:011
!Title:Communication Skills
!search-sectiontitle:engineering,study,skills
!Rank:47
!search-idx:study,skills
SECTION:0130808598.10.03.00
!Hits:001
!Title:Developing Your Creativity
!Rank:33
!search-idx:study,skills
SECTION:0130808598.11.03.00
!Hits:001
!Title:Continuing Your Studies Towards a Graduate Degree
!Rank:24
!search-idx:study,skills
CHAPTER.C:013254749X.02.00.00
!Hits:100
!Title:Engineering and Electronic Worksheets
!search-chaptertitle:engineering
SECTION:013254749X.02.03.00
!Hits:010
!Title:The Engineering Method
!search-sectiontitle:engineering,study,skills
SECTION:013254749X.02.04.00
!Hits:010
!Title:Issues in Engineering and Data Analysis
!search-sectiontitle:engineering,study,skills
CHAPTER.C:013254749X.05.00.00
!Hits:100
!Title:Engineering Computation
!search-chaptertitle:engineering
SECTION:013254749X.10.02.00
!Hits:010
!Title:Engineering and the Internet
!search-sectiontitle:engineering,study,skills
```

Figure 21B:
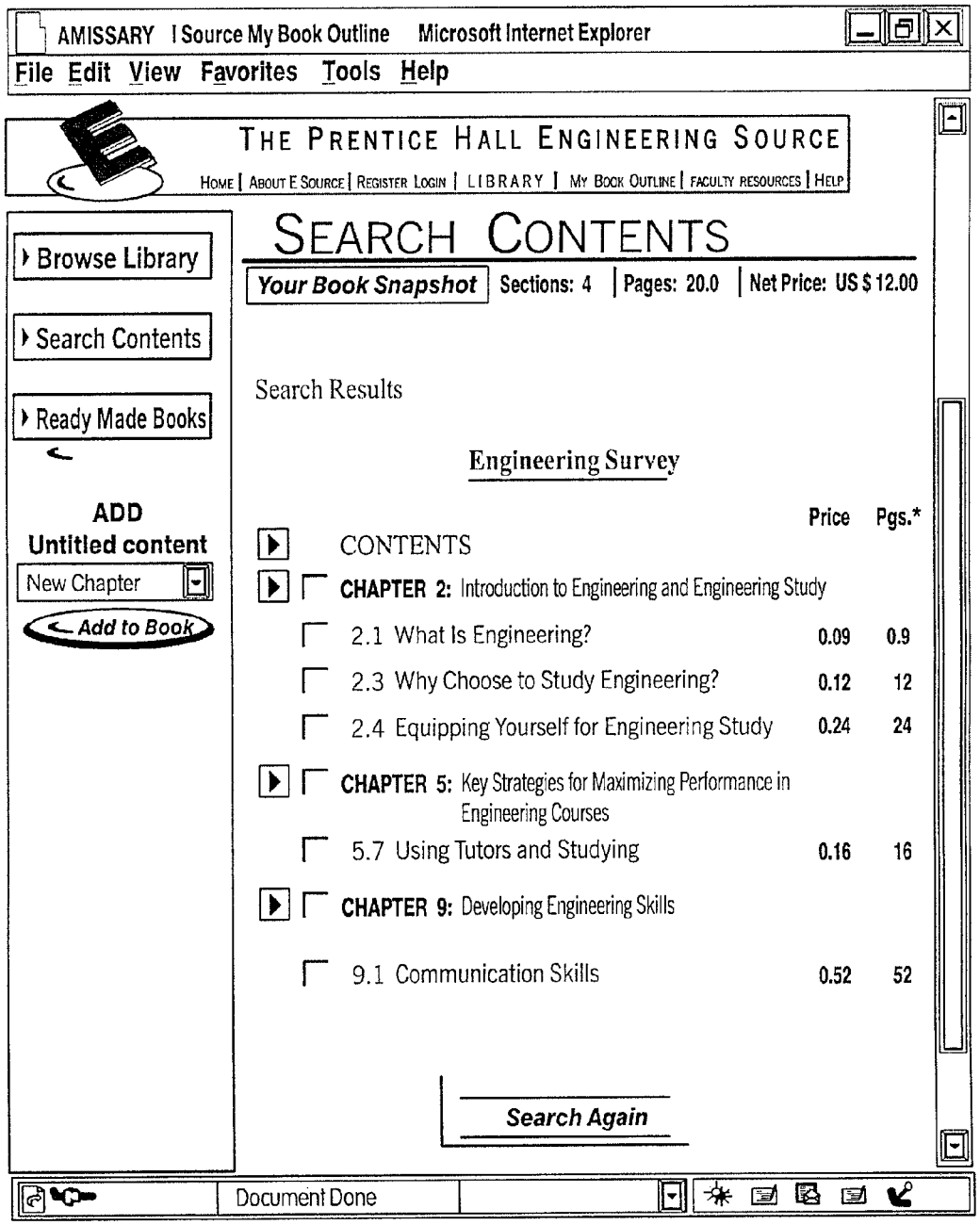

The results set can contain entities at different levels in the hierarchy. For example, the previous search contains entities at the chapter and section levels. The preceding results are received by the search procedure in application layer 28, where they may be filtered (e.g., to remove any sections that do not belong to chapters that are hits), parsed, and displayed. An example of a results screen is shown in FIG. 21B.

9. Using Hit masks to Search Hierarchical Data

As noted in the previous section, the hierarchical data model presents an interesting challenge—how to perform a search across entities at different hierarchical levels. The challenge arises because the hierarchical entities can be stored without inherited properties. An entity's inherited property is one that is defined on one of the entity's parents. For example, a chapter entity has a property, name. Each section within the chapter inherits the name property. The name property is stored only on the chapter entity. Due to storage space, query performance and load performance considerations, inherited properties are not stored on an entity.

Suppose a user wishes to perform the following query.

Find all the books written by Dr. Seuss containing a chapter title with the word "Cat"

In this query the property, author, defined on the entity, book, is searched for an author, Dr. Seuss and a chapter entity's property, title, is searched for the word, Cat. At first glance, this query appears to be a normal parametric query with two Boolean conditions. However, after closer inspection this is not a normal parametric query because it involves attributes of entities of different hierarchical levels: Book and Chapter. For this reason, this query is broken into two parametric queries:
1. Find those entities of type=book and author=Dr. Seuss.
2. Find those entities of type=chapter and title containing the word "Cat"

The two sets of results never intersect because they are for different entities. The first results consist of book entity matches, the second set of chapter entity matches. These entity matches for the query criteria are also called "hits".

Since inherited properties are not stored within the datastore, the book entity and chapter entity do not share common properties. Therefore, if an intersection is performed on these two sets of hits, the resultant set is empty. However, the goal of the search was to find all the book entities satisfying both criteria.

One of the keys to defining meaningful results for the two parametric queries described above is to define the entity expected in the results. For example, in the above query the book entity is returned. However, it may be desired to return the chapter entity to the user. Therefore, any proposed query interface must provide the application developer freedom to decide which entity is to be returned.

Examples of entities defined in the results include:
  Only the section hits that belong to chapter hits which in turn belong to book hits;
  The appropriate book hits, chapter hits and section hits, where all the section hits belong to one chapter hit which in turn belongs to one book hit;
  A section hit that does not belong to any chapter hit;
  A chapter hit that does not belong to any book hit; or
  A book hit that does not contain any chapter hit or section hit.

This is really a question about how to perform logical AND/OR Boolean operators on the result sets across different entity levels. The answer varies depending on the needs of a particular application as well as the expectation from its target users. In order to accommodate different application needs and user expectations, the individual results are combined via a set union, and for each entity a bit stream known as a hit mask is included to indicate which query a specific entity satisfied. The application's query code does not need to know the specifics regarding the current hierarchical data model. The digital library API 16 provides the application's program with enough information so the application program can perform filtering on the hits and decide the entity to be returned to the user.

Referring to FIG. 6, the webserver 26 makes calls to an application program interface layer, which here comprises both application layer 28 and API layer 30. The application program, in turn, makes calls to the digital library API 16. The digital library API 16 makes the program calls to the datastore to assemble the results into hit mask, unique identifier tuples. This hitmask-unique identifier tuple is described later. At present it is important to understand the breakdown of the logic with respect to program interfaces.

As illustrated above, when there is a complex query against multiple entity types, it is necessary to break the query down into multiple queries, each against a specific entity type. Two queries can be performed on the same entity type, but the same query is never performed on multiple entity types.

In the present embodiment, the queries are executed as parametric and free text queries, yielding multiple sets of results. The multiple sets are combined via a union into one single set. During the process of union, a hit mask is built for each entity processed to indicate which one or more individual queries returned the entity. The total number of individual queries determines the total length of the hit mask, and each bit has an initial value of zero.

If a hit is merged in from the results for individual query 1, the first bit is set to 1. If a hit is merged in from the results for individual query 2, the second bit is set to 1, and so on. If an entity is a hit in both results set, both bits will be set to 1. For any particular entity type in the combined set, its corresponding hit mask will contain one or more 1's.

A hit mask is a bit string, a string of 0's and 1's. Each bit corresponds to one parametric/free text query against a specific entity. A bit with a value 1 indicates the entity is a hit for the corresponding query; a bit with a value 0 indicates the entity is not a hit for the query. In the previous example, the query was broken into two parametric queries: one query on the book entity and one on the chapter entity. The example below shows the queries being performed against the contents of a typical datastore with the resultant hit masks.

Queries
1. Find those entities of type=book and author=Dr. Seuss.
2. Find those entities of type=chapter and title containing the word "Cat"

| Datastore Contents | Hit mask* | Unique Identifier |
|---|---|---|
| Book - Cat In The Hat by Dr. Seuss 0123456789.00.00 | 10 | |
| Chapter - Tee Totaler 0123456789.01.00 | 00 | |
| Chapter - The Fat Cat 0123456789.02.00 | 01 | |
| Book - Horton The Elephant by Dr. Seuss 0291123421.00.00 | 10 | |
| Chapter - I Meant What I Said 0291123421.01.00 | 00 | |
| Book - Cannery Row by John Steinbeck 0412856798.00.00 | | 00 |

*The left bit corresponds to query one and the right bit corresponds to query two The above hit masks represent the hits for the queries. For example, The Cat In The Hat book with author Dr. Seuss matches the first query, but not the second one. Therefore, the hit mask is 10. Likewise, the chapter, The Fat Cat, is a hit for the second query so its hit mask is 01.

Each query result is returned with its unique sequence identifier, previously described. Recall that the sequence identifier is in the form: XXXXXXXXXX.CC.SS., where the 10 X's are the ISBN number, CC is the chapter number and SS is the section number. Once the hit masks and unique identifiers have been returned to the application program from the API layer 30, the application program can perform a logical AND/OR upon them. The application program provides the freedom to choose how unions and intersections are performed on the hits.

The manner in which the application program of the present embodiment uses the hit masks and unique identifiers to filter the combined set of results will now be described. In the example above involving The Fat Cat, a problem exists in performing a union or intersection on The Fat Cat chapter entity hit mask, 01 with the Cat In The Hat book entity hit mask 10. Since The Fat Cat is contained within the Cat In The Hat, it satisfies both queries. Its hit mask needs to inherit the properties of the hit mask of the parent book to have a value of 11, indicating that it satisfies both queries. The Cat In The Hat contains a 1 for the first query is a book container entity. Thus bit representing query one in the hit masks of all entities that the book contains (i.e. children, grand children, etc.) should be set to "1". Recall, however, that inherited properties such as parenthood are not retained with the datastore.

The solution to this dilemma lies in the unique identifier's format, which contains information about the hierarchical relationship of these entities. The Cat In The Hat's unique identifier is 0123456789.00.00 and the unique identifier of The Fat Cat is 0123456789.02.00. By matching all unique identifiers with the same XXXXXXXXXX values, these identifiers allow us to determine that The Fat Cat is contained by The Cat In The Hat. Since The Cat In The Hat contained a 1 for the first query, The Fat Cat's and Tee Totaler hit mask are changed to values of 11 and 10, respectively. The following two phase process can be employed to obtain this result.

Phase One—Hashtable Creation. The first step is to build a nested hash table that reflects the relationships of the entity hits in terms of the hierarchical data model. This can be done based on the unique identifiers. For each entity in the results, place the hit mask in a nested hash table at the appropriate entity. The keys of the hashtable are unique identifiers and the values are the hit masks bit streams. The diagram below shows the hashtables for the previous example. Once all the entities are processed, a nested hashtable exists reflecting the containment relationships.

```
<Book Hashtable>
Key 1: 10 Value: <Chapter Hashtable>
                Key 1: 00 Value: <Section Hashtable>...
                Key 2: 01 Value: <Section Hashtable>...
<Book Hashtable>
Key 1: 10 Value: <Chapter Hashtable>
                Key 1: 00 Value: <Section Hashtable>...
<Book Hashtable>
Key 1: 00 Value: <Chapter Hashtable>...
```

Phase Two—Filtering. Once the hashtable is constructed, application program uses simple Boolean logic to obtain the hits. In the example, the desired results are all books by Dr. Seuss containing a chapter with the word Cat in the title. The filtering process starts on the book hashtable keys looking for a hit mask of 10. There are two books:. The Cat In the Hat, Horton The Elephant) satisfying this criteria. The filtering process continues on the chapter hashtables within these two books looking for hit masks of 01. The chapter, The Fat Cat, is located and therefore is a hit for the complex query. Thus the containing book's, The Cat In The Hat, unique identifier is returned.

One of the advantages of the above two phase process is the code reuse and flexibility of the returned entity. For example, the chapter, The Fat Cat, can be returned instead of the contained book without changing the phase one process. The only changes required are to alter the end processing on phase two. This is important since the returned entity varies from website to website.

Search and hit mask generation procedures may be performed by software and may be tangibly embodied in a program product such as a CD rom or floppy disk, or stored in a computer system's nonvolatile memory. The use of hit masks for hierarchical document models provides many benefits. It is an efficient solution from a performance perspective because a minimum amount of information is transmitted back to the Web application. In addition, the solution is configurable in that it permits decision making of OR, AND and returned entities at the application layer 28. The query code is generic and flexible enough for multiple hierarchical data models. Performance is improved due to the easy Boolean logic performed on hit masks to find results. And finally, this approach minimizes space requirements for storing the hierarchical data model by avoiding storage of inherited properties 10. System Administrator Interface and Functions A system administrator can perform a number of functions through interface 24. An interface application first displays a main menu of options. In the present embodiment, three options 251, 252, 253 are available to the user as hypertext links, as shown in FIG. 22A. Two of these pertain to the content selection path of FIG. 6: "Approve User" 251 and "Make Products Available" 252.

The "Approve User" option 251 is used to promote new users from a "guest" status to an "approved user" status. When a user registers with the compilation system for the first time, he is assigned a guest status that authorizes him to create and submit CBO's. However, a compilation will not be approved for publishing unless the user has been approved. The system administrator basis his approval decision on a verification of the user as a valid user (e.g., as a bona fide university professor).

The approval function is invoked by clicking on link 251. This action invokes an approval function in application layer 28 which issues a query to the User Table for all users whose "security" attribute is equal to "G"? The results are returned to the approval function, parsed, and displayed as a list of users and corresponding user information. An example of an approval list is shown in FIG. 22B. Attributes displayed include the user name 256, university 257, department 258 and registration date 259. Beside each username is a select box. By checking desired ones of the select boxes and clicking on the "Commit" button 255, the system administrator causes the "security" attribute value in the User Table to be changed to "F" (full access authority). The user is then returned to the main menu of FIG. 22A.

The "Make Products Available" option 252 is used to designate prepublished content products available for use in compilations of content. When prepublished content is first loaded into digital library 20, it is assigned a default status of "unavailable". This status is indicated by a "U" value in the "Status" column defined by the Products Index Class. Unavailable products may not be included in a bookshelf, and may not be returned from a search content request. A prepublished product does not become accessible until this attribute value is changed to "A", indicating that the product is now available for use.

The system administrator initiates the "Make Products Available" function by clicking on link 251. This action causes a corresponding function in application layer 28 to display a list of products. In the present embodiment, this list appears as shown in FIG. 22C. It includes the book titles 260, and a corresponding select box 261 beside each title. By checking desired products for promotion and clicking on "Commit" button 262, the user invokes the EProductSetState function and causes the product state to change from "U" to "A". The EProductSetState function is described below.

EProductSetState

Description

When a prepublished content product is first loaded into the system, the status is Unavailable for each entity in the product. The web site's administrator then sets the status to Available when he feels confident that all the pieces of the product have been loaded completely and correctly. The administrative application uses this routine to set the product status to available.

Functional Processing

I. Locate the existing copyright product entity that matches the sequence id parameter.

II. Locate the entities within that product entity by finding entities that are prefixed by the same sequence id.
III. For each entity found, set its status to the product status passed ("0"=Unpublished, "1"=Published).

Parameter List

| | |
|---|---|
| Inputs | DSUsername |
| | DSPassword |
| | DSHostname |
| | Sequence id |
| | Product state |
| Outputs | |
| Errors | RC_NOT_FOUND |
| | RC_SYSTEM_ERROR |

Index Classes
  Product

11. Submitting a CBO

When the user has completed creating his custom book outline, he may submit it to the approval process by clicking on "Submit Request" button 180. This action invokes the ECBOSubmit and ERequestStatus procedures described below.

ECBOSubmit
Description
  This routine submits the CBO when the user has completed creating his book and is ready to submit the order. This function performs some policy checks against that CBO and then creates a Request in the Request entity. It then makes the CBO available to the System Administration application for approval. The Custom Publishing subsystem then retrieves the Request when it processes.
Functional Processing
  I. Verify that the CBO id passed is valid.
  II. Check the volume virtual page count limit in the CBO. If total virtual page count for each of the volumes go above or below the volume virtual page count limit, the volumes are reorganized.
  III. Check the CBO minimum virtual page count limit in the CBO. Verify that the total CBO virtual page count exceeds the CBO minimum virtual page count limit.
  IV. Verify that the CBO contains at least one section from one prepublished content product.
  V. Create a new order request for this CBO with all the information passed in.
  VI. Update the new Order Request with information for all the volumes in the CBO.
  VII. Mark the CBO status as Submitted ("2") with a call to ERequestStatus.

Parameter List

| | |
|---|---|
| Inputs | DSUsername |
| | DSPassword |
| | DSHostname |
| | Userid |
| | Author title |
| | Author first name |
| | Author last name |
| | University |
| | Department |
| | CBO id |
| | Course name |
| | Course number |
| | Course registration number |
| | Estimated enrollment |
| | Term |
| | Term start date |
| | Bookstore date |

-continued

| | |
|---|---|
| | Desk copy count |
| | Supplement count |
| | Alternate address 1 |
| | Alternate address 2 |
| | Alternate address 3 |
| | Alternate city |
| | Alternate state/province |
| | Alternate zip code/postal |
| | Alternate country |
| Outputs | New request order number |
| Errors | RC_NOT_FOUND |
| | RC_INVALID_CBO |
| | RC_UNDER_MINIMUM |
| | RC_NO_PRE_PUB_SECTION |
| | RC_SYSTEM_ERROR |

Index Classes
  CustomBookOutline
  Request
  RequestAux
ERequestUpdateStatus
Description
  When a user's Order Request moves through the workflow from creation to approval/return/rejection to completion, the approval status of the Order Request is changed in the digital library Request Index class to reflect its progress.
Functional Processing
  I. Search for one Order Request with the Request id passed.
  II. Verify that there is exactly one match for the Request id.
  III. Update the status of the Order Request found.

Parameter List

| | |
|---|---|
| Inputs | DSUsername |
| | DSPassword |
| | DSHostname |
| | Request id |
| | Request status |
| Outputs | |
| Errors | RC_SYSTEM_ERROR |

Index Classes
  E_Request

The following support function is also provided in application layer 28 and pertains to the creation of a CBO.

EGetProgramAttributes
Description
  This retrieves attributes for a particular program from the Program entity.
Functional Processing
  I. Search for any program record with the program id passed.
  II. Verify that there is exactly one match for the program id.
  III. Retrieve all the attributes from the program record.
  IV. Export all the attributes as one big string into the results buffer.

Parameter List

| | |
|---|---|
| Inputs | DSUsername |
| | DSPassword |
| | DSHostname |
| | Program id |
| Outputs | Results buffer |
| Errors | RC_SYSTEM_ERROR |

Index Classes
  Program
  ProgramAux
C. Request Processing Path

Figure 23:
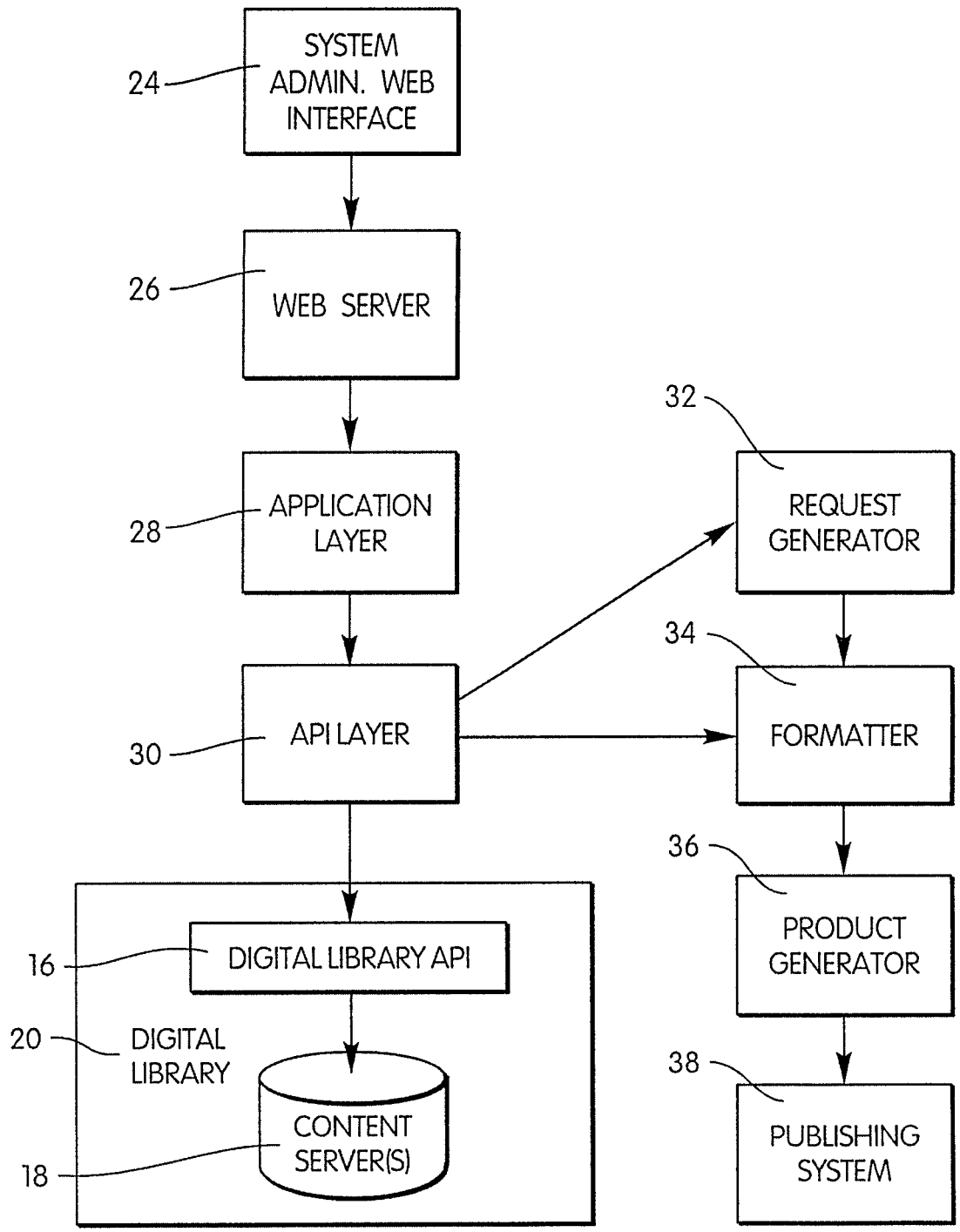
FIG. 23 is a block diagram representing the path for approving and publishing compilations of content.

The content management system of the present invention includes a backend path for submitting a compilation for approval and publication, as shown in FIG. 23. This path begins with a user's submission of a CBO for approval previously described.

As shown in FIG. 23, the request processing path includes a system administration facility for retrieving submitted CBO from the digital library content server(s) 18 through API layer 30, and placing the pending CBO content into an unformatted Product Structure File. The system administration facility 24 presents the PSF into a format easily viewed by the editor. If the editor approves the CBO, the state of the CBO is updated to approved.

A background application is run periodically to process all approved CBO's which have not been published. This background application, request generator 32, retrieves a list of all approved CBO's awaiting publishing. If the CBO is approved and the submitter (author) has been approved (a.k.a. granted full access) then the CBO is extracted from the data store 20 via the API layer 30 in the PSF format. An ISBN number is assigned to the CBO and all related volumes. This ISBN number is stored within the datastore in the Request (i.e. CBOISBN) and RequestAux (i.e. VolumeISBN) entity. This PSF format is stored into one or more files on the local file system and the CBO status is updated to published. Due to the newly assigned ISBN values the resultant PSF sequence ids (XXXXXXXXX.CC.SS) within the PSF are not correct. These files still retain the original pre-pub book ISBN values. The formatter is responsible for updating these sequence ids in the following step. Another background application, formatter 34, is run periodically to process the PSF files residing on the request generator's 32 file system. Therefore, this application must have access to 32's file system. This can be achieved via NFS clients or the like. The formatter scans the files within the request generator file system. Upon locating a PSF file, it is parsed and the sequence ids are retained. The formatter then queries the data store 20 via the API layer 30 to extract the real content for this sequence id (a pre-published book or UPM). Upon retrieving the real content, the sequence id is altered to reflect the CBO's ISBN number, chapter and section numbers. The new sequence id is stored in the PSF file and the content is stored into files residing in the same directory.

Product Generator 36 receives the input CBO files and reformats them into a desired publishing format. In the present example, the desired publishing format is a Framemaker format, although conversion to other formats may be supported in addition to or in lieu of Framemaker format conversion. The product generator of the present embodiment is a 4GL application.

The resultant CBO Framemaker files are now forwarded to publishing system 38, a printing and distribution system that uses a Framemaker file set in printing and distributing text books.

CBO Workflow

Status Values. The following table lists the acceptable CBO Status and the Request Status values that are assigned to the "ApprovalStatus" columns in the CBO and Request index classes of digital library 20.

| 0 | Active | Available to the instructor to revise |
| 1 | Submitted | Submitted by the instructor |
| 2 | Approved | Approved by editorial and ready for publishing |
| 3 | Rejected | Rejected by editorial and no longer able to be revised |
| 4 | Completed | Completed custom publishing |

Figure 24:
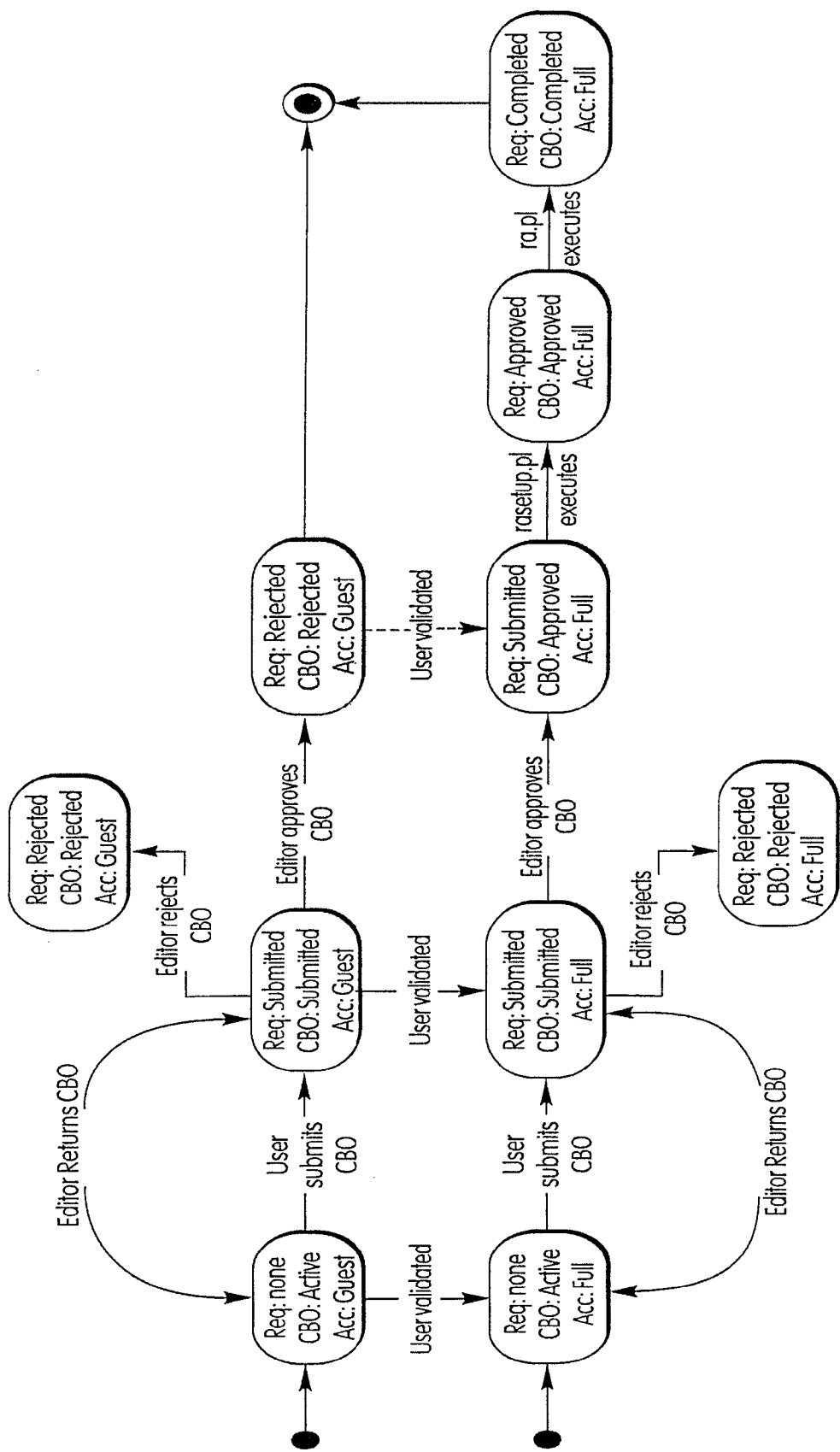
FIG. 24 is a state diagram representing the states of a user, request and CBO at various stages of the process for creating compilations of content.

CBO Workflow States. FIG. 24 is a CBO status workflow state diagram illustrating the various states of the Request approval status, CBO approval status, and user access level (the value stored in the "Security" column of the User Table) that affect the workflow of a CBO through the described process. It shows the values of each variable at different states and the action that changes the state.

1. System Administrator Approval Process

As previously discussed, Custom Book Outlines are created through the web user interface 22 from pre-published content and user-provided material, then submitted for approval. During the submit process, the user enters additional information or override information through the web pages. When he has entered all the required information, the request is stored in digital library 20 as a Request entity, and the CBO status is changed from "1" (Working or Active state) to "2" (Submitted state) in the CBO Index class (Approval Status attribute).

An editor reviews pending requests through the system administrator web interface 24 by selecting the "Edit/Review/Approve CBO's" option 253 of FIG. 22A. This action invokes an approval process that issues a call to the ECBOList function. The ECBO List function, described below, issues a query to digital library 20 for all CBO's with a status equal to "2".

ECBOList
Description
  This function returns a list of all CBO's that are stored in
    the digital library for a specified Program that are in a
    specified status in the CBO workflow (e.g., all "Active"
    CBO's in the Freshman Engineering program). The status and program are passed as parameters. This function
    is used by the system administration facility to obtain all
    CBO's in a submitted state. It is also used by the request
    generator 32 to obtain all CBO's in an approved state.
  1. Verify that program id passed is valid.
  2. Search for CBO's with the program id and the CBO
    status specified.
  3. For each CBO found, send back the CBO id, the Type,
    Title, and Creator ID.
Parameter List

| Inputs | DSUsername |
| | DSPassword |
| | DSHostname |
| | Program id |
| | CBO state |
| Outputs | CBO id list |
| Errors | RC_INVALID_OR_MISSING_INPUT |
| | RC_SYSTEM_ERROR |

Index Classes
  CustomBookOutline
  Program

The CBO's returned by the ECBOList function are parsed by the approval process and displayed on a Submitted Custom Books screen. An example of an approval screen is shown in FIG. 22D. It includes a list of CBO titles 271 and owners 272, where the titles provide hypertext links to the CBO's themselves. Clicking on a CBO title invokes an approval process that calls the ECBOGet and ECBOGetUPM functions. The returned CBO and user content are parsed and displayed to the editor on an approval screen.

Figure 22E:
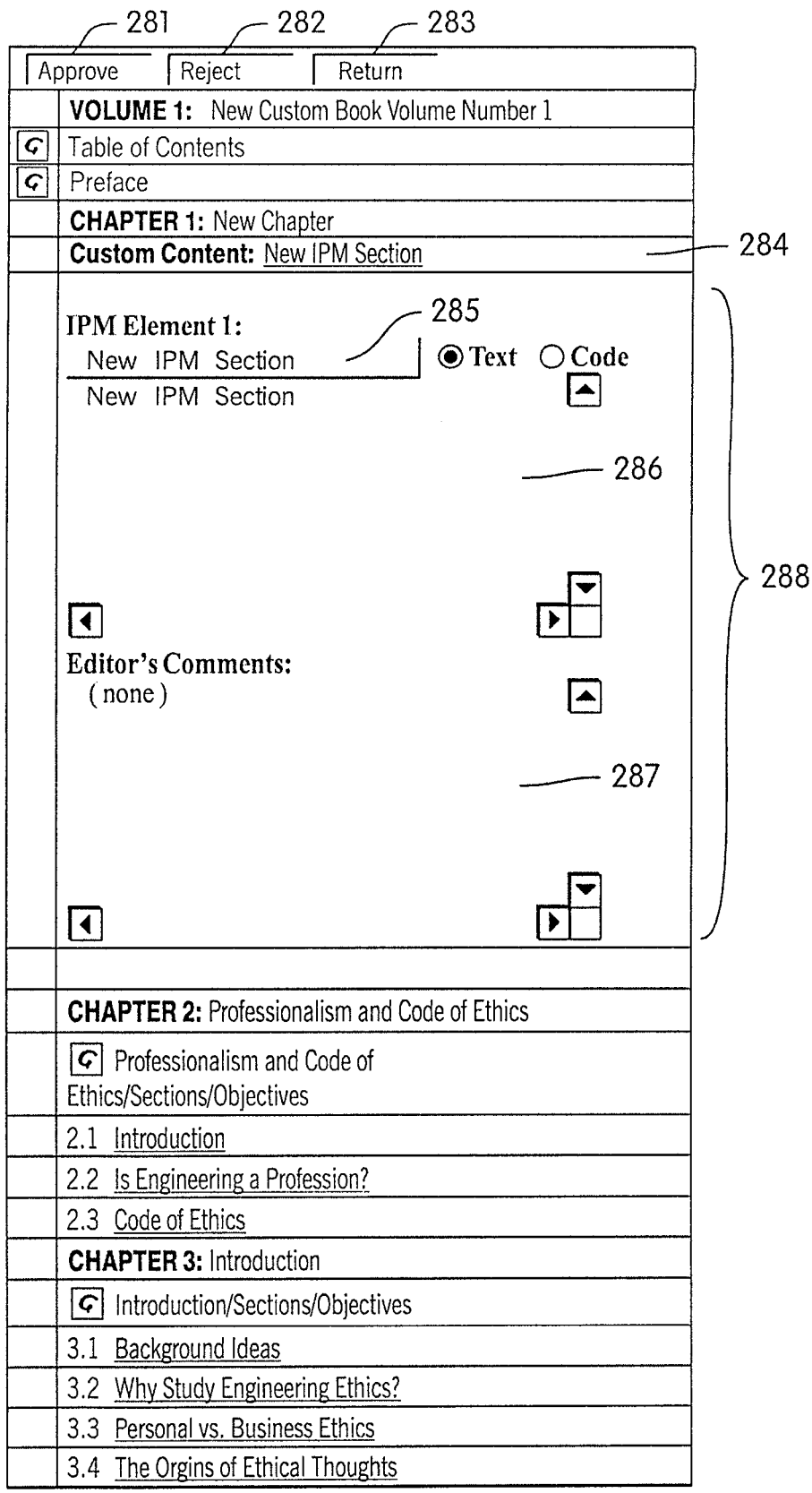

A portion of the approval screen of the present embodiment is shown in FIG. 22E. It presents the editor with the custom book outline that includes the content associated with each UPM element. For example, in the CBO shown Chapter 1 contains a first UPM element 288 (UPM refers specifically to "Instructor Provided Text"). The UPM title ("New UPM Section") is displayed at 284 as a hypertext link. It is also provided in an editable title field 287, and the UPM's corresponding content ("UPM Content") is contained in an editable field 285. Thus the editor is able to review and edit the content for correctness and appropriateness. He may also insert editorial suggestions and comments pertaining to this UPM into field 286. In addition, prepublished section titles are provided as hypertext link to their corresponding content. If desired, the editor may view the content of any section by clicking on its link When the editor has completed his review, he may approve, reject, or return the CBO with editorial comments by clicking on one of the buttons 281, 282, 283 at the top of the screen. In the event of rejection, the CBO approval status stored in the digital library CBO Index class is changed to "3" by the ECBOSetState function. The CBO will now be displayed on the user's Welcome screen with a "Reject" status, and the owner will net be permitted to manipulate the book any further. A CBO return causes ECBOSetState to set the CBO approval status value back to "1", and the editorial comments to be sent to the owner via e-mail. In this case the owner is allowed to alter the book in an attempt to correct situations identified by the editor. Lastly, CBO approval status to "2". All CBO's with an approved status will be retrieved by the Request Generator 32.

2. Request Generator

Description. The Request Generator 32 application polls digital library 20 to determine which submitted requests are in an approved state but still are not extracted. It will only publish those CBO's having an approval status of "2" and an owner status of "F" (i.e. Full Access). An administrator invokes the request generator 32 on the command line using the ra.pl executable. The ra.pl executable calls the rasetup.pl script which queries the digital library 20 for CBO's having a CBO Status equal to "2" and an owner's Access Level equal to "F". For these CBO's, it sets the Request approval status to "2" in the Request Index class Upon completion of rasetup.pl, the ra.pl procedure is invoked and places all CBO's having a Request Status equal to "2" into the /request/esource/order directory via the ERequestList function described below. This directory is later accessed by an EPGSetup NT program invoked by formatter 34.

The Request Generator 32 creates an Intermediate Product Specification File (INT), a Cover Page Customization file (CPC), and a Title Page Customization file (TPC). Request Generator 32 also invokes a procedure called rgisbn to generate an ISBN for each custom volume within a custom book, and one for the CBO itself. For example, a custom publication with two volumes will generate three total ISBNs. The new ISBN(s) are stored in digital library 20 by the ERequestISBN procedure, described below.

Inputs
   Digital Library Requests
   Digital Library attribute data (Program, Product)
Outputs
   Intermediate Product Specification File: /request/esource/order/<short-isbn>/<short-isbn>.INT
   Cover Page Customization file: /request/esource/order/<short-isbn>/<short-isbn>.CPC
   Title Page Customization file: /request/esource/order/<short-isbn>/<short-isbn>.TPC
   Request Notification message
   New Title Setup message
   Request Order message
   Desk Copy Order message
   Desk Copy Approval message Functional Processing
   ra.pl
     1. Invoke rasetup.pl
       a) Determine which Requests have been submitted and approved via ERequestList, then retrieve the CBO definition for each of these Requests.
       b) Find Requests with a CBO Status equal to "2" for users with Access Level equal to "F"
       c) Change the Request Status to "2" for those found
     2. Invoke rgPR.pl
       a) Use a subset of the CBO attributes to build the INT file
       b) Use data in the CBO to build the CPC file
       c) Use data in the CBO to build the TPC file
     3. Assign an ISBN to the custom publication and store it into digital library index classes via a call to ERequestISBN
       a) Read next ISBN number from the ISBN file
       b) Remove ISBN number from the ISBN file
       c) Assign an ISBN to each volume in the CBO
       d) For multi-volume CBO's, assign an ISBN to the Value Pack containing all volumes
     4. Extract UPM from Digital Library
       a) Retrieve UPM
       b) Modify UPM to treat the owner name as an author attribute on the <UPM> markup tag.
     5. Perform royalty calculations
       a) Sum the page counts for each pre-published ISBN included in the CBO to get a Total ISBN Page Count
       b) Sum the page counts for UPM, Preface, TOC, and Index to get the Total ISBN Page Count for the generated ISBN
       c) Calculate a percentage for each ISBN, both pre-published and custom, by dividing the Total ISBN Page Count by the CBO Page Count
     6. Invoke rggen.pl
       a) Format and send the Request Notification message
       b) Format and send the New Title Setup message
       c) Format and send the Request Order Info message
       d) Format and send the Desk Copy Order message
       e) Format and send the Desk Copy Approval message
     7. Change the Request Status and the CBO Status to "4" (completed)

ERequestList
Description
   This routine returns a list of the Order Requests with a particular Request Status. In most cases, this will be looking for a Request Status of "2", which is approved.
Functional Processing
   I. Search for Order Requests with the Request status passed.
   II. For each Order Request found, return the Request id, User id, CBO id, Book store date, and estimated enrollment.
Parameter List

| Inputs | DSUsername |
| --- | --- |
| | DSPassword |
| | DSHostname |
| | Request status |

Index Classes
Request

ERequestAssignISBN

Description
When an Order Request is processed by the Request Generator, a new ISBN is generated and assigned to the Order Request. This routine stores the ISBNs into the Request and RequestAux Index Classes.

Functional Processing
I. Search for one Order Request with the Request id passed.
II. Verify that there is exactly one match for the Request id.
III. If the volume id passed is null, there is only one volume involved. Update the package ISBN with the newly assigned ISBN value.
IV. If the volume id passed is not null, locate the volume specified and update its ISBN with the newly assigned ISBN value.

Parameter List

| | |
|---|---|
| Inputs | DSUsername |
| | DSPassword |
| | DSHostname |
| | Request id |
| | Volume id |
| | Assigned ISBN |
| Outputs | |
| Errors | RC_SYSTEM_ERROR |

Index Classes
Request
RequestAux

Other Back-End Support Functions
Other API layer 30 functions invoked by the Request Generator 32 are described below.

ERequestGet

Description
This returns the attributes for a specific Order Request from the Request entity.

Functional Processing
I. Search for one Order Request with the Request id passed.
II. Verify that there is exactly one match for the Request id.
III. Retrieve all the attributes for the Order Request. See Attribute Format below for more details.

Parameter List

| | |
|---|---|
| Inputs | DSUsername |
| | DSPassword |
| | DSHostname |
| | Request id |
| Outputs | Order Request description |
| Errors | RC_SYSTEM_ERROR |

Index Classes
Request
RequestAux

Attribute Format

| |
|---|
| !<attrname>:<value><carriage return> |
| Example: |
| !ApprovalStatus:1 |

```
!UserID:testprof
!CBOID:XT3QH7YOI$HFBS16
!AuthorTitle:ms
!AuthorFirstName:jan
!AuthorLastName:murray
!University:purdue
!Department:cs
!CourseName:intro
!CourseNumber:101
!CourseRegNumber:cs101
!Term:Fall 1999
!TermStartDate:19990912
!BookStoreDate:19990815
!AltAddress1:41 Waldron
!AltAddress2:MS717A
!AltAddress3:-alt-3-
!AltCity:W. Lafayette
!AltState:IN
!AltZip:47610-5555
!AltCountry:537020568
!EstEnrollment:175
!DeskCopyCount:4
!SuppCount:4
!ReceiptDate:19990327140527
!TotalPrice:
!CPDPrice:
!ValuePackPrice:
!CPDISBN:
!PackageISBN: 0130296686
!Volume
       !VolumeISBN:013029666X
       !VolumeID:V1
   !Volume
       !VolumeISBN:0130296678
       !VolumeID:V2
```

Note:
This CBO is a Multi-Volume CBO containing 2 volumes. Each volume has an ISBN (i.e. VolumeISBN) and the entire CBO has an ISBN (i.e. PackageISBN)

ERequestExistsForCBO

Description
Check to see whether there is any Request Order corresponding to the CBO id of interest.

Functional Processing
I. Search for any Order Request with the CBO id passed.
II. Return 1 if there is at least one match. Return 0 if there is no match.

Parameter List

| | |
|---|---|
| Inputs | DSUsername |
| | DSPassword |
| | DSHostname |
| | CBO id |
| Outputs | Found? (0,1) |
| Errors | RC_SYSTEM_ERROR |

Index Classes
Request

ERequestGetForCBO

Description
Ids of all the Order Requests that correspond to the CBO id are returned in a list.

Functional Processing
I. Search for any Order Request with the CBO id passed.
II. For each Order Request found, save its Request id.

Parameter List

| | |
|---|---|
| Inputs | DSUsername |
| | DSPassword |
| | DSHostname |
| | CBO id |

Index Classes

Request

Intermediate Product Specification File (INT). For each volume, an Intermediate Product Specification File (INT) is generated by Request Generator 32. The file is named <short-isbn>.INT and is written to an Order Directory in a subdirectory named <short-ISBN>. Request Generator creates this file by retrieving the Request and the CBO from digital library 20. A sample file format is shown below.

```
PRODUCT:<newisbn>.00.00.00
        FRONT_AND_BACK_ELEMENT:
        FRONT_AND_BACK_ELEMENT:
        CHAPTER.C:
                SECTION:<oldisbn>.nn.nn.nn
                UPM_SECTION:mm
                !UPM_SECTION_AUTHOR:Author Here
                SECTION:<oldisbn>.nn.nn.nn
        CHAPTER.C:
                FRONT_BACK_ELEMENT:<oldisbn>.nn.nn.nn
                SECTION:<oldisbn>.nn.nn.nn
                SECTION:<oldisbn>.nn.nn.nn
        FRONT_BACK_ELEMENT:<oldisbn>.nn.nn.nn
        CHAPTER.C:
                SECTION:<oldisbn>.nn.nn.nn
                SECTION:<oldisbn>.nn.nn.nn
                SECTION:<oldisbn>.nn.nn.nn
        FRONT_AND_BACK_ELEMENT:
```

In the INT file, <newisbn> is the ISBN for the volume, <oldisbn> is the ISBN of the book the section originally came from, nn.nn.nn is the chapter and section number of the section as it appeared in the original book, and mm is sequence id.

UPM Content (seqid). For each UPM content element, the formatter 34 PG Setup procedure calls ERetrieve to get the content and then writes a content file. This file is named <sequence id>.SGM is written to the PG Done Directory in a subdirectory named <short-ISBN>. The UPM is be modified to treat the owner name marked within the INT file as an author attribute on the UPM markup.

For example:

```
Original UPM
<UPM>
<TITLE>Digital Fundamentals</TITLE>
<text>Text UPM follows here</text></UPM>
<UPM>
<TITLE>Digital Fundamentals II</TITLE>
<code>
if a=b
then do this
else do that
</code>
</UPM>
Modified UPM
<UPM instructor="Joe Professor">
<TITLE>Digital Fundamentals</TITLE>
<text>Text UPM follows here</text></UPM>
<UPM instructor="Joe Professor">
<TITLE>Digital Fundamentals II</TITLE>
<code>if a=b
then do this
else do that
</code>
</UPM>
```

3. Formatter

Description. The Formatter 34 process is defined by the EPGsetup procedure. EPGsetup retrieves CBO content from digital library 20 and places it into a file system directory for use by the Product Generator 32. EPGsetup then reads the INT file created by Request Generator 32 in the previous step and calls ERetrieve to get the content elements from the digital library 20. The content, POF, CPC, and TPC files are placed in the PG directory, in a subdirectory named <short-isbn>, which is based on the ISBN of the custom publication.

Inputs
  Intermediate Product Specification File: e:\order\<short-isbn>\<short-isbn>.INT
  Cover Page Customization File: e:\order\<short-isbn>\<short-isbn>.CPC
  Title Page Customization File: e:\order\> <short-isbn>\<short-isbn>.TPC
  UPM Content: e:\order\<short-isbn>\<upm-id>.UPM Outputs
  Product Specification File: e:\pg\<short-isbn>\<short-isbn>. PSF
  Product Override File: e:\pg\<short-isbn>\<short-isbn>.POF
  Cover Page Customization File: e:\pg\<short-isbn>\<short-isbn>.CPC
  Title Page Customization File: e:\pg\<short-isbn>\<short-isbn>.TPC
  SGML Content Files: e:\pg\<short-isbn>\<sequence-id>.SGM
  SGML Attribute Files: e:\pg\<short-isbn>\<sequence-id>.ATR
  Associated Component Content Files: e:\pg\<short-isbn>\HiRes\<sequence-id>.<extension> (TIF or EPS)
  UPM Content: e:\pg\<short-isbn>\<sequence-id>.UPM Functional Processing EPGsetup 1. Poll the e:\order directory to find any <short-isbn> directories created
2. Process each INT file found in those <short-isbn> directories
3. Verify that each non-empty chapter begins with a FRONT_AND_BACK_ELEMENT. If it does not, then add one in place.
4. Convert the INT into a PSF file
5. Invoke ERetrieve to get the content, including SGML, ATR files, and Associated Components for each line item in the PSF
6. Make UPM located at the beginning of the book into its own chapter
7. Make UPM located at the end of the book into its own chapter
8. Make UPM located immediately before any chapter into its own chapter
9. Renumber the PSF file to be well-formed
   a) Uses the custom book ISBN number as the high-level digits
   b) Sequence the sequence ids into the standard hierarchical structure
   c) Rename the pre-published content file names to match the new sequence numbers
   d) Rename the UPM content file names to match the new sequence numbers
10. Move files into the e:\pg\<short-isbn> directory
11. Execute Product Generator Product Specification File (PSF). For each INT file, a Product Specification File (PSF) is generated by EPGsetup. This file is named <short-ISBN>.INT and written to the PG Directory in a subdirectory named short-ISBN>. The PSF is based upon the INT file from the Request Generator 32. The PSF has the following format:

```
PRODUCT:newisbn.00.00.00
        FRONT_BACK_ELEMENT:newisbn.cc.ss.00
        FRONT_BACK_ELEMENT:newisbn.cc.ss.00
        CHAPTER.C:newisbn.cc.00.00
                FRONT_BACK_ELEMENT:newisbn.cc.ss.00
                SECTION:newisbn.cc.ss.00
                UPM_SECTION:newisbn.cc.ss.00
                SECTION:newisbn.cc.ss.00
        CHAPTER.C:newisbn.cc.00.00
                FRONT_BACK_ELEMENT:newisbn.cc.ss.00
                SECTION:newisbn.cc.ss.00
                SECTION:newisbn.cc.ss.00
                FRONT_BACK_ELEMENT:newisbn.cc.ss.00
        CHAPTER.C:newisbn.cc.00.00
                FRONT_BACK_ELEMENT:newisbn.cc.ss.00
                SECTION:newisbn.cc.ss.00
        SECTION:newisbn.cc.ss.00
                SECTION:newisbn.cc.ss.00
                FRONT_BACK_ELEMENT:newisbn.cc.ss.00
``` where newisbn is the ISBN for the volume and cc is the chapter number, and ss is the section number. Chapter numbers should be sequential within a volume and should start with 1. Section numbers should be sequential within a chapter and should start with 1

Product Override File (POF). During creation of a custom book, a user may change the title of a pre-published chapter. If a volume contains such a change, PG Setup will generate a Product Override File (POF) for each volume to specify any overridden chapter titles. This file is named <short-ISBN>.POF and is written to the PG Directory in a subdirectory named <short-ISBN>. The POF references a line number of a chapter tag within the final PSF sent to Product Generator 36. The file has the following format:

```
N:TITLE:xxxxxxxxx
N:TITLE:xxxxxxxxx
``` where N is the line number of the final PSF that contains the chapter tag to override and xxxxxxxxx is the new title for that chapter. For example, suppose the owner of the PSF below has changed the title of Chapter 2 to "My Sample Chapter". The POF for achieving this result is shown below.

```
Product Specification File (PSF)
1    PRODUCT:0123456789.00.00.00
2        FRONT_BACK_ELEMENT: 0123456789.01.01.00
3        FRONT_BACK_ELEMENT: 0123456789.01.02.00
4        CHAPTER.C:0123456789.02.00.00
5            FRONT_BACK_ELEMENT: 0123456789.02.01.00
6            SECTION: 0123456789.02.02.00
7            UPM_SECTION: 0123456789.02.03.00
8            SECTION: 0123456789.02.04.00
9        CHAPTER.C:0123456789.03.00.00
10           FRONT_BACK_ELEMENT: 0123456789.03.01.00
11           SECTION: 0123456789.03.02.00
12           SECTION: 0123456789.03.03.00
13           FRONT_BACK_ELEMENT: 0123456789.03.04.00
14       CHAPTER.C:0123456789.04.00.00
15           FRONT_BACK_ELEMENT: 0123456789.04.01.00
16           SECTION: 0123456789.04.02.00
17           SECTION: 0123456789.04.03.00
18           SECTION: 0123456789.04.04.00
19           FRONT_BACK_ELEMENT: 0123456789.04.05.00
20       FRONT_BACK_ELEMENT: 0123456789.05.00.00
Product Override File (POF)
9:TITLE:My Sample Chapter
```

Pre-published Content. For each content element of type SECTION or FRONT_AND_BACK_ELEMENT, PG Setup calls eRetrieve to get the content and writes a content file. This file is named <sequence id>.SGM and written to the PG Directory in a subdirectory named <short-ISBN>. ERetrieve also gets associated components and places them in the PG Directory in a subdirectory named <short-ISBN>/HiRes.

The present invention has been described with reference to a particular embodiment in order to facilitate the reader's understanding of its broader applications. It shall therefore be understood that the scope of the invention is not limited by the above disclosure, but is entitled to the full breadth of the claims below. It shall also be appreciated that certain modifications to the methods and designs disclosed herein may occur to the skilled artisan without departing from the spirit and scope of the invention as claimed.

What is claimed is:

1. A computer-implemented method for managing containers within a compilation, comprising:
generating an outline of the compilation as a separate data object in a data repository, wherein the outline includes a hierarchical arrangement of identifiers of selected content entities providing content and the hierarchical arrangement indicates locations of the selected content entities within containers of the compilation;
in response to an alteration of the content within the compilation, reorganizing at least one content entity among a current container and at least one other container so that an amount of content of content entities remaining in the current container complies with a predetermined container size;
updating the hierarchical arrangement of identifiers of the outline, of the compilation based on the reorganizing of the at least one content entity; and
deleting the current container in response to the current container becoming empty after the reorganizing.

2. The method of claim 1, wherein the at least one content entity comprises one of a container and a noncontainer.

3. The method of claim 1, wherein the compilation is a book and the at least one content entity is one of a chapter and a section.

4. The method of claim 1, wherein the predetermined container size is measured with respect to a quantity of pages.

5. The method of claim 1, wherein the alteration of content is caused by at least one of addition, deletion, and movement of content within the compilation.

6. The method of claim 1, wherein the compilation includes at least one container containing a plurality of content entities selected for and arranged in the compilation.

7. The method of claim 1, wherein the at least one other container is a newly created container within the compilation.

8. The method of claim 1, wherein the at least one other container is immediately succeeding the current container within the compilation.

9. The method of claim 1, wherein the at least one other container is immediately preceding the current container within the compilation.

10. The method of claim 1, wherein the current container and the at least one other container include one of text content, image content, audio content, and video content.

11. The method of claim 1, further including:
in response to the reorganizing at least one content entity, balancing content entities among the containers until each container satisfies the predetermined container size, wherein the balancing is based on size of the content entities, the predetermined container size, and content within the containers.

12. The method of claim 1, further including:
in response to the reorganizing at least one content entity, balancing content entities among the containers to satisfy the predetermined container size for each container, wherein the balancing includes for each container:
reorganizing at least one content entity among at least one succeeding container in response to that container exceeding the predetermined container size; and
reorganizing at least one content entity among at least one preceding container in response to that container satisfying the predetermined container size and sufficient space being available in the at least one preceding container.

13. A program storage device readable by a machine, tangibly embodying a program of instructions executable by the machine to perform method steps for managing containers within a compilation, the method comprising:
generating an outline of the compilation as a separate data object in a data repository, wherein the outline includes a hierarchical arrangement of identifiers of selected content entities providing content and the hierarchical arrangement indicates locations of the selected content entities within containers of the compilation;
in response to an alteration of the content within the compilation, reorganizing at least one content entity among a current container and at least one other container so that an amount of content of content entities remaining in the current container complies with a predetermined container size;
updating the hierarchical arrangement of identifiers of the outline of the compilation based on the reorganizing of the at least one content entity; and
deleting the current container in response to the current container becoming empty after the reorganizing.

14. The program storage device of claim 13, wherein the at least one content entity comprises one of a container and a noncontainer.

15. The program storage device of claim 13, wherein the compilation is a hook and the at least one content entity is one of a chapter and a section.

16. The program storage device of claim 13, wherein the predetermined container size is measured with respect to a quantity of pages.

17. The program storage device of claim 13, wherein the alteration of content is caused by at least one of addition, deletion, and movement of content within the compilation.

18. The program storage device of claim 13, wherein the compilation includes at least one container containing a plurality of content entities selected for and arranged in the compilation.

19. The program storage device of claim 13, wherein the at least one other container is a newly created container within the compilation.

20. The program storage device of claim 13, wherein the at least one other container is immediately succeeding the current container within the compilation.

21. The program storage device of claim 13, wherein the at least one other container is immediately preceding the current container within the compilation.

22. The program storage device of claim 13, wherein the current container and the at least one other container include one of text content, image content, audio content, and video content.

23. A system for managing containers within a compilation, comprising:
a computer system with a processor configured to:
generate an outline of the compilation as a separate data object in a data repository, wherein the outline includes a hierarchical arrangement of identifiers of selected content entities providing content and the hierarchical arrangement indicates locations of the selected content entities within containers of the compilation;
in response to an alteration of the content within the compilation, reorganize at least one content entity among a current container and at least one other container so that an amount of content of content entities remaining in the current container complies with a predetermined container size;
update the hierarchical arrangement of identifiers of the outline of the compilation based on the reorganizing of the at least one content entity; and
delete the current container in response to the current container becoming empty after the reorganizing.

24. The system of claim 23, wherein the at least one content entity comprises one of a container and a noncontainer.

25. The system of claim 23, wherein the compilation is a book and the at least one content entity is one of a chapter and a section.

26. The system of claim 23, wherein the predetermined container size is measured with respect to a quantity of pages.

27. The system of claim 23, wherein the alteration of content is caused by at least one of addition, deletion, and movement of content within the compilation.

28. The system of claim 23, wherein the compilation includes at least one container containing a plurality of content entities selected for and arranged in the compilation.

29. The system of claim 23, wherein the at least one other container is a newly created container within the compilation.

30. The system of claim 23, wherein the at least one other container is immediately succeeding the current container within the compilation.

31. The system of claim 23, wherein the at least one other container is immediately preceding the current container within the compilation.

32. The system of claim 23, wherein the current container and the at least one other container include one of text content, image content, audio content, and video content.

* * * * *